US012506667B2

United States Patent
Centonza et al.

(10) Patent No.: US 12,506,667 B2
(45) Date of Patent: Dec. 23, 2025

(54) ENHANCED NETWORK CONTROL OVER QUALITY-OF-EXPERIENCE (QOE) MEASUREMENT REPORTS BY USER EQUIPMENT

(71) Applicant: Telefonaktiebolaget LM Ericsson (publ), Stockholm (SE)

(72) Inventors: Angelo Centonza, Granada (ES); Johan Rune, Lidingö (SE); Filip Barac, Huddinge (SE); Ali Parichehrehteroujeni, Linköping (SE); Cecilia Eklöf, Täby (SE); Luca Lunardi, Genoa (IT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 392 days.

(21) Appl. No.: 18/008,816

(22) PCT Filed: Jun. 29, 2021

(86) PCT No.: PCT/SE2021/050645
§ 371 (c)(1),
(2) Date: Dec. 7, 2022

(87) PCT Pub. No.: WO2022/005379
PCT Pub. Date: Jan. 6, 2022

(65) Prior Publication Data
US 2023/0231779 A1    Jul. 20, 2023

Related U.S. Application Data

(60) Provisional application No. 63/046,224, filed on Jun. 30, 2020.

(51) Int. Cl.
*H04L 41/5067* (2022.01)
*H04W 24/08* (2009.01)
(Continued)

(52) U.S. Cl.
CPC ......... *H04L 41/5067* (2013.01); *H04W 24/08* (2013.01); *H04W 24/10* (2013.01); *H04W 24/02* (2013.01)

(58) Field of Classification Search
CPC .. H04L 41/5067; H04W 24/08; H04W 24/02; H04W 24/10
See application file for complete search history.

(56) References Cited

U.S. PATENT DOCUMENTS

| 8,656,371 B2* | 2/2014 | Jou ...................... G06F 40/177 717/136 |
| 2016/0119675 A1* | 4/2016 | Voth ................. H04N 21/44226 725/14 |

(Continued)

FOREIGN PATENT DOCUMENTS

| EP | 3100500 A1 | 12/2016 | |
| EP | 3833079 B1 * | 5/2025 | ........... H04L 5/0053 |

(Continued)

OTHER PUBLICATIONS

Aceto et al., Efficient Storage and Processing of High-Volume Network Monitoring Data, IEEE Transactions on Network and Service Management, Accepted for Publication, 2013. (Year: 2013).*

(Continued)

*Primary Examiner* — Brian J. Gillis
*Assistant Examiner* — Chhian (Amy) Ling
(74) *Attorney, Agent, or Firm* — Murphy, Bilak & Homiller, PLLC

(57) ABSTRACT

Embodiments include methods for a user equipment (UE), particularly for performing quality of experience (QoE) measurements configured by a wireless network. Such methods include receiving, from a radio access network node (RNN) in the wireless network, a request for QoE measurement reports that are available at the UE and that are associated with one or more services provided by the UE (Continued)

application layer. Such methods also include sending one or more QoE measurement reports to the RNN in accordance with the request. Other embodiments include complementary methods for a RNN, as well as UEs and RNNs configured to perform such methods.

15 Claims, 19 Drawing Sheets

(51) Int. Cl.
*H04W 24/10* (2009.01)
*H04W 24/02* (2009.01)

(56) References Cited

U.S. PATENT DOCUMENTS

2022/0210031 A1* 6/2022 Hu .......................... H04L 43/55
2022/0417780 A1* 12/2022 Liu ....................... H04W 24/10

FOREIGN PATENT DOCUMENTS

| WO | 2012138083 A2 | 10/2012 |
|---|---|---|
| WO | 2015115825 A1 | 8/2015 |
| WO | 2018142345 A1 | 8/2018 |
| WO | 2022005376 A1 | 1/2022 |
| WO | 2022005377 A1 | 1/2022 |

OTHER PUBLICATIONS

"3GPP TS 26.114 V16.5.2", 3rd Generation Partnership Project; Technical Specification Group Services and System Aspects; IP Multimedia Subsystem (IMS); Multimedia Telephony; Media handling and interaction (Release 16), Mar. 2020, pp. 1-446.
"3GPP TS 26.247 V16.2.0", 3rd Generation Partnership Project; Technical Specification Group Services and System Aspects; Transparent end-to-end Packet-switched Streaming Service (PSS); Progressive Download and Dynamic Adaptive Streaming over HTTP (3GP-Dash) (Release 16), Dec. 2019, pp. 1-139.
"3GPP TS 27.007 V16.4.0", 3rd Generation Partnership Project; Technical Specification Group Core Network and Terminals; AT command set for User Equipment (UE) (Release 16), Mar. 2020, pp. 1-355.
"3GPP TS 28.405 V1.3.0", S5-202345; 3rd Generation Partnership Project; Technical Specification Group Services and System Aspects; Telecommunication management; Quality of Experience (QoE) measurement collection; Control and configuration (Release 16), Apr. 2020, pp. 1-53.
"3GPP TS 36.300 V16.0.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Dec. 2019, pp. 1-366.
"3GPP TS 36.300 V16.1.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Mar. 2020, pp. 1-386.
"3GPP TS 38.331 V15.9.0", 3rd Generation Partnership Project; Technical Specification Group Radio Access Network; NR; Radio Resource Control (RRC) protocol Specification (Release 15), Mar. 2020, pp. 1-536.
"3rd Generation Partnership Project; Technical Specification Group Services and System Aspects; Security architecture and procedures for 5G system (Release 16)", 3GPP TS 33.501 V16.2.0, Mar. 2020, pp. 1-227.
"LS Reply on QoE Measurement Collection", 3GPP TSG-SA4 Meeting #109-e, S4-200962, Online, May 20-Jun. 3, 2019, pp. 1-2.
"New WI proposal: Quality of Experience (QoE) Measurement Collection for streaming services in UTRAN", 3GPP TSG RAN Meeting #73, RP-161917, New Orleans, Sep. 19-22, 2016, pp. 1-8.
"QoE measurement collection additions", 3GPP TSG RAN2 Meeting #110, R2-2004624, Electronic meeting, Jun. 1-12, 2020, pp. 1-80.
"Solution for QoE Management", 3GPP TSG RAN WG2 #113, R2-2101271, Electronical meeting, Jan. 25- Feb. 5, 2021, pp. 1-3.
"3GPP TS 38.322 V15.4.0", 3rd Generation Partnership Project; Technical Specification Group Radio Access Network; NR; Radio Link Control (RLC) protocol specification (Release 15), Dec. 2018, pp. 1-33.
"3GPP TS 36.331 V16.0.0", 3rd Generation Partnership Project; Technical Specification Group Radio Access Network; Evolved Universal Terrestrial Radio Access (E-UTRA); Radio Resource Control (RRC); Protocol specification (Release 16), Mar. 2020, pp. 1-1048.
"3GPP TS 38.300 V16.1.0", 3rd Generation Partnership Project; Technical Specification Group Radio Access Network; NR; NR and NG-RAN Overall Description; Stage 2 (Release 16), Mar. 2020, pp. 1-133.
"3GPP TS 25.331 V15.1.0", 3rd Generation Partnership Project; Technical Specification Group Radio Access Network; Radio Resource Control (RRC); Protocol specification (Release 15), Dec. 2017, pp. 1-2316.
"3GPP TR 38.874 V0.2.1", 3rd Generation Partnership Project; Technical Specification Group Radio Access Network; Study on Integrated Access and Backhaul; (Release 15), May 2018, pp. 1-19.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.
"3GPP TS 23.501 V16.4.0", 3rd Generation Partnership Project; Technical Specification Group Services and System Aspects; System architecture for the 5G System (5GS); Stage 2 (Release 16), Mar. 2020, pp. 1-430.
"New WID: Integrated Access and Backhaul for NR", 3GPP TSG RAN Meeting #82, RP-182882, Sorrento, Italy, Dec. 10-13, 2018, pp. 1-7.

* cited by examiner

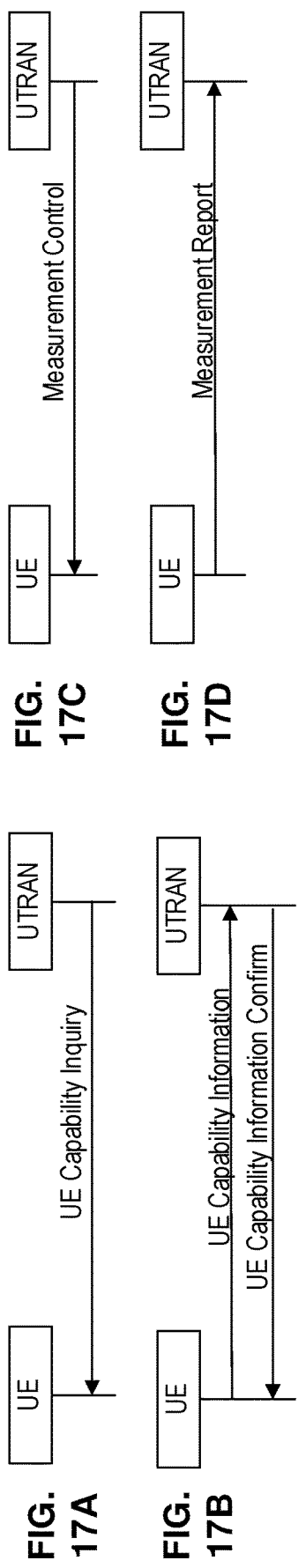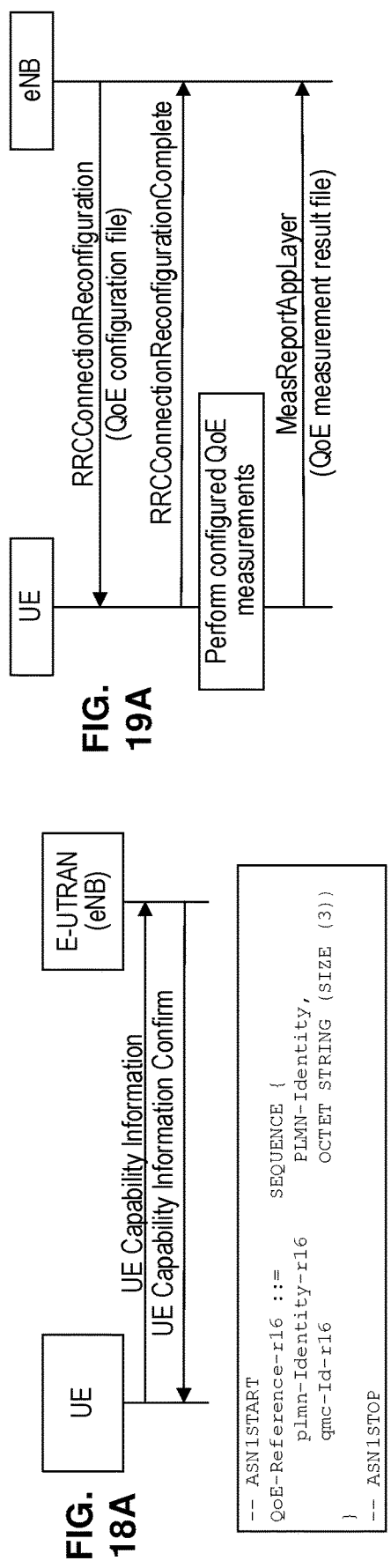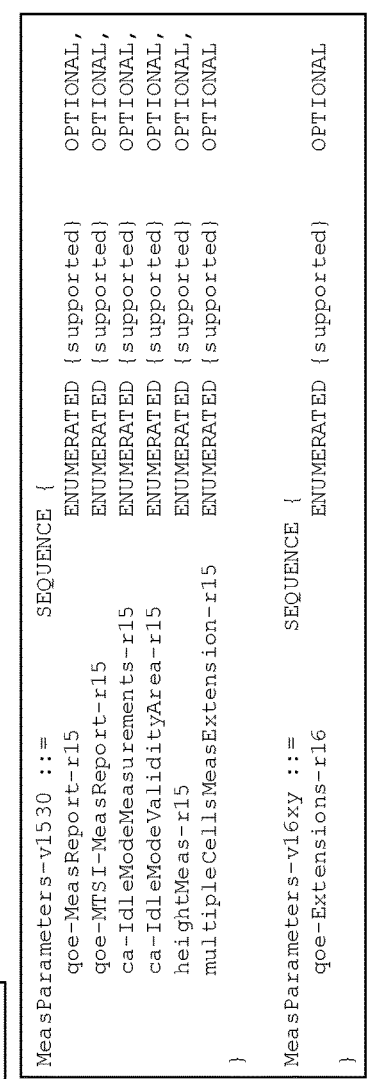

```
measConfigAppLayer-r15             CHOICE {
    release                            NULL,
    setup                              SEQUENCE{
        measConfigAppLayerContainer-r15    OCTET STRING (SIZE(1..1000)),
        serviceType-r15                    ENUMERATED {qoe, qoemtsi, spare6, spare5, spare4, spare3, spare2, spare1}
    }
} measConfigAppLayerToAddModList-r18   SEQUENCE (SIZE (1.. maxQoE-Measurement-r18)) OF MeasConfigAppLayer-r18    OPTIONAL,  -- Need ON
measConfigAppLayerToReleaseList-r18  SEQUENCE (SIZE (1.. maxQoE-Measurement-r18)) OF MeasReleaseAppLayer-r18   OPTIONAL   -- Need ON MeasConfigAppLayer-r18 ::= SEQUENCE {
    measConfigAppLayerContainer-r15  OCTET STRING (SIZE(1..1000))
    serviceType-r18                  ServiceType-r18
    qoe-Reference-r18                QoE-Reference-r18
    withinArea-r18                   ENUMERATED {inside, outside}    OPTIONAL,    -- Need ON
    temporaryStopQoE-r18             BOOLEAN,                        OPTIONAL,    -- Need ON
    restartQoE-r18                   BOOLEAN                         OPTIONAL,    -- Need ON
                                                                     OPTIONAL     -- Need ON
}

MeasReleaseAppLayer-r18 ::= SEQUENCE {
    serviceType-r18     ServiceType-r18                              OPTIONAL,    -- Need ON
    qoe-Reference-r18   QoE-Reference-r18                            OPTIONAL     -- Need ON
}
```

FIG. 19B

```
-- ASN1START
MeasReportAppLayer-r15 ::=          SEQUENCE {
    criticalExtensions                  CHOICE {
        measReportAppLayer-r15              MeasReportAppLayer-r15-IEs,
        criticalExtensionsFuture            SEQUENCE {}
    }
}

MeasReportAppLayer-r15-IEs ::=      SEQUENCE {
    measReportAppLayerContainer-r15     OCTET STRING (SIZE(1..8000))
    serviceType-r15                     ENUMERATED {qoe, qoemtsi, spare6, spare5, spare4, spare3, spare2, spare1}  OPTIONAL,
    nonCriticalExtension                MeasReportAppLayer-v1590-IEs                                               OPTIONAL
}

MeasReportAppLayer-v1590-IEs ::=    SEQUENCE {
    lateNonCriticalExtension            OCTET STRING                                                               OPTIONAL,
    nonCriticalExtension                MeasReportAppLayer-IEs-v18xy                                               OPTIONAL
}

MeasReportAppLayer-IEs-v18xy ::=    SEQUENCE {
    qoe-Reference-r18                   QoE-Reference-r18                                OPTIONAL,    -- Need ON
    recordingSessionIndication-r18      BOOLEAN                                          OPTIONAL,    -- Need ON
    nonCriticalExtension                SEQUENCE {}                                      OPTIONAL
}
-- ASN1STOP
```

FIG. 19C

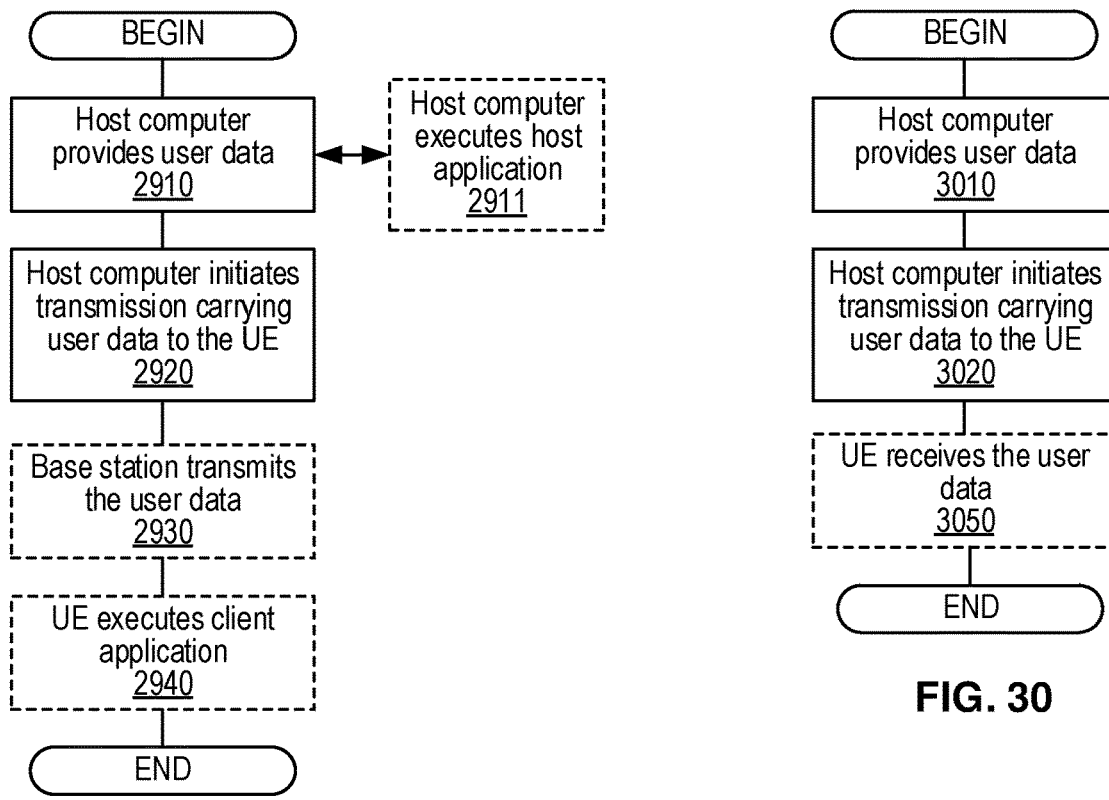
FIG. 29
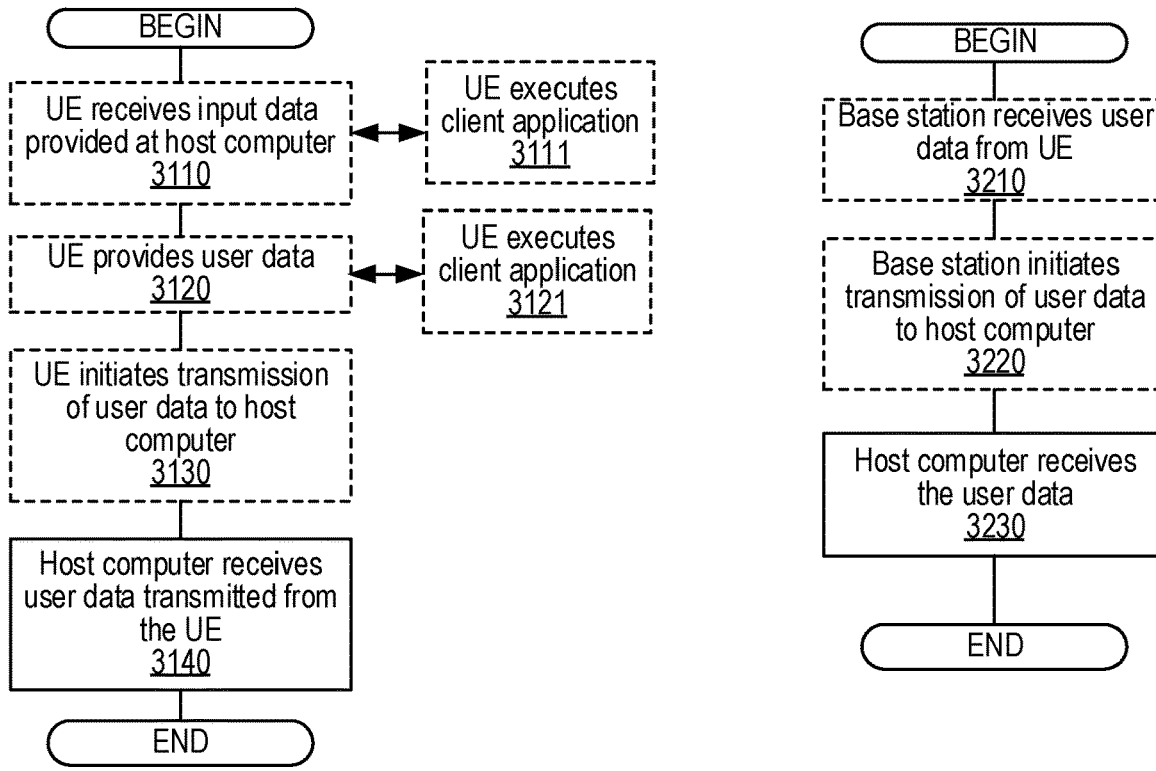
FIG. 30
FIG. 31
FIG. 32

ENHANCED NETWORK CONTROL OVER QUALITY-OF-EXPERIENCE (QOE) MEASUREMENT REPORTS BY USER EQUIPMENT

TECHNICAL FIELD

The present invention generally relates to wireless communication networks and particularly relates to measuring end-user experience in wireless networks, also referred to as quality of experience (QoE).

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MMF/S-GWs 134 and 138 in FIG. 1. In general, the MMF/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

Quality of Experience (QoE) measurements have been specified for UEs operating in LTE networks and in earlier-generation UMTS networks. Measurements in both networks operate according to the same high-level principles.

Their purpose is to measure the experience of end users when using certain applications over a network. For example, QoE measurements for streaming services and for MTSI (Mobility Telephony Service for IMS) are supported in LTE.

RRC signaling is used to configure application layer measurements in UEs and to collect QoE measurement result files from the configured UEs. In particular, application layer measurement configuration from the core network (e.g., EPC) or a network operations/administration/maintenance (OAM) function is encapsulated in a transparent container and sent to the serving eNB, which forwards it to a UE in an RRC message. Application layer measurements made by the UE are encapsulated in a transparent container and sent to the serving eNB in an RRC message. The serving eNB then forwards the container to a Trace Collector Entity (TCE) or a Measurement Collection Entity (MCE) associated with the EPC.

Currently the fifth generation ("5G") of cellular systems, also referred to as New Radio (NR), is being standardized within the Third-Generation Partnership Project (3GPP). NR is developed for maximum flexibility to support a variety of different use cases. These include enhanced mobile broadband (eMBB), machine type communications (MTC), ultra-reliable low latency communications (URLLC), side-link device-to-device (D2D), and several other use cases. 5G/NR technology shares many similarities with fourth-generation LTE. For example, both PHYs utilize similar arrangements of time-domain physical resources into 1-ms subframes that include multiple slots of equal duration, with each slot including multiple OFDM-based symbols. As another example, NR RRC layer includes RRC_IDLE and RRC_CONNECTED states, but adds another state known as RRC_INACTIVE. In addition to providing coverage via "cells," as in LTE, NR networks also provide coverage via "beams." In general, a DL "beam" is a coverage area of a network-transmitted RS that may be measured or monitored by a UE.

QoE measurements will be needed for UEs operating in NR networks. However, the existing QoE measurement framework does not address the various options and/or complexities of a UE's connectivity with networks that include both LTE and NR. Furthermore, the existing framework does not provide the level of granularity and/or control for QoE measurements in these networks. Solutions to these problems, issues, and/or drawbacks are needed.

SUMMARY

Embodiments of the present disclosure provide specific improvements to QoE measurements in a wireless network, such as by facilitating solutions to overcome exemplary problems summarized above and described in more detail below.

Embodiments of the present disclosure include methods (e.g., procedures) for performing quality of experience (QoE) measurements configured by a wireless network. These exemplary methods can be performed by a user equipment (UE, e.g., wireless device, IoT device, modem, etc. or component thereof) in communication with a radio access network node (RNN, e.g., base station, eNB, gNB, ng-eNB, en-gNB, etc., or component thereof) in the wireless network (e.g., E-UTRAN, NG-RAN).

These exemplary methods can include receiving, from the RNN, a request for QoE measurement reports that are available at the UE and that are associated with one or more services provided by the UE application layer. These exemplary methods can also include sending one or more QoE measurement reports to the RNN in accordance with the request.

In some embodiments, the sending operations can include dividing the particular QoE measurement report into a plurality of segments when the size of the particular QoE measurement report is greater than a maximum segment size, and sending the plurality of segments to the RNN. Each segment is sent together with a corresponding segment number. In some of these embodiments, the request for QoE measurement reports can include a segmentation configuration for QoE measurement reports, and the segmentation configuration can include the maximum segment size.

In some embodiments, these exemplary methods can also include sending, to the RNN, an availability indication for the one or more QoE measurement reports. In such embodiments, the request can be received in response to the availability indication. In some of these embodiments, the availability indication can be sent together with one or more of the following assistance information:

time elapsed since the most recent QoE measurement report from the UE,
number of QoE measurement reports available at the UE,
amount of data comprising QoE measurement reports available at the UE,
amount of data comprising each available QoE measurement report,
validity period for each available QoE measurement report,
indication of whether each available QoE measurement report is a first, last, or intermediate report for an application session, and
indication of whether each available QoE measurement report contains critical information.

In some embodiments, sending the availability indication can include determining that the number of QoE measurement reports available at the UE is greater than or equal to a first threshold, and/or determining that an elapsed time since the earliest of the available QoE measurement reports became available is greater than or equal to a second threshold. In such embodiments, sending the availability indication can be based on one or both of these determinations, as the case may be.

In some embodiments, these exemplary methods can also include receiving, from the RNN, a QoE measurement configuration for the one or more services; performing measurements for the one or more services in accordance with the QoE measurement configuration; and selectively storing, in UE memory, first and second QoE measurement reports comprising the performed measurements. In some of these embodiments, these exemplary methods can also include receiving, from the RNN, a configuration for selective storage of QoE measurement reports by the UE. In such embodiments, selectively storing is performed according to the configuration.

In some embodiments, the configuration for selective storage can include storage priorities based on one or more of the following: respective ages of the reports, respective application sessions associated with the QoE measurement reports, respective criticalities of the services associated with the QoE measurement reports, and respective criticalities of the information comprising the QoE measurement reports. In some embodiments, the configuration for selective storage can include a first threshold for UE sending of unsolicited QoE measurement reports.

In some embodiments, selectively storing can include deleting one of the first and second QoE measurement reports from the UE memory and storing the other of the first and second QoE measurement reports in the UE memory. In some embodiments, deleting the one and storing the other of the first and second QoE measurement reports can be based on one or more of the following: the respective sizes of the QoE measurement reports, the respective ages of the QoE measurement reports, the respective criticalities of the services associated with the QoE measurement reports, and the respective criticalities of the information comprising the QoE measurement reports.

In other embodiments, selectively storing can include storing both the first and second QoE measurement reports in the UE memory. In some embodiments, storing both the first and second measurement QoE reports can be based on sufficient UE memory to store both and/or the number of QoE measurement reports available at the UE is less than a first threshold. In some embodiments, these exemplary methods can also include sending one or more available QoE measurement reports without a request from the RNN upon occurrence of one or more of the following conditions:
 a number of QoE measurement reports available at the UE is greater than or equal to a first threshold; and
 insufficient UE memory to store the available QoE measurement reports.

In some embodiments, the request can include one or more criteria for selecting available QoE measurement reports. In such embodiments, these exemplary methods can also include selecting the one or more QoE measurement reports from a plurality of QoE measurement reports stored by the UE in accordance with the one or more criteria. In various embodiments, the one or more criteria can include any of the following:
 a bitmap comprising a plurality of bits, including one or more bits indicating that the respective one or more QoE measurement reports should be sent by the UE;
 one or more indices associated with the respective one or more QoE measurement reports;
 a priority order in which QoE measurement reports should be sent by the UE;
 a specific number of QoE measurement reports to be sent by the UE;
 a specific size for each QoE measurement report to be sent by the UE;
 a minimum size for each QoE measurement report to be sent by the UE;
 a maximum size for each QoE measurement report to be sent by the UE;
 a maximum number of QoE measurement reports to be sent by the UE; and
 a maximum combined data volume of QoE measurement reports to be sent by the UE.

In some of these embodiments, the priority order can be based on one more of the following: the respective sizes of the QoE measurement reports, the respective ages of the QoE measurement reports, the respective criticalities of the applications associated with the QoE measurement reports, and the respective criticalities of the information comprising the QoE measurement reports.

In some embodiments, the request for QoE measurement reports can also include one or more of the following transmission instructions for the UE:
 identification of one or more radio bearers over which the QoE measurement reports should be sent by the UE,
 one or more rules for UE selection of radio bearers for sending the QoE measurement reports,
 instruction to send the QoE measurement reports via a second RNN, and
 instruction to send the QoE measurement reports via unlicensed spectrum.

In such embodiments, the one or more QoE measurement reports can be sent in accordance with the transmission instructions in the request.

Other embodiments include methods (e.g., procedures) for configuring quality of experience (QoE) measurements by UEs. These exemplary methods can be performed by a radio access network node (RNN, e.g., base station, eNB, gNB, ng-eNB, en-gNB, etc., or component thereof) in a wireless network (e.g., E-UTRAN, NG-RAN).

These exemplary methods can include sending, to a UE, a request for QoE measurement reports that are available at the UE and that are associated with one or more services provided by the UE application layer. These exemplary methods can also include receiving one or more QoE measurement reports from the UE in accordance with the request.

In some embodiments, the receiving operations can include: receiving, from the UE, a plurality of segments of the particular QoE measurement report when the size of the particular QoE measurement report is greater than a maximum segment size, with each segment being received together with a corresponding segment number; and combining the plurality of segments into the particular QoE measurement report based on the respective segment numbers. In some of these embodiments, the request for QoE measurement reports can include a segmentation configuration for QoE measurement reports, and the segmentation configuration can include the maximum segment size.

In some embodiments, these exemplary methods can also include receiving, from the UE, an availability indication for the one or more QoE measurement reports. In such embodiments, the request is sent in response to the availability indication.

In some embodiments, the availability indication is received together with various assistance information, including any assistance information summarized above in relation to UE embodiments. In some embodiments, these exemplary methods can also include, based on the availability indication and the assistance information, determining one or more of the following for inclusion in the request:
 identifiers associated with the one or more QoE measurement reports,
 identifiers of applications associated with the one or more QoE measurement reports, and
 one or more criteria for UE selection of available QoE measurement reports.

In various embodiments, the one or more criteria can include any of the criteria summarized above in relation to UE embodiments. When the criteria include a priority order, the priority order can be based on any of the factors summarized above in relation to UE embodiments.

In some embodiments, the request can also include one or more transmission instructions for the UE, including any of the transmission instructions summarized above in relation to UE embodiments. In such embodiments, the one or more QoE measurement reports can be received in accordance with the transmission instructions in the request.

In some embodiments, these exemplary methods can also include sending, to the UE, a QoE measurement configuration for the one or more services. In such embodiments, the received QoE measurement reports include measurements for the one or more services in accordance with the QoE measurement configuration. In some embodiments, these exemplary methods can also include receiving one or more available QoE measurement reports from the UE without a request from the RNN in response to one or more of the following:

the number of QoE measurement reports available at the UE is greater than or equal to a first threshold; and
insufficient UE memory to store available QoE measurement reports.

In some embodiments, these exemplary methods can also include sending, to the UE, a configuration for selective storage of QoE measurement reports by the UE. In various embodiments, the configuration for selective storage can have any of the characteristics and/or include any of the information summarized above in relation to UE embodiments.

Other embodiments include UEs (e.g., wireless devices, IoT devices, etc. or component(s) thereof) and RNNs (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or RNNs to perform operations corresponding to any of the exemplary methods described herein.

These and other embodiments can facilitate more control by a RNN over delivery of QoE measurement reports by UEs. This can prevent and/or mitigate congestion of the radio interface between RNN and UE, as well as potential overload caused by simultaneous delivery of backlogged QoE reports by multiple UEs in a single cell. More generally, embodiments can facilitate timely delivery of QoE reports without degrading RAN operation. Additionally, embodiments can prevent and/or mitigate exhaustion of limited amounts of UE memory available for storing QoE measurements and measurement reports.

These and other objects, features, and advantages of embodiments of the present disclosure will become apparent upon reading the following Detailed Description in view of the Drawings briefly described below.

BRIEF DESCRIPTION OF THE DRAWINGS

FIGS. 17A-D show various procedures between a UTRAN and a UE for QoE measurements in a legacy UMTS network.

FIGS. 18A-C illustrate various aspects of QoE measurement configuration for a UE in an LTE network.

FIGS. 19A-C illustrate various aspects of QoE measurement collection for a UE in an LTE network.

FIGS. 29-32 are flow diagrams of exemplary methods (e.g., procedures) for transmission and/or reception of user data, according to various embodiments of the present disclosure.

DETAILED DESCRIPTION

Figure 2:
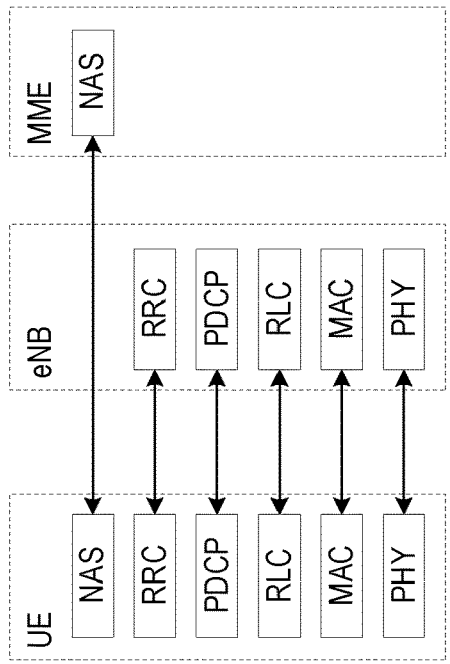
FIG. 2 illustrates an exemplary control plane (CP) protocol stack between a UE, the E-UTRAN, and the EPC.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate.

Likewise, any advantage of any of the embodiments may apply to any other embodiments, and vice versa. Other objectives, features, and advantages of the enclosed embodiments will be apparent from the following description.

Furthermore, the following terms are used throughout the description given below:

- Radio Node: As used herein, a "radio node" can be either a "radio access node" or a "wireless device."
- Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP Fifth Generation (5G) NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node.
- Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.
- Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).
- Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, the existing framework for QoE measurements does not address the various options and/or complexities of a UE's connectivity with networks that include both LTE and NR. Furthermore, the existing framework does not provide the level of granularity and/or control for QoE measurements in these networks. This is discussed in more detail below, after the following description of various aspects of LTE and NR network architecture. 3GPP Rel-10 supports bandwidths larger than 20 MHz. One important Rel-10 requirement is backward compatibility with Rel-8. As such, a wideband LTE Rel-10 carrier (e.g., >20 MHz) should appear as a plurality of carriers ("component carriers" or CCs) to a Rel-8 ("legacy") terminal. Legacy terminals can be scheduled in all parts of the wideband Rel-10 carrier. One way to achieve this is by Carrier Aggregation (CA), whereby a Rel-10 terminal can receive multiple CCs, each preferably having the same structure as a Rel-8 carrier.

LTE dual connectivity (DC) was introduced in Rel-12. In DC operation, a UE in RRC_CONNECTED state consumes radio resources provided by at least two different network points connected to one another with a non-ideal backhaul. In LTE, these two network points may be referred to as a "Master eNB" (MeNB) and a "Secondary eNB" (SeNB). More generally, master node (MN), anchor node, and MeNB can be used interchangeably, and the terms secondary node (SN), booster node, and SeNB can be used interchangeably. DC can be viewed as a special case of CA, in which the aggregated carriers (or cells) are provided by network nodes that are physically separated and not connected via a robust, high-capacity connection.

More specifically, in DC, the UE is configured with a Master Cell Group (MCG) and a Secondary Cell Group (SCG). A Cell Group (CG) is a group of serving cells associated with either the MeNB or the SeNB(s) and includes one MAC entity, a set of logical channels with associated RLC entities, a primary cell, and optionally one or more secondary cells. The Master Cell Group (MCG) is a group of serving cells associated with the MeNB and includes a primary cell (PCell) and optionally one or more secondary cells (SCells). A Secondary Cell Group (SCG) is a group of serving cells associated with the SeNB and includes a Primary SCell (PSCell) and optionally one or more SCells. The term "Special Cell" (or "SpCell" for short) refers to the PCell of the MCG or the PSCell of the SCG depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

The MN provides system information (SI) and terminates the control plane connection towards the UE and, as such, is the controlling node of the UE, including handovers to and from SNs. For example, the MN terminates the connection between the eNB and the Mobility Management Entity (MME) for the UE. An SN provides additional radio resources (e.g., bearers) for radio resource bearers include MCG bearers, SCG bearers, and split bearers that have resources from both MCG and SCG. The reconfiguration, addition, and removal of SCells can be performed by RRC. When adding a new SCell, dedicated RRC signaling is used to send the UE all required SI of the SCell, such that UEs need not acquire SI directly from the SCell broadcast. It is also possible to support CA in either or both of MCG and SCG. In other words, either or both of the MCG and the SCG can include multiple cells working in CA.

Figure 3:
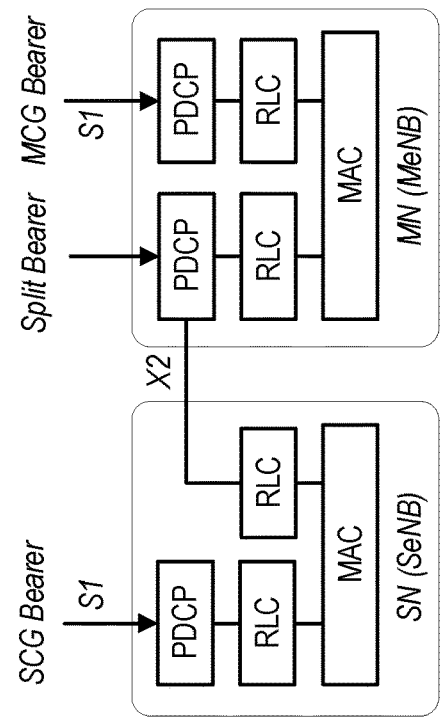
FIGS. 3 and 4A-B illustrate various aspects of dual connectivity (DC) in an LTE network.
Figure 4A:
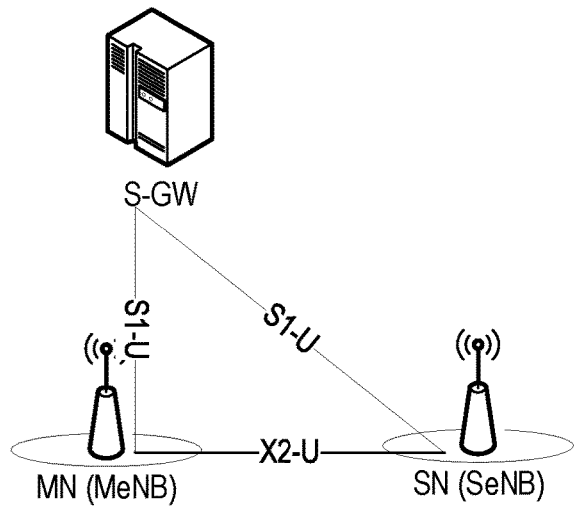

FIG. 3 shows an aggregated user plane (UP) protocol stack for LTE DC, while FIG. 4A shows the inter-eNB connectivity for LTE DC UP. The UP aggregation shown in FIG. 3 achieves benefits such as increasing the throughput for users with good channel conditions and the capability of receiving and transmitting at higher data rates than can be supported by a single node, even without a low-latency backhaul connection between MeNB/MN and SeNB/SN.

As shown in FIG. 3, the LTE DC UP includes three different types of bearers. MCG bearers are terminated in the MN, and the S1-U connection for the corresponding bearer (s) to the S-GW is terminated in the MN (shown in FIG. 4A). The SN is not involved in the transport of UP data for MCG bearers. Likewise, SCG bearers are terminated in the SN, which can be directly connected with the S-GW via S1-U (as shown in FIG. 4A). The MN is not involved in the transport of UP data for SCG bearers. An S1-U connection between S-GW and SN is only present if SCG bearers are configured. Finally, split bearers are also terminated in the MN, with PDCP data being transferred between MN and SN via X2-U interface (shown in FIG. 4A). Both SN and MN are involved in transmitting data for split bearers.

Figure 4B:
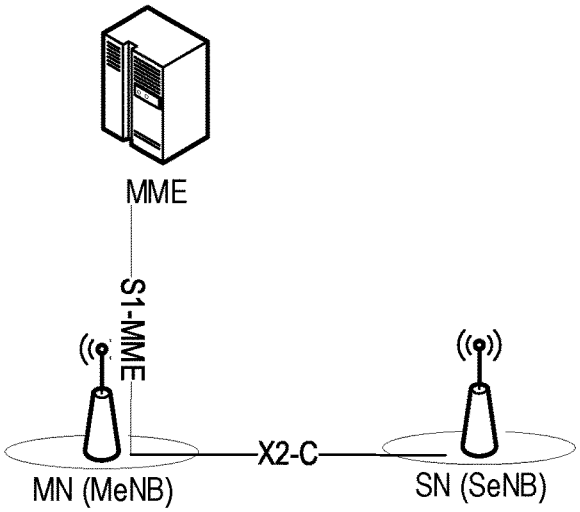

FIG. 4B shows the inter-eNB CP connectivity for LTE DC. In this arrangement, all MME signaling is carried over the MeNB's S1-MME interface to the MME, with the SeNB's signaling also carried over the X2-C interface with the MeNB. The network's RRC connection with the UE is handled only by the MeNB, such that SRBs are always configured as MCG bearer type and only use radio resources of the MeNB. However, the MeNB can also configure the UE based on input from the SeNB and, in this manner, the SeNB can indirectly control the UE.

Figure 5:
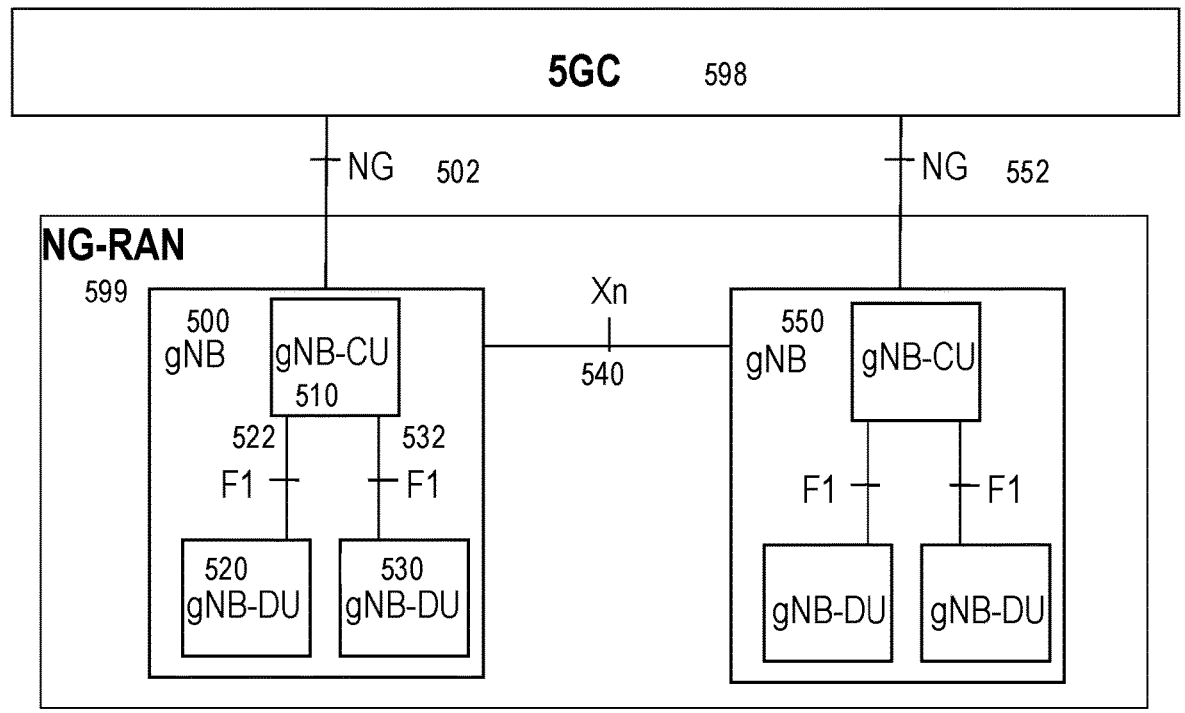
FIG. 5 shows a high-level views of an exemplary 5G network architecture.

FIG. 5 illustrates a high-level view of the 5G network architecture, consisting of a Next Generation RAN (NG-RAN) 599 and a 5G Core (5GC) 598. NG-RAN 599 can include a set of gNodeB's (gNBs) connected to the 5GC via one or more NG interfaces, such as gNBs 500, 550 connected via interfaces 502, 552, respectively. In addition, the gNBs can be connected to each other via one or more Xn interfaces, such as Xn interface 540 between gNBs 500 and 550. With respect the NR interface to UEs, each of the gNBs can support frequency division duplexing (FDD), time division duplexing (TDD), or a combination thereof.

NG-RAN 599 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501 (v16.4.0). If security protection for CP and UP data on TNL of NG-RAN interfaces is supported, NDS/IP shall be applied.

The NG RAN logical nodes shown in FIG. 5 include a central (or centralized) unit (CU or gNB-CU) and one or more distributed (or decentralized) units (DU or gNB-DU). For example, gNB 500 includes gNB-CU 510 and gNB-DUs 520 and 540. CUs (e.g., gNB-CU 510) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 522 and 532 shown in FIG. 5. The gNB-CU and connected gNB-DUs are only visible to other gNBs and the 5GC as a gNB. In other words, the F1 interface is not visible beyond gNB-CU. In the gNB split CU-DU architecture illustrated by FIG. 4, DC can be achieved by allowing a UE to connect to multiple DUs served by the same CU or by allowing a UE to connect to multiple DUs served by different CUs.

DC is also envisioned as an important feature for 5G/NR networks. 3GPP TR 38.804 (v14.0.0) describes various exemplary dual-connectivity (DC) scenarios or configurations in which the MN and SN can apply either NR RAT, LTE RAT, or both, and can connect to either EPC or 5GC. The following terminology is used to describe these exemplary DC scenarios or configurations:

DC: LTE DC (i.e., both MN and SN employ LTE, as discussed above);

EN-DC: LTE-NR DC where MN (eNB) employs LTE and SN (gNB) employs NR, and both are connected to EPC.

NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.

NE-DC: LTE-NR dual connectivity where a UE is connected to one gNB that acts as a MN and one ng-eNB that acts as a SN. The gNB is connected to 5GC and the ng-eNB is connected to the gNB via the Xn interface.

NR-DC (or NR-NR DC): both MN and SN employ NR and connect to 5GC via NG.

MR-DC (multi-RAT DC): a generalization of the Intra-E-UTRA Dual Connectivity (DC) described in 3GPP TS 36.300 (v16.0.0), where a multiple RxfTx UE may be configured to utilize resources provided by two different nodes connected via non-ideal backhaul, one providing E-UTRA access and the other one providing NR access. One node acts as the MN and the other as the SN, with one using LTE and the other using NR. The MN and SN are connected via a network interface and at least the MN is connected to the core network. EN-DC, NE-DC, and NGEN-DC are different example cases of MR-DC.

Figure 6:
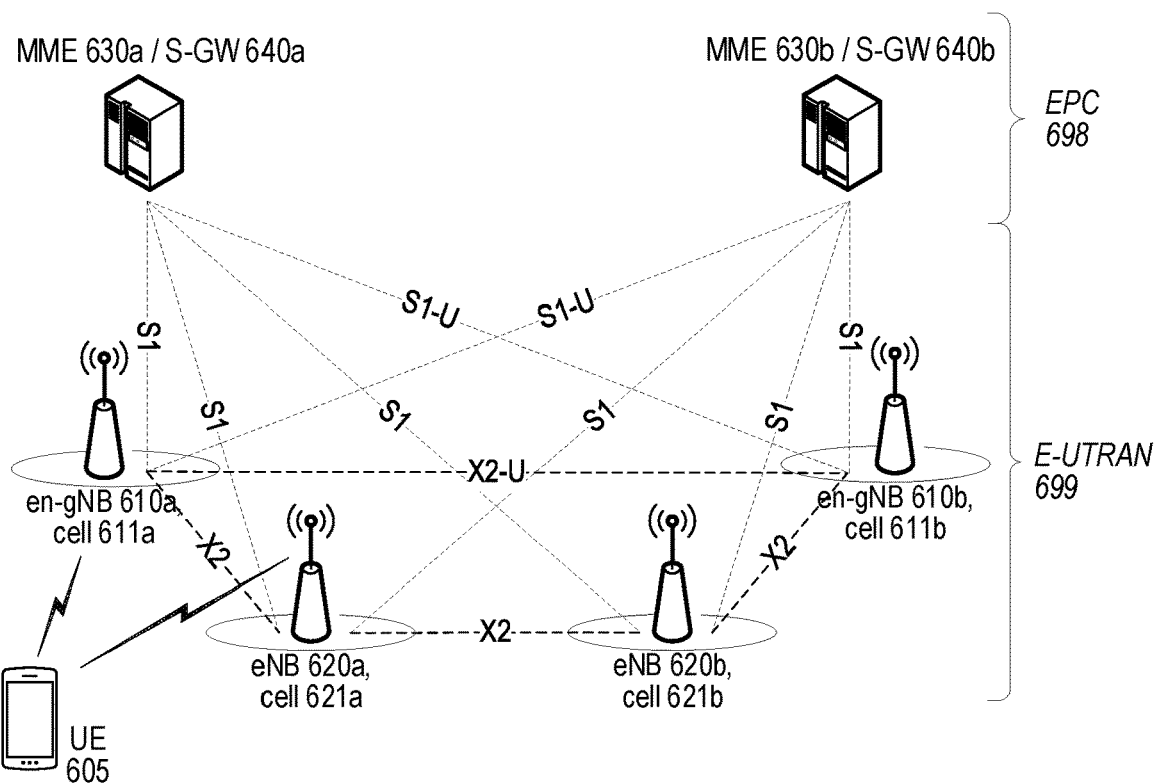
FIGS. 6-7 show high-level views of exemplary network architectures that support multi-RAT DC (MR-DC) using EPC and 5GC, respectively.

FIG. 6 shows a high-level view of an exemplary network architecture that supports EN-DC, including an E-UTRAN 699 and an EPC 698. As shown in the figure, E-UTRAN 699 can include en-gNBs 610 (e.g., 610a,b) and eNBs 620 (e.g., 620a,b) that are interconnected with each other via respective X2 (or X2-U) interfaces. The eNBs 620 can be similar to those shown in FIG. 1, while the ng-eNBs can be similar to the gNBs shown in FIG. 5 except that they connect to EPC 698 via an S1-U interface rather than to a 5GC via an X2 interface. The eNBs also connect to EPC 698 via an S1 interface, similar to the arrangement shown in FIG. 1. More specifically, en-gNBs 610 (e.g., 610a,b) and eNBs 620 (e.g., 620a,b) connect to MMEs (e.g., MMEs 630a,b) and S-GWs (e.g., S-GWs 640a,b) in EPC 698.

Each of the en-gNBs and eNBs can serve a geographic coverage area including one more cells, including cells 611a-b and 621a-b shown as exemplary in FIG. 6. Depending on the particular cell in which it is located, a UE 605 can communicate with the en-gNB or eNB serving that particular cell via the NR or LTE radio interface, respectively. In addition, UE 605 can be in EN-DC connectivity with a first cell served by an eNB and a second cell served by an en-gNB, such as cells 620a and 610a shown in FIG. 6.

Figure 7:
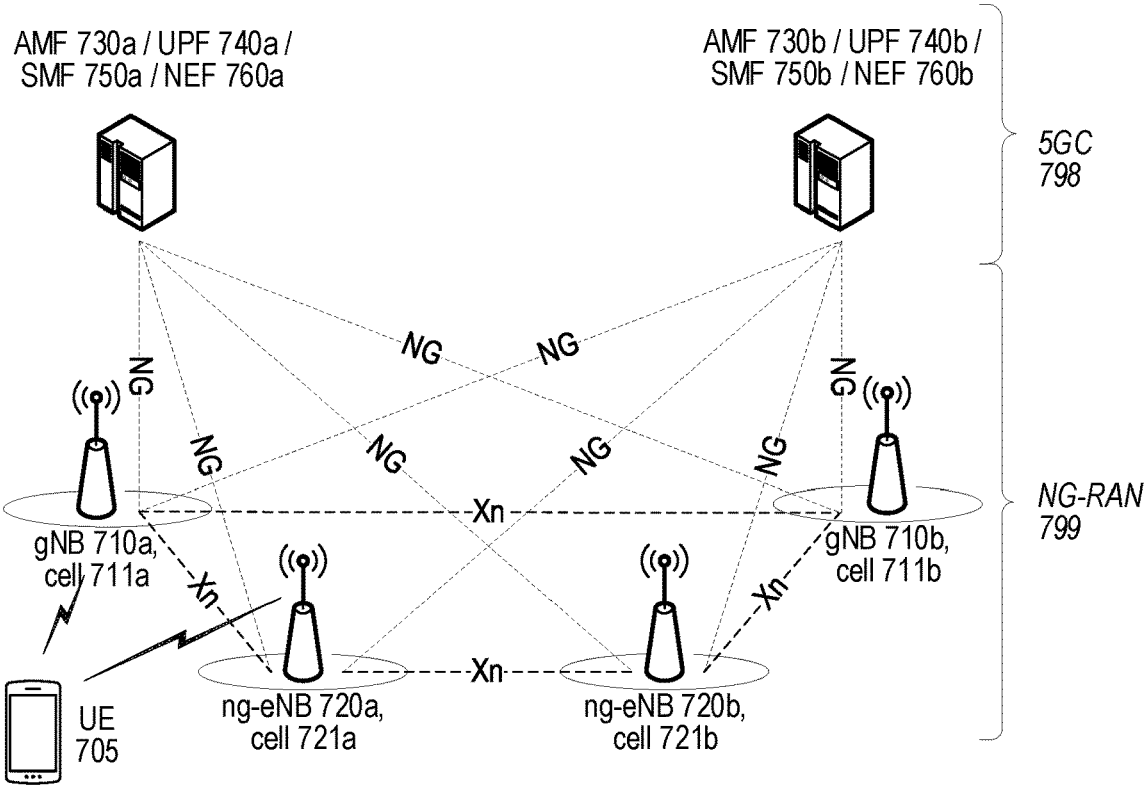

FIG. 7 shows a high-level view of an exemplary network architecture that supports MR-DC configurations based on a 5GC. More specifically, FIG. 7 shows an NG-RAN 799 and a 5GC 798. NG-RAN 799 can include gNBs 710 (e.g., 710a,b) and ng-eNBs 720 (e.g., 720a,b) that are interconnected with each other via respective Xn interfaces. The gNBs and ng-eNBs are also connected via the NG interfaces to 5GC 798, more specifically to the AMF (Access and Mobility Management Function) 730 (e.g., AMFs 730a,b) via respective NG-C interfaces and to the UPF (User Plane Function) 740 (e.g., UPFs 740a,b) via respective NG-U interfaces. Moreover, the AMFs 730a,b can communicate with one or more session management functions (SMFs, e.g., SMFs 750a,b) and network exposure functions (NEFs, e.g., NEFs 760a,b).

Figure 1:
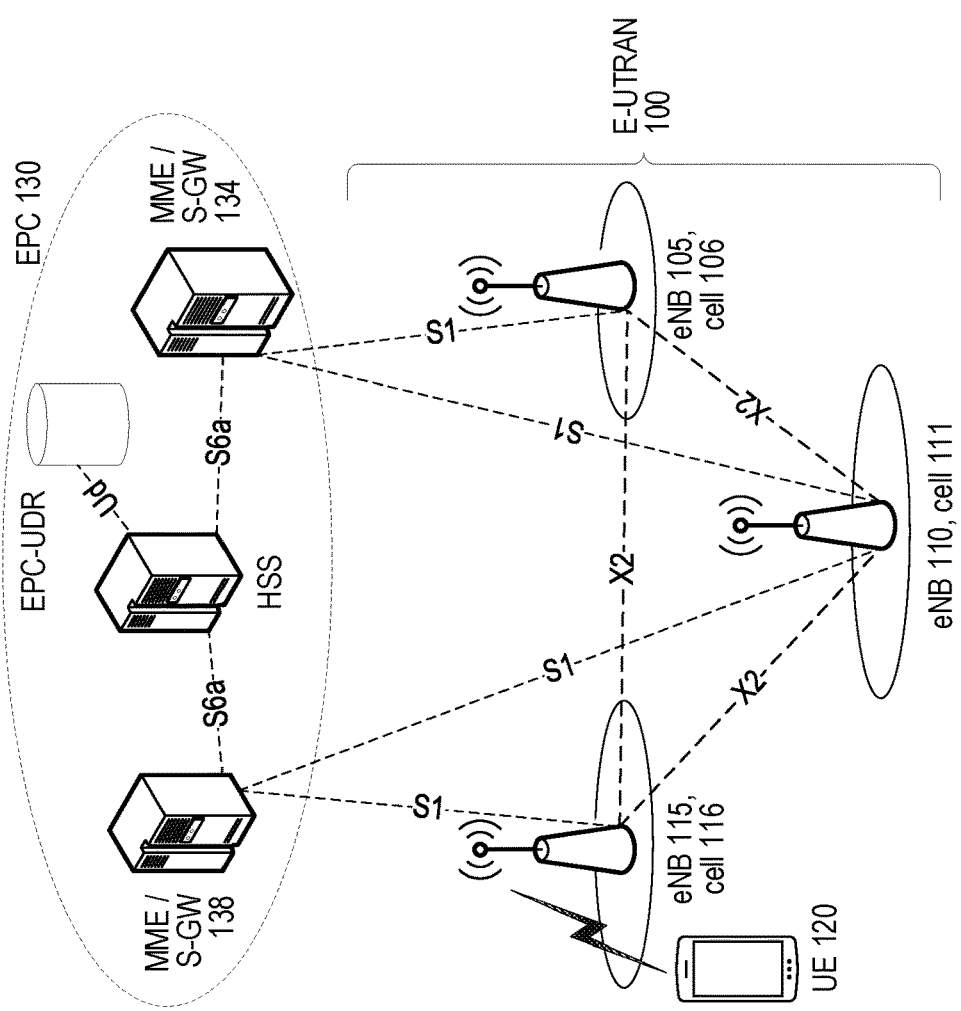
FIG. 1 is a high-level block diagram of an exemplary architecture of the Long-Term Evolution (LTE) Evolved UTRAN (E-UTRAN) and Evolved Packet Core (EPC) network, as standardized by 3GPP.

Each of the gNBs 710 can be similar to those shown in FIG. 5, while each of the ng-eNBs can be similar to the eNBs shown in FIG. 1 except that they connect to 5GC 798 via an NG interface rather than to EPC via an S1 interface. Each of the gNBs and ng-eNBs can serve a geographic coverage area including one more cells, including cells 711a-b and 721a-b shown as exemplary in FIG. 7. The gNBs and ng-eNBs can also use various directional beams to provide coverage in the respective cells. Depending on the particular cell in which it is located, a UE 705 can communicate with the gNB or ng-eNB serving that particular cell via the NR or LTE radio interface, respectively. In addition, UE 705 can be in MR-DC connectivity with a first cell served by an ng-eNB and a second cell served by a gNB, such as cells 720a and 710a shown in FIG. 7.

Figure 8:
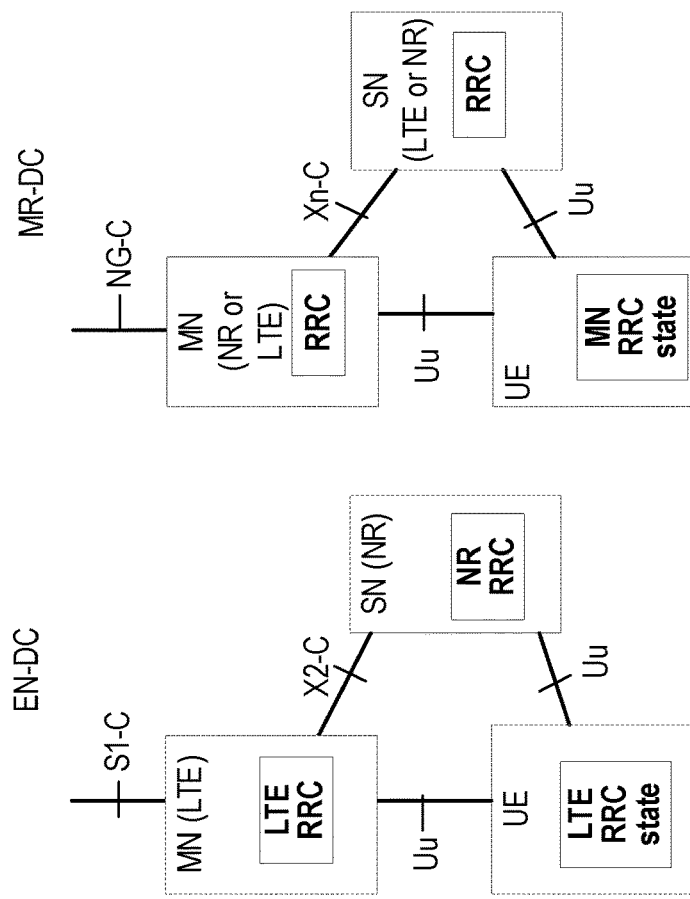
FIG. 8 is a block diagram showing a high-level comparison of CP architectures of two DC alternatives, EN-DC with EPC and MR-DC with 5GC, respectively.

FIG. 8 is a block diagram showing a high-level comparison of control plane (CP) architectures in EN-DC with EPC (e.g., FIG. 6) and MR-DC with 5GC (e.g., FIG. 7). The particular RATs used by MN and SN in these two architectures are shown in parentheses and discussed in more detail above. In either case, the UE has a single RRC state based on the MN RRC (LTE or NR) and a single CP connection towards the CN via Uu interface to MN and S1-C or NG-C interface to CN, as the case may be. RRC PDUs generated by the SN can be transported via the X2-C or Xn-C interface to the MN (as the case may be) and the Uu interface from MN to UE. The MN always sends the initial SN RRC configuration via MCG SRB (SRB1), but subsequent reconfigurations may be transported via MN or SN. When transporting RRC PDU from the SN, the MN does not modify the UE configuration provided by the SN.

For E-UTRAN (e.g., eNB) connected to EPC, SRB1 uses E-UTRA PDCP at initial connection establishment. If the UE supports EN-DC, MCG SRB1 and SRB2 can be configured by the network to both use E-UTRA PDCP or both use NR PDCP after initial connection establishment, regardless of whether EN-DC is configured. Change from E-UTRA PDCP to NR PDCP (or vice-versa) is supported via a handover procedure (e.g., reconfiguration with mobility) or, for the initial change of SRB1 from E-UTRA PDCP to NR PDCP, with a reconfiguration without mobility before the initial security activation.

If the SN is a gNB (i.e., for EN-DC, NGEN-DC and NR-DC), the UE can be configured to establish SRB3 with the SN to enable RRC PDUs for the SN to be sent directly between the UE and the SN. RRC PDUs for the SN can only be transported directly to the UE for SN RRC reconfiguration not requiring any coordination with the MN. Measurement reporting for mobility within the SN can be done directly from the UE to the SN if SRB3 is configured.

Split SRB is supported for all MR-DC options, allowing duplication of RRC PDUs generated by the MN, via the direct path and via the SN. Split SRB uses NR PDCP.

Figure 9:
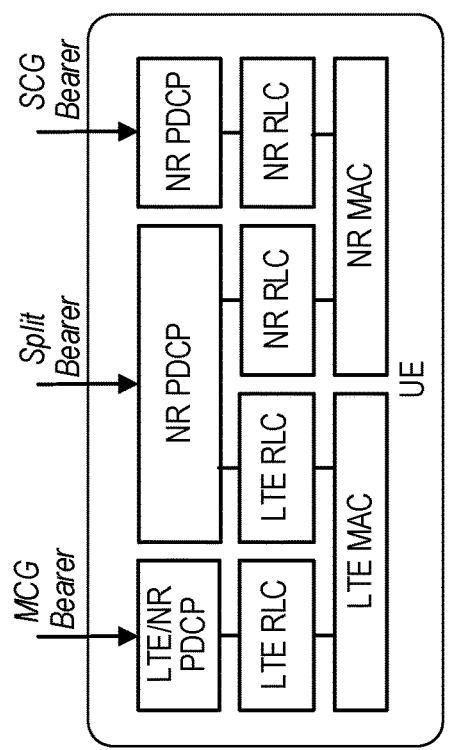
FIGS. 9-10 show user plane (UP) radio protocol architectures from a UE perspective for EN-DC with EPC and MR-DC with 5GC, respectively.
Figure 10:
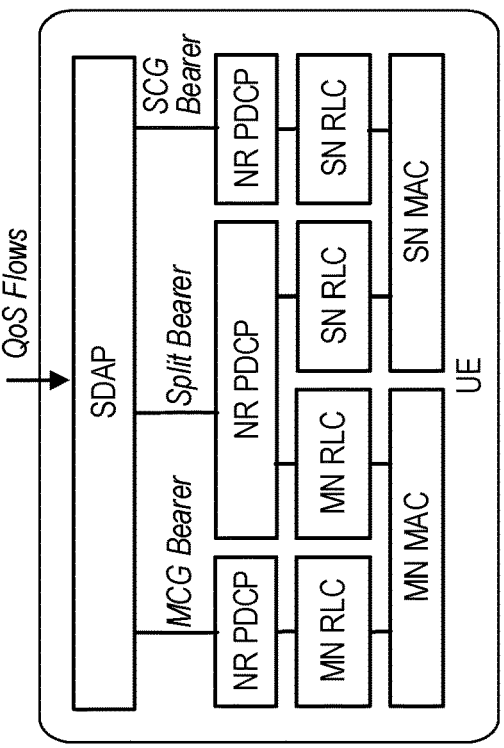

FIGS. 9-10 show UP radio protocol architectures from a UE perspective for MR-DC with EPC (e.g., EN-DC) and with 5GC (e.g., NGEN-DC, NE-DC, and NR-DC), respectively. In both cases, a UE supports MCG, SCG, and split bearers, as discussed above. In the EN-DC arrangement shown in FIG. 9, MCG bearers have either LTE (e.g., E-UTRA) or NR PDCP and LTE RLC and MAC layers, while SCG bearers have NR PDCP, RLC, and MAC layers. Split bearers have NR PDCP layer and both LTE and NR RLC and MAC layers. In the arrangement shown in FIG. 10, all bearers have NR PDCP layers and lower layers corresponding to the RAT used by the MN and SN. One difference between the architectures in FIGS. 9-10 is that the various bearers for MR-DC with 5GC are associated with QoS flows that are terminated in an SDAP layer above PDCP.

Figure 11:
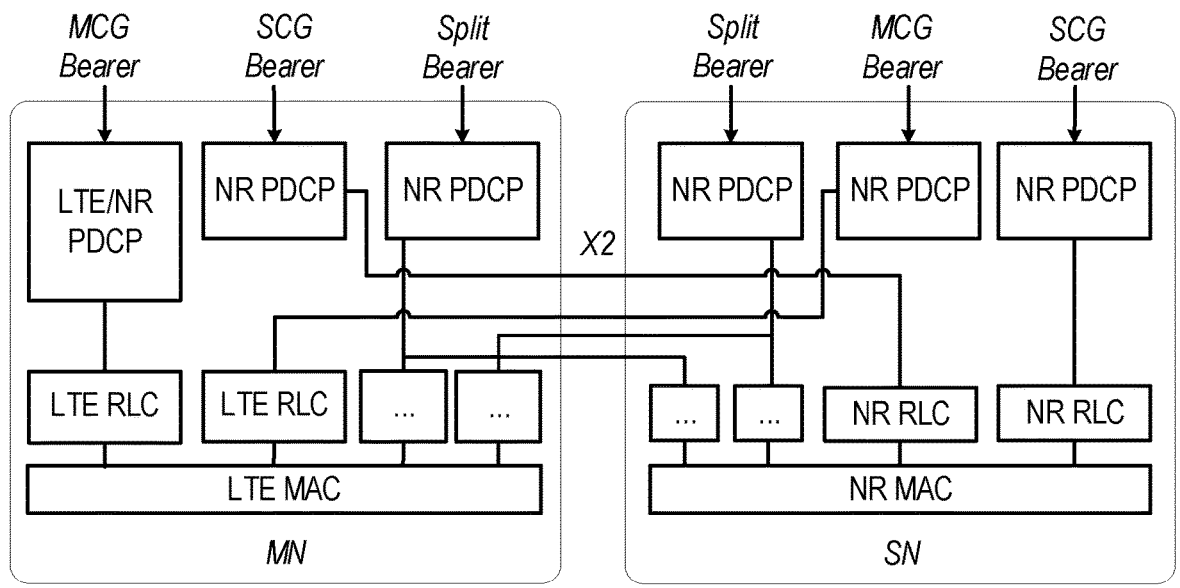
FIGS. 11-12 show UP radio protocol architectures from a network perspective for EN-DC with EPC and MR-DC with 5GC, respectively.
Figure 12:
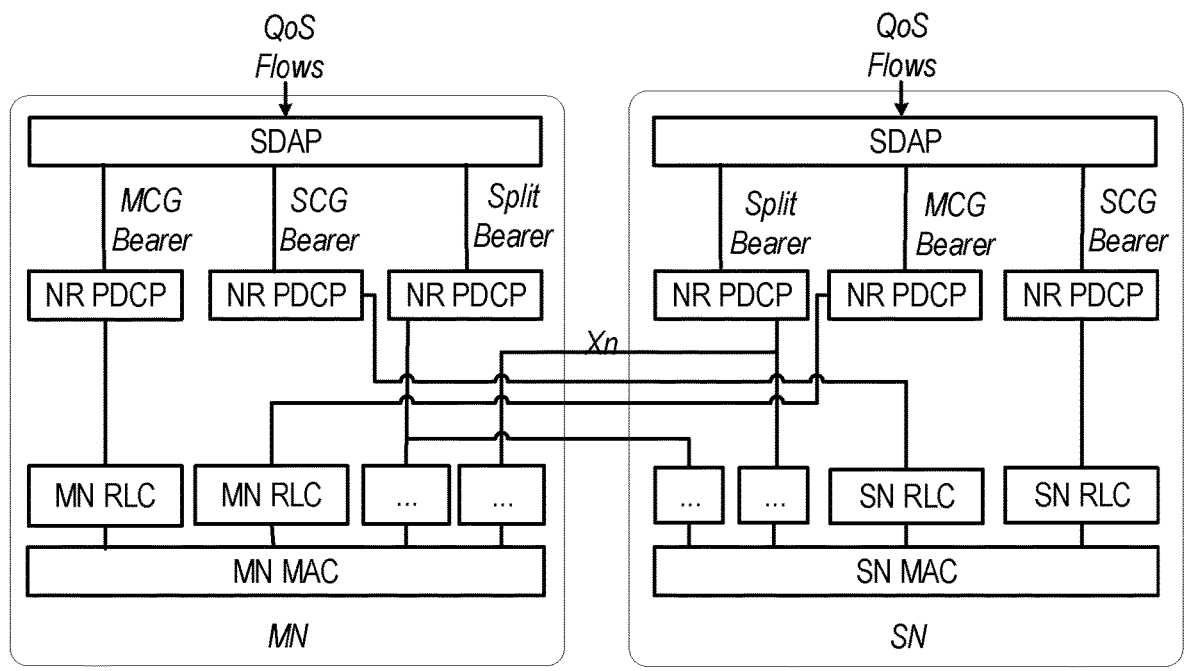

FIGS. 11-12 show UP radio protocol architectures from a network perspective for MR-DC with EPC (e.g., EN-DC) and with 5GC (e.g., NGEN-DC, NE-DC, and NR-DC), respectively. In the EN-DC arrangement shown in FIG. 11, an MCG bearer terminated in MN has PDCP layer of the RAT used by the MN, while all other bearers have NR PDCP layer. All bearers have lower layers associated with the RAT of the node(s) in which they are terminated. In the arrangement shown in FIG. 12, all bearers have NR PDCP layers and lower layers associated with the RAT of the node(s) in which they are terminated. From a network perspective, each MCG, SCG, or and split bearer can be terminated either in MN or in SN. For example, the X2 or Xn interface between the nodes will carry traffic for SCG or split bearers terminated in MN PDCP layer to lower layers in SN. Likewise, X2 or Xn will carry traffic for MCG or split bearers terminated in SN PDCP layer to lower layers in MN. One difference between the architectures in FIGS. 11-12 is that the various bearers for MR-DC with 5GC are associated with QoS flows that are terminated.

Densification via the deployment of more and more base stations (e.g., macro or micro base stations) is one of the mechanisms that can be employed to satisfy the increasing demand for bandwidth and/or capacity in mobile networks, which is mainly driven by the increasing use of video streaming services. Due to the availability of more spectrum in the millimeter wave (mmW) band, deploying small cells that operate in this band is an attractive deployment option for these purposes. However, the normal approach of connecting the small cells to the operator's backhaul network with optical fiber can end up being very expensive and impractical. Employing wireless links for connecting the small cells to the operator's network is a cheaper and more practical alternative.

One such approach is an integrated access backhaul (IAB) network where the operator can repurpose radio resources conventionally used for network access (e.g., by wireless devices or UEs) for connecting small cells to the operator's backhaul network. IAB was studied earlier in the scope of 3GPP Long Term Evolution (LTE) Rel-10. That work produced an architecture based on a Relay Node (RN) with the functionality of an LTE eNB and UE modem. The RN is connected to a donor eNB which has a S1/X2 proxy functionality hiding the RN from the rest of the network. That architecture enabled the Donor eNB to also be aware of the UEs behind the RN and hide any UE mobility between Donor eNB and Relay Node(2) on the same Donor eNB from the CN. During the Rel-10 study, other architectures were also considered including, e.g., where the RNs are more transparent to the Donor gNB and allocated a separate stand-alone P/S-GW node.

Figure 13:
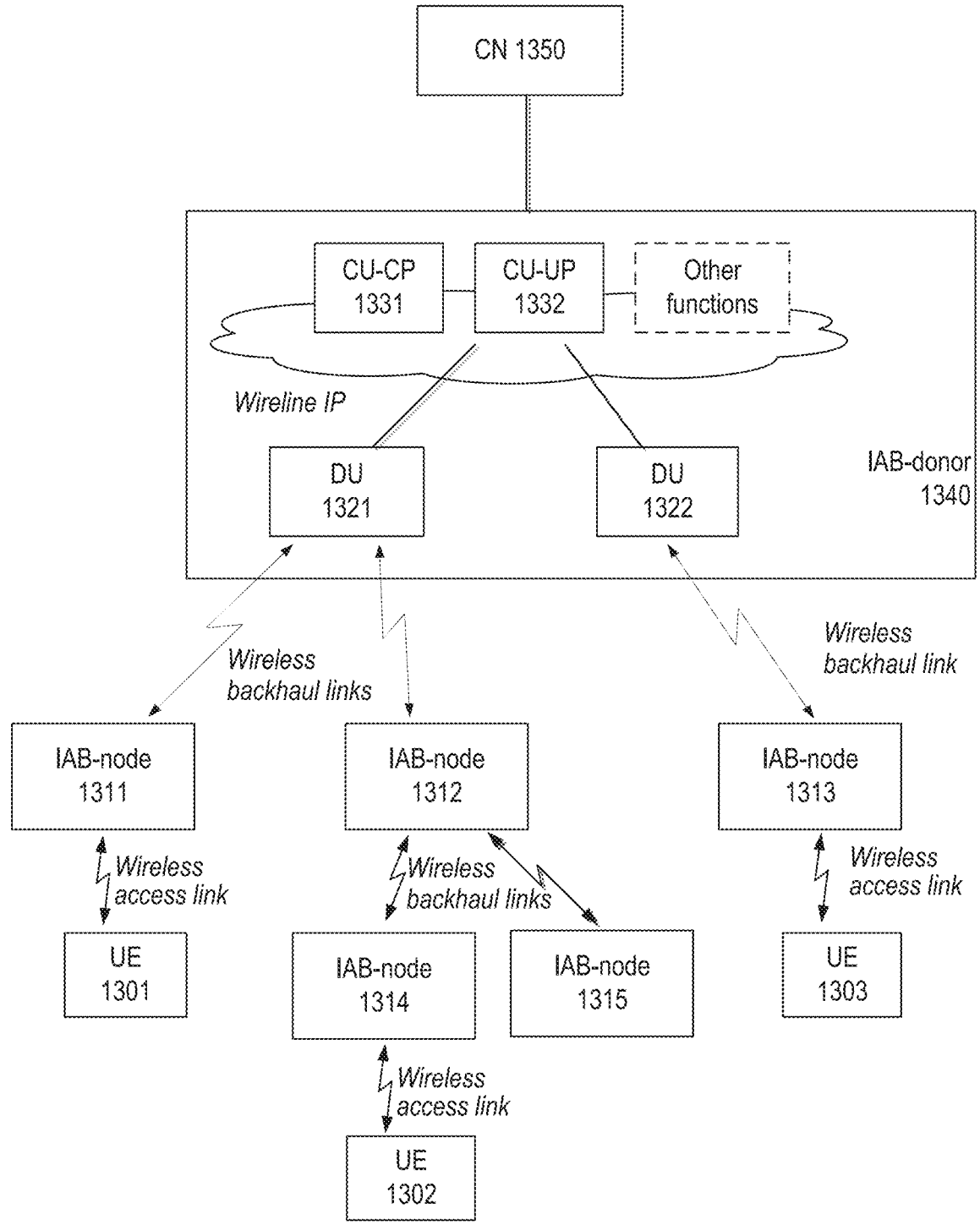
FIG. 13 shows a reference diagram for an integrated access backhaul (IAB) network in standalone mode.

FIG. 13 shows a reference diagram for an IAB network in standalone mode, as further explained in 3GPP TR 38.874 (v0.2.1). The IAB network shown in FIG. 13 includes one IAB-donor 1340 and multiple IAB-nodes 1311-1315, all of which can be part of a radio access network (RAN 1399) such as an NG-RAN. IAB donor 1340 includes DUs 1321, 1322 connected to a CU 330, which is represented by functions CU-CP 1331 and CU-UP 1332. IAB donor 1340 can communicate with core network (CN) 1350 via the CU functionality shown.

Each of the IAB nodes 1311-1315 connects to the IAB-donor via one or more wireless backhaul links (also referred to herein as "hops"). More specifically, the Mobile-Termination (MT) function of each IAB-node 1311-1315 terminates the radio interface layers of a wireless backhaul link towards a corresponding "upstream" (or "northbound") DU function. This MT functionality is similar to functionality that enables UEs to access the IAB network and, in fact, has been specified by 13GPP as part of the Mobile Equipment (ME).

In the context of FIG. 13, upstream DUs can include either DU 1321 or 1322 of IAB donor 1340 and, in some cases, a DU function of an intermediate IAB node that is "downstream" (or "southbound") from IAB donor 1340. As a more specific example, IAB-node 1314 is downstream from IAB-node 1312 and DU 1321, IAB-node 1312 is upstream from IAB-node 1314 but downstream from DU 1321, and DU 1321 is upstream from IAB-nodes 1312 and 1314. The DU functionality of IAB nodes 1311-1315 also terminates the radio interface layers of wireless access links towards UEs (e.g., for network access via the DU) and wireless backhaul links towards other downstream IAB nodes.

As shown in FIG. 13, IAB-donor 1340 can be treated as a single logical node that comprises a set of functions such as gNB-DUs 1321-1322, gNB-CU-CP 1331, gNB-CU-UP 1332, and possibly other functions. In some deployments, the IAB-donor can be split according to these functions, which can all be either co-located or non-co-located as allowed by the 3GPP NG-RAN architecture. Also, some of the functions presently associated with the IAB-donor can be moved outside of the IAB-donor if such functions do not perform IAB-specific tasks.

In general, the 3GPP IAB specifications reuse existing functions and interfaces defined in NR. In particular, the existing MT, gNB-DU, gNB-CU, UPF, AMF, and SMF as well as the corresponding interfaces NR Uu (between MT and gNB), F1, NG, X2 and N4 are used as baseline for the IAB architectures. For example, each IAB-node DU connects to the IAB-donor CU using a modified form of F1, which is referred to as F1*. The user-plane portion of F1* (referred to as "F1*-U") runs over RLC channels on the wireless backhaul between the MT on the serving IAB-node and the DU on the IAB donor.

Figure 14:
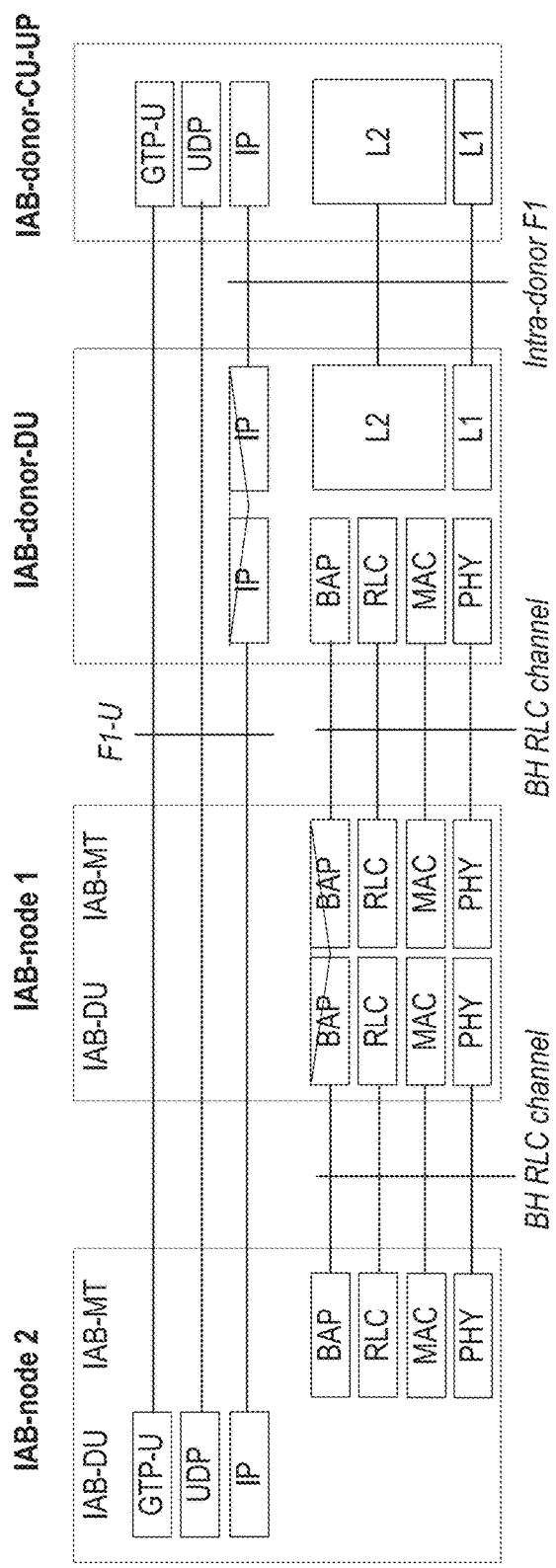
FIGS. 14 and 15 show exemplary IAB user plane (UP) and control plane (CP) protocol stacks, respectively, as defined for 3GPP Rel-16.
Figure 15:
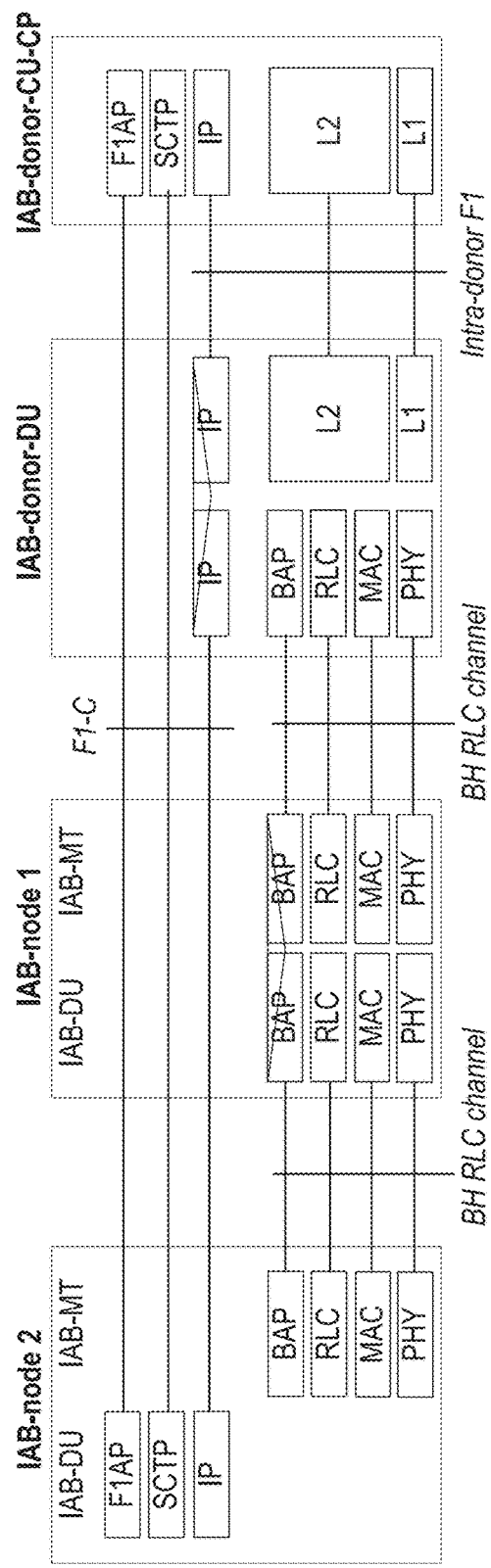

FIGS. 14 and 15 show exemplary IAB UP and CP protocol stacks, respectively, as defined in 3GPP Rel-16. As shown in these figures, the chosen protocol stacks reuse the current CU-DU split specified in 3GPP Rel-15. The full F1-U interface (GTP-U/UDP/IP) and the full F1-C interface (F1-AP/SCTP/IP) are terminated at the IAB node like a conventional DU. Network Domain Security (NDS) can be used to protect both UP and CP traffic: IPsec for UP, datagram transport layer security (DTLS) for CP. IPsec could also be used for the CP protection instead of DTLS.

A Backhaul Adaptation Protocol (BAP) layer has been introduced in the IAB nodes and the IAB donor. The BAP layer routes packets to the appropriate downstream/upstream node. The BAP layer also maps UE bearer data to the proper backhaul RLC channel (also referred to herein as "backhaul RLC bearers"), as well as between ingress and egress backhaul RLC channels in intermediate IAB nodes. In particular, a node is a receiver on its ingress BH RLC channels and a transmitter on its egress BH RLC channels, irrespective of whether the direction is upstream or downstream in the IAB network. The BAP layer can be configured to satisfy the end to end QoS requirements of bearers.

On the IAB-node, the BAP sublayer contains one BAP entity at the MT function and a separate collocated BAP entity at the DU function. On the IAB-donor-DU, the BAP sublayer contains only one BAP entity. Each BAP entity has a transmitting part and a receiving part. Each transmitting part of a BAP entity on one end of a backhaul link has a corresponding receiving part of a BAP entity at the other end of the backhaul link across the backhaul link (e.g., in an IAB-node or an IAB-donor-DU, as the case may be).

In general, a BAP sublayer expects lower layers per RLC entity to provide acknowledged or unacknowledged data transfer service for BAP SDUs. In addition, the BAP sublayer supports the following functions:

Data transfer;
Determination of BAP destination and path for packets from upper layers;
Determination of egress BH RLC channels for packets routed to next hop;
Routing of packets to next hop;
Differentiating traffic to be delivered to upper layers from traffic to be delivered to egress link; and
Flow control feedback and polling signaling.

Figure 16:
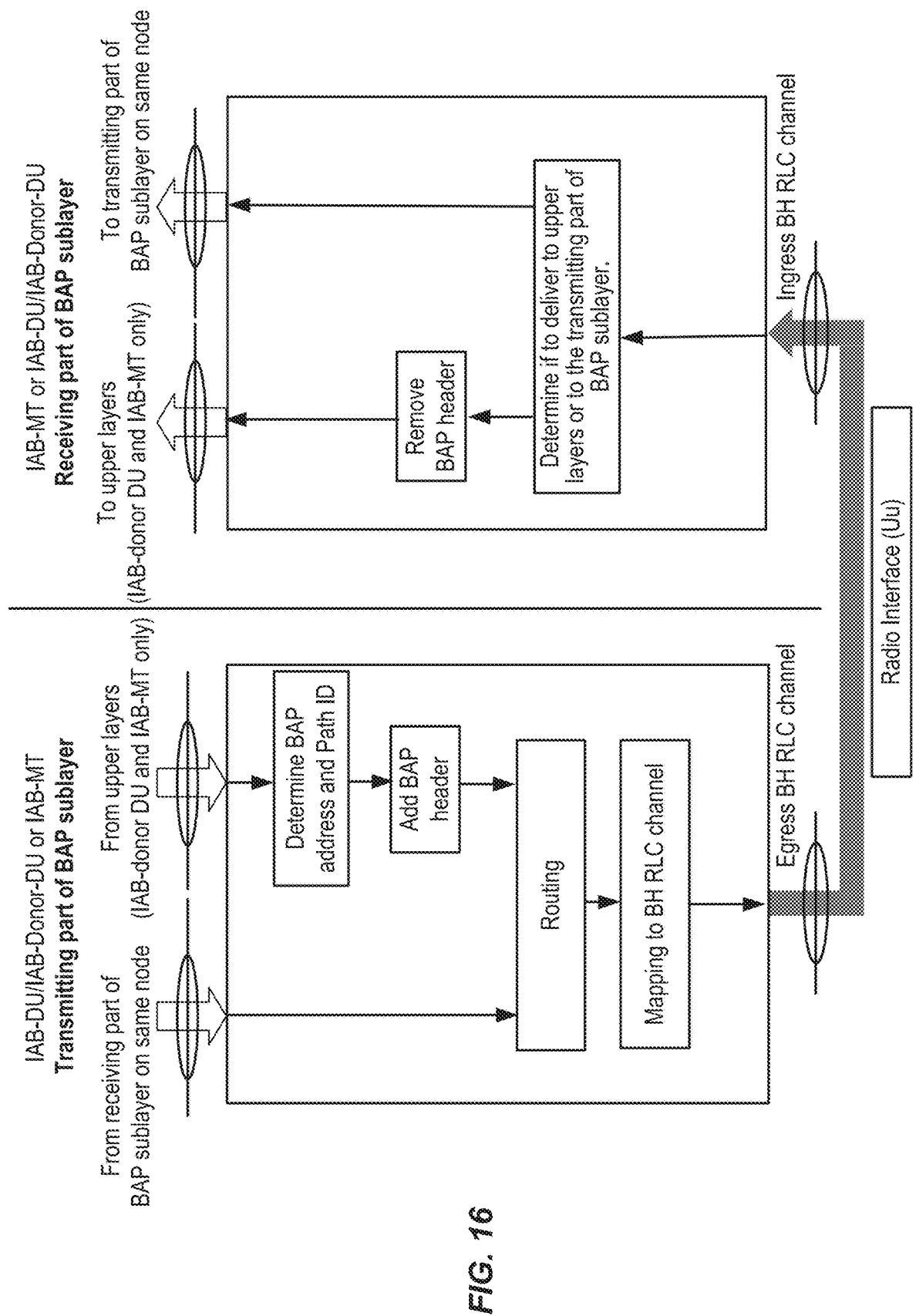
FIG. 16 shows an exemplary functional view of the IAB backhaul adaptation protocol (BAP) sublayer, based on the radio interface protocol architecture defined in 3GPP TS 38.300.

FIG. 16 shows an exemplary functional view of the IAB BAP sublayer, based on the radio interface protocol architecture defined in 3GPP TS 38.300 (v16.1.0). As shown in FIG. 16, the receiving part on the BAP entity delivers BAP PDUs (e.g., received on an ingress BH RLC channel) to the transmitting part on the BAP entity in the same node (e.g., MT to DU or vice versa). Likewise, the receiving part may deliver BAP SDUs to the transmitting part on the BAP entity in the same node (e.g., for transmission on an egress BH RLC channel). When passing BAP SDUs, the receiving part removes the BAP PDU header and the transmitting part adds the BAP header with the same BAP routing ID as carried on the BAP PDU header prior to removal. Passing BAP SDUs in this manner is therefore functionally equivalent to passing BAP PDUs, in implementation.

As briefly mentioned above, Quality of Experience (QoE) measurements have been specified for UEs operating in LTE networks and in earlier-generation UMTS networks.

Measurements in both networks operate according to the same high-level principles. Their purpose is to measure the experience of end users when using certain applications over a network.

For example, QoE measurements for streaming services and for MTSI (Mobility Telephony Service for IMS) are supported in LTE.

QoE measurements may be initiated towards the RAN from an O&M node generically for a group of UEs (e.g., all UEs meeting one or more criteria), or they may also be initiated from the CN to the RAN for a specific UE. The configuration of the measurement includes the measurement details, which is encapsulated in a container that is transparent to RAN.

A "TRACE START" SAP message is used by the LTE EPC for initiating QoE measurements by a specific UE. This message carries details about the measurement configuration the application should collect in the "Container for application layer measurement configuration" IE, which transparent to the RAN. This message also includes details needed to reach the TCE to which the measurements should be sent.

FIGS. 17A-D show various procedures between a UTRAN and a UE for QoE measurements in a legacy UMTS network. As shown in FIG. 17A, the UTRAN can send a UE Capability Enquiry message to request the UE to report its application layer measurement capabilities. As shown in FIG. 17B, the UE can provide its application layer measurement capabilities to the UTRAN via a UE Capability Information message, particularly in a "Measurement Capability" IE that includes information related to UE capability to perform the QoE measurement collection for streaming services and/or MTSI services. Table 1 below shows exemplary contents of this IE:

TABLE 1

| IE/Group name | Need | Type and reference | Semantics description | Version |
|---|---|---|---|---|
| QoE Measurement Collection for streaming services | CV-not_iRAT_HoInfo | Enumerated (TRUE) | TRUE means that the UE supports QoE Measurement Collection for streaming services. | REL-14 |
| QoE Measurement Collection for MTSI services | CV-not_iRAT_HoInfo | Enumerated (TRUE) | TRUE means that the UE supports QoE Measurement Collection for MTSI services. | REL-15 |

The UTRAN can respond with a UE Capability Information Confirm message. FIG. 17C shows that the UTRAN can send a Measurement Control message containing "Application layer measurement configuration" IE in order to configure QoE measurement in the UE. Table 2 below shows exemplary contents of this IE:

TABLE 2

| IE/Group name | Need | Type and reference | Version |
|---|---|---|---|
| Container for application layer measurement configuration | MP | Octet string (1 . . . 1000) | REL-14 |
| Service type | MP | Enumerated (QoEStreaming, QoEMTSI) | REL-15 |

FIG. 17D shows that the UE can send QoE measurement results via UTRAN to the TCE using a Measurement Report message that includes an "Application layer measurement reporting" IE. Table 3 below shows exemplary contents of this IE:

TABLE 3

| IE/Group name | Need | Type and reference | Version |
|---|---|---|---|
| Container for application layer measurement reporting | MP | Octet string (1 . . . 8000) | REL-14 |
| Service type | MP | Enumerated (QoEStreaming, QoEMTSI) | REL-15 |

FIGS. 18A-C illustrate a procedure between an E-UTRAN and a UE for configuring QoE measurements in an LTE network. FIG. 18A shows an exemplary UE capability transfer procedure used to transfer UE radio access capability information from the UE to E-UTRAN. Initially, the E-UTRAN can send a UECapabilityInquiry message, similar to the U-TRAN arrangement shown in FIG. 17A. The UE can respond with a UECapabilityInformation message that includes a "UE-EUTRA-Capability" IE. The E-UTRAN can respond with a UECapabilityInformation-Confirm message.

This IE may further include a UE-EUTRA-Capability-v1530 IE, which can be used to indicate whether the UE supports QoE Measurement Collection for streaming services and/or MTSI services. In particular, the UE-EUTRA-Capability-v1530 IE can include a "measParameters-v1530" IE containing the information about the UE's measurement support. In some cases, the "UE-EUTRA-Capability" IE can also include a "UE-EUTRA-Capability-v16xy-IE", which can include a "qoe-Extensions-r16" field. FIG. 18B shows an exemplary ASN.1 data structure for these various IEs, with the various fields defined in Table 4 below.

TABLE 4

| Field name | Description |
|---|---|
| qoe-MeasReport | Indicates whether the UE supports QoE Measurement Collection for streaming services. |
| qoe-MTSI-MeasReport | Indicates whether the UE supports QoE Measurement Collection for MTSI services. |
| qoe-Extensions | Indicates whether the UE supports the Rel-16 extensions for QoE Measurement Collection, i.e., support of more than one QoE measurement type at a time and signaling of withinArea, sessionRecordingIndication, qoe-Reference, temporaryStopQoE and restartQoE |

TABLE 4-continued

| Field name | Description |
| --- | --- |
| temporaryStopQoE | Indicates that reporting, but not collection, of QoE measurements shall be temporarily stopped. |
| withinArea | Indicates at handover, for each application layer measurement, whether the new cell is inside the area for the measurement, i.e., whether the UE is allowed to start new measurements in the cell |
| restartQoE | Indicates that QoE measurements can be reported again after a temporary stop. |

FIG. 18C shows an exemplary ASN.1 data structure for the qoe-Reference parameter mentioned in Table 4 above.

FIGS. 19A-C illustrate various aspects of QoE measurement collection for a UE in an LTE network. In particular, FIG. 19A shows an exemplary signal flow diagram of a QoE measurement collection process for LTE. To initiate QoE measurements, the serving eNB sends to a UE in RRC_CONNECTED state an RRCConnectionReconfiguration message that includes a QoE configuration file, e.g., a measConfgAppLayer IE within an OtherConfg IE. As discussed above, the QoE configuration file is an application-layer measurement configuration received by the eNB (e.g., from EPC) encapsulated in a transparent container, which is forwarded to UE in the RRC message. The UE responds with an RRCConnectionReconfigurationComplete message. Subsequently, the UE performs the configured QoE measurements and sends a MeasReportAppLayer RRC message to the eNB, including a QoE measurement result file. Although not shown, the eNB can forward this result file transparently (e.g., to EPC).

FIG. 19B shows an exemplary ASN.1 data structure for a measConfigAppLayer IE, including a measConfigAppLayerToAddModList-r16 and a measConfigAppLayerToRelease-List-r16. The former may be used to add or modify multiple QoE measurement configurations (up to maxQoE-Measurement-r16), and the latter may be used to remove multiple QoE measurement configuration (up to maxQoE-Measurement-r16). In the serviceType field, a value of "qoe" indicates Quality of Experience Measurement Collection for streaming services and a value of "qoemtsi" indicates Enhanced Quality of Experience Measurement Collection for MTSI. This field also includes various spare values.

The following procedural statements exemplify desired UE behavior upon reception of the measConfgAppLayer IE in the OtherConfig IE within the RRCReconfiguration:
1> if the received otherConfig includes the measConfigAppLayerToAddModList:
2> for each serviceType and qoe-Reference included in the measConfigAppLayerToAddModList:
2> forward measConfigAppLayerContainer, qoe-Reference and serviceType to upper layers considering the serviceType;
2> consider itself to be configured to send application layer measurement report in accordance with 5.6.19;
2> forward withinArea to upper layers if received;
2> forward temporaryStopQoE to upper layers if received;
2> forward restartQoE to upper layers if received;
1> if the received otherConfig includes the measConfigAppLayerToReleaseList:
2> for each serviceType and qoe-Reference included in the measConfigAppLayerToReleaseList:
2> inform upper layers to clear the associated stored application layer measurement configuration;
2> discard received associated application layer measurement report information from upper layers;
2> consider itself not to be configured to send the associated application layer measurement report for that serviceType and qoe-Reference.

FIG. 19C shows an exemplary ASN.1 data structure for a measReportAppLayer IE, by which a UE can send to the E-UTRAN (e.g., via SRB4) the QoE measurement results of an application (or service). The service for which the report is being sent is indicated in the "serviceType" IE. The measReportAppLayer IE can also include a qoe-reference IE, as discussed above, containing the PLMN identity and an ID associated with the QoE measurement collection.

A UE capable of application layer measurement reporting in RRC_CONNECTED may initiate the procedure when configured with application layer measurement, i.e., when measConfigAppLayer has been configured by E-UTRAN. Upon initiating the procedure, the UE shall:
1> if configured with application layer measurement, and SRB4 is configured, and the UE has received application layer measurement report information from upper layers:
2> set the measReportAppLayerContainer in the MeasReportAppLayer message to the value of the application layer measurement report information;
2> set the serviceType in the MeasReportAppLayer message to the type of the application layer measurement report information;
2> set the qoe-Reference in the MeasReportAppLayer message to the value received from upper layer;
2> set the recordingSessionIndication in the MeasReportAppLayer message to the value received from upper layer;
2> submit MeasReportAppLayer message to lower layers for transmission via SRB4.

Figure 20:
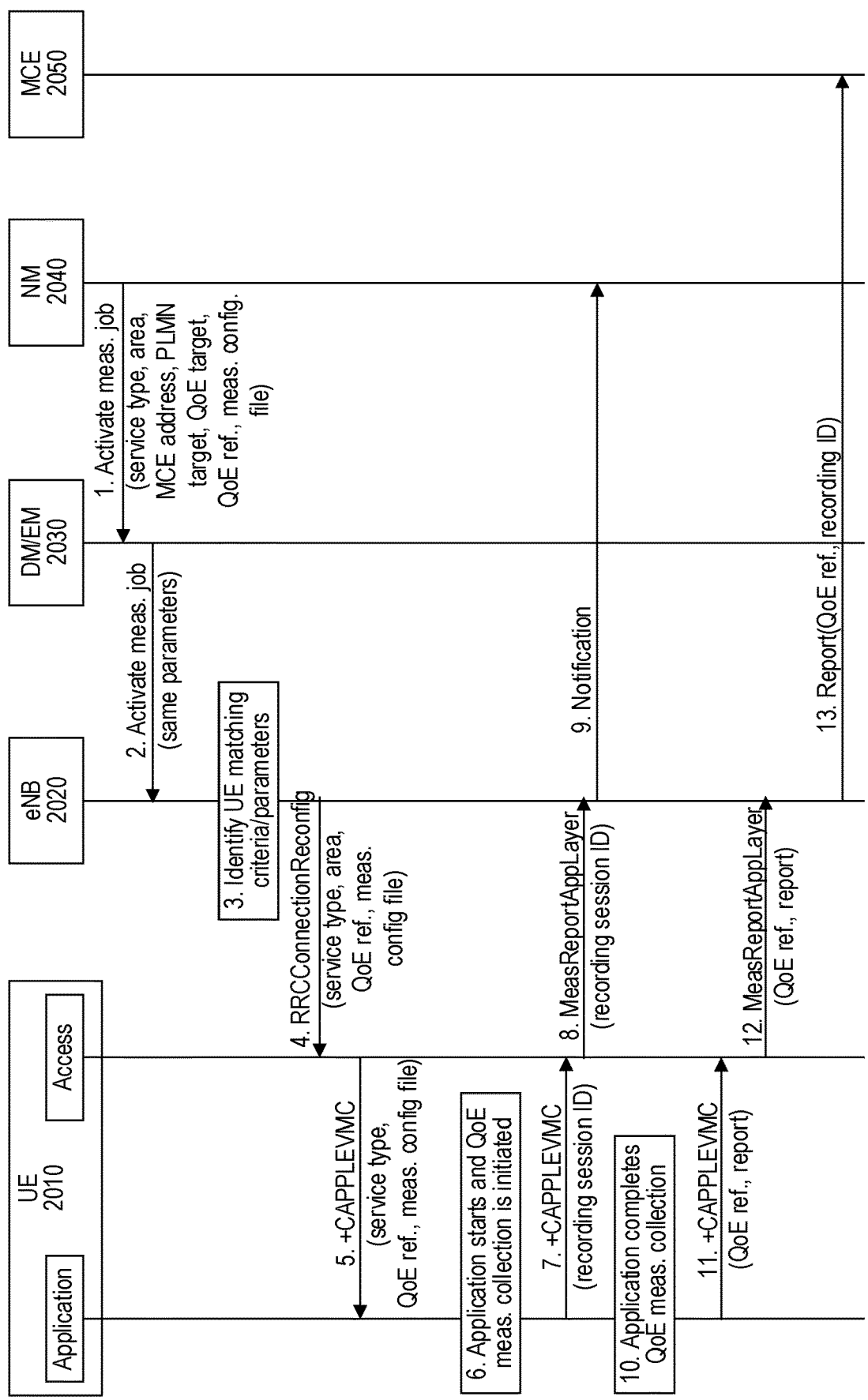
FIG. 20 shows a more detailed signal flow of activation of QoE measurement collection and reporting of collected information for a UE in an LTE network.

FIG. 20 shows a more detailed signal flow of activation of QoE measurement collection and reporting of collected information without UE mobility in an LTE network. This signal flow is between a measurement collection entity (MCE, 2050), a network manager (NM, 2040), a domain manager (DM/EM, 2030), one or more eNBs (2020) in E-UTRAN, and the UE (2010)—particularly access stratum (or access, for short) and application parts of the UE. The following description omits these reference numbers for brevity. Although the operations shown in FIG. are given numerical labels, these labels are intended to facilitate the following description rather than to require and/or imply a particular order of the operations.

In operation 1, the NM sends an Activate Measurement Job message to the DM, which forwards to the message to the eNB in operation 2. The message includes a service type (e.g., streaming), an area scope, a measurement configuration file for the QoE measurements to be performed, and a QoE reference identifier. In operation 3, the eNB identifies served cells matching the area scope, as well as UEs in these served cells that match other parameters in the message (e.g., service type). The eNB can base this determination on UE capability information sent from the UE to the eNB (not shown). The following operations refer to a single matching UE but can be replicated in case of multiple matching UEs.

In operation 4, after identifying the matching UE, the eNB sends an RRCConnectionReconfiguration message to the AS (e.g., RRC layer) of the UE. The eNB includes the service type, the area scope (e.g., one or more cells, tracking areas, etc.), the measurement configuration file, and the QoE reference.

In operation 5, the UE AS forwards this information to the UE application part using an AT command+CAPPLEVMC, as specified in 3GPP TS 27.007 (v16.4.0). In general, AT commands can be used to transfer information between different layers in the UE, such as between application and AS. In particular, AT command+CAPPLEVMC is of the following form when used for QoE measurement configuration:

+CAPPLEVMC: <app-meas_service_type>,<start-stop_reporting>[,<app-meas_config_file_length>,<app-meas_config-file>], where the various fields are defined below:
- <n>: integer type. Disable and enable presentation of the unsolicited result code +CAPPLEVMC to the TE.
  - 0 Disable presentation of the unsolicited result code
  - 1 Enable presentation of the unsolicited result code
- <app-meas_service_type>: integer type. Contains the indication of what application that is target for the application level measurement configuration.
  - 1 QoE measurement collection for streaming services
  - 2 QoE measurement collection for MTSI services
- <start-stop_reporting>: integer type. Indicates the start and stop of the application level measurement reporting for the application indicated by the <app-meas_service_ type>.
  - 0 start the application-level measurement reporting
  - 1 stop the application-level measurement reporting
- <app-meas_config_file_length>: integer type. Indicates the number of octets of the <app-meas_config-file> parameter.
- <app-meas_config-file>: string of octets. Contains the application level measurement configuration file for the application indicated by the <app-meas_service_type>. The parameter shall not be subject to conventional character conversion as per+CSCS.

Returning to the discussion of FIG. 20, in operation 6, the UE starts an application associated with the service type and initiates measurement collection according to the received configuration and area. The UE assigns this measurement collection a recording session ID and reports this ID (in operation 7) to the UE AS using the same AT command. In operation 8, the UE AS sends this ID to the eNB in a MeasReportAppLayer RRC message, and the eNB notifies the NM of the initiation of the measurement collection in operation 9.

The UE application layer completes the QoE measurement collection according to the received configuration (operation 10) and reports the results to the UE AS via AT command +CAPPLEVMR (operation 11) along with the associated QoE reference ID received earlier. The report can be a transparent container, as discussed earlier. AT command+CAPPLEVMC is of the following form when used for QoE measurement reporting:

+CAPPLEVMC=<app-meas_service_type>,<app-meas_report_length>,<app-meas_report> where the various fields are defined below:
- <app_meas_service_type>: integer type. Contains the indication of what application that is providing the application level measurement report.
  - 1 QoE measurement collection for streaming services
  - 2 QoE measurement collection for MTSI services
- <app-meas_report_length>: integer type. Indicates the number of octets of the <app-meas_report> parameter.
- <app-meas_report>: string of octets. Contains the application level measurement configuration file for the application indicated by the <app-meas_service_type>. The parameter shall not be subject to conventional character conversion as per+CSCS.

In operation 12, the UE AS sends the report and the QoE reference ID to the eNB in a MeasReportAppLayer RRC message. The eNB subsequently forwards the report to the MCE (operation 13). In some cases, the MCE may forward the QoE measurement report another entity in the network for analysis and further action (e.g., in the OAM system).

As specified in 3GPP TS 28.405, eNBs are allowed to temporarily stop and restart the QoE measurement reporting when an overload situation is observed at RAN nodes. More specifically, in case of overload in RAN, an eNB may temporarily stop the reporting from the UE by send the RRCConnectionReconfiguration message to relevant UEs. This message includes (in in otherConfig IE) a measConfigAppLayer set to temporarily stop application layer measurement reporting. The UE access stratum sends+CAPPLEVMC AT command to the application layer with the temporary stop request. The application layer stops the reporting and stops recording further information when the data in the reporting container is used. Then the recorded data is kept until it is reported or when the UE request session is ended.

When the overload situation in RAN ends, the eNB restarts UE reporting by sending a RRCConnectionReconfiguration message to relevant UEs. This message includes (in in otherConfig IE) a measConfigAppLayer set to restart application layer measurement reporting. The UE access stratum sends+CAPPLEVMC AT command to the application layer with the restart request. The application layer restarts the reporting and recording if it was stopped.

A new study item for "Study on NR QoE management and optimizations for diverse services" has been approved for NR Rel-16. The purpose is to study solutions for QoE measurements in NR, not only for streaming services as in LTE but also for other services such as augmented or virtual reality (AR/VR), URLLC, etc. Based on requirements of the various services, the NR study will also include more adaptive QoE management schemes that enable intelligent network optimization to satisfy user experience for diverse services.

Similar to LTE, UE QoE measurements made in NG-RAN may be initiated by a management function (e.g., OAM) in a generic way for a group of UEs, or they may be initiated by the core network (e.g., 5GC) towards a specific UE based on signaling with the NG-RAN. As mentioned above, the configuration of the measurement includes the measurement details, which is encapsulated in a container that is transparent to the NG-RAN.

In general, the RAN (e.g., E-UTRAN or NG-RAN) is not aware of an ongoing streaming session for a UE and nor of when QoE measurements are being performed by the UE. Even so, it is important for the client or management function analyzing the measurements that the entire streaming session is measured. It is beneficial, then, that the UE maintains QoE measurements for the entire session, even during handover situation. It has been concluded during a 3GPP study that fragmented QoE reports are of little use. However, it is an implementation decision when RAN stops the QoE measurements. For example, it could be done when the UE has moved outside the measured area, e.g., due to a handover.

Even so, there are various problems, issues, and/or difficulties with current QoE measurement procedures such that they are unable to meet the requirements for the variety of services that will be deployed in 5G networks that may include both E-UTRAN and NG-RAN. For example, current solutions give the UE significant control over when to transmit QoE measurement reports, leaving the network with limited control when such reports are received. This arrangement can lead to RAN overload when multiple UEs configured with QoE measurements send the QoE measurement reports at the same time.

One existing solution is pausing/suspending and restarting QoE measurement reporting in a UE, as discussed above and specified in 3GPP TS 28.405. This technique requires a RAN node to prepare and send RRC messages to respective QoE-configured UEs to indicate that the UEs should stop sending the QoE measurement reports. However, these messages may cause severe QoE issues not only for the UEs set to log the QoE measurement report, but also for other UEs in the same cell(s) that are not configured with QoE measurements.

In addition, as currently decided and/or specified in 3GPP, a UE access layer shall not indicate to the UE application layer when QoE report collection is suspended/stopped by a RAN node. The invisibility of QoE reporting suspension at the application layer may cause backlogging of QoE measurement reports at the access (e.g., RRC) layer. For example, the application layer may continue delivering the QoE reports to the RRC layer that is not allowed to send them to the network.

As such, once the network restarts the QoE reporting by the UE, a large number of UEs starts sending backlogged QoE measurements to the network. This can lead to another overload condition in the network, which the previous reporting suspension was supposed to address. In general, there is no clear solution for how UE access layers should handle the incoming QoE measurement reports from the application layer, regardless of the reason for QoE reporting suspension (including but not limited to overloaded RAN node). Furthermore, storing incoming QoE measurements from the application layer during reporting suspension may require a very large amount of memory at in the UE.

To summarize, the current techniques for delivering QoE measurement reports are inefficient. The existing reporting suspension mechanism may not be able to control the overload situation and, in some cases, may cause extra load to the network.

Accordingly, embodiments of the present disclosure provide techniques that facilitate improved QoE measurement configuration and reporting, particularly in relation to handling QoE measurement reporting in a RAN node (i.e., report receiver) and the UE (i.e., report sender). Embodiments can provide various benefits, advantages, and/or solutions to problems described herein. For example, embodiments enable a RAN node to have more control on delivery of QoE measurement reports by UEs, which can prevent and/or mitigate congestion in the radio interface (e.g., Uu) and potential overload caused by simultaneous delivery of backlogged QoE reports by multiple UEs in the same cell.

In addition, embodiments prevent and/or mitigate exhaustion of limited amounts of UE memory available for storing QoE measurements and measurement reports. For example, embodiments provide a solution for handling the scenario when a second QoE measurement report is received from application layer while the first QoE measurement report is still stored in the UE's memory awaiting transmission.

In the following description of exemplary embodiments, the following groups of terms and/or abbreviations are used synonymously:
"QoE measurement report", "QoE report", "measurement report"; and "report";
"QoE measurement configuration" and "QoE measurement";
"Service" and "application";
"leg" and "path";
"Measurement collection entity", "MCE", "trace collection entity", and "TCE".

Furthermore, the term "multi-connectivity" is used in the following description to mean that data for the measured application session is sent (e.g., duplicated or not duplicated) to the UE via multiple paths, e.g., DC, split bearer, GTP-U multiple tunnels/duplication, BAP duplication, PDCP duplication or CA. In contrast, "dual connectivity" or DC is used to generically refer to any of the specific multi-node configurations discussed above, including LTE-DC, EN-DC, NR-DC, and MR-DC. In general, however, embodiments are applicable to DC as well as single connectivity via LTE or NR.

Figure 21:
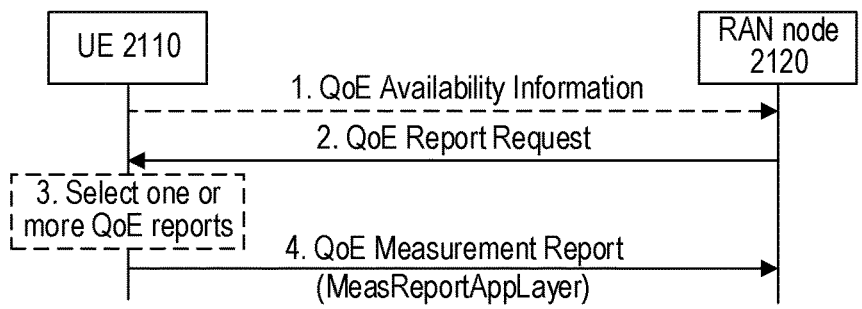
FIG. 21 shows signaling flow diagram between a UE and a RAN node, according to various embodiments of the present disclosure.

Some embodiments can be summarized by FIG. 21, which shows a signal flow diagram between a UE (2110) and a RAN node (2120). In operation 1, which is optional, upon receiving a QoE report from the application layer, a UE access layer sends a QoE measurement report availability flag (or indication) to the RAN node, e.g., via RRC or MAC signaling. In operation 2, the RAN node sends a QoE measurement report request to the UE. This operation can be based on receiving a QoE measurement report availability flag from the UE (e.g., in operation 1), or it can be based on internal polling criteria used by the RAN node, as explained in more detail below. In operation 3, which is optional, the UE can select one or more QoE measurement reports to send to the UE, according to various criteria discussed below. In operation 4, the UE sends the QoE measurement report to the RAN node in response to the QoE measurement report request.

Other embodiments involve techniques for UE access layer handling of multiple QoE measurement reports received from an application layer before delivery to a RAN node. In other embodiments, a RAN node can provide a segmentation configuration for a QoE measurement report to a UE, and the UE can fragment/segment QoE measurement reports according to the received configuration. The RAN node can then assemble the QoE measurement report upon reception of the segments, based on a predefined labeling of the segments.

Various options for the UE access layer sending a QoE measurement report availability flag (or indication) to the RAN node (operation 1 in FIG. 21) are described below. In some embodiments, an indication signal can be based on an existing signal, including RRC messages (e.g., an RRCReconfigurationComplete message in NR or an RRC-ConnectionReconfiguration-Complete message in LTE), and RRC IE (e.g., measReportAppLayer), or MAC-related signals (e.g., MAC CE, since the MAC protocol terminates in the DU).

In some embodiments, the indication signal can be based on a MAC-layer BSR (Buffer Status Report) for a logical channel, by configuring a dedicated logical channel for the SRB or DRB where the QoE report should be transmitted. In such embodiments, since the MAC layer terminates in the DU, a QoE measurement report availability indication signal can be defined for the DU to inform the CU of the availability of the QoE measurement report.

Such embodiments can be applicable to IAB nodes. For example, an IAB-DU serving the UE receives the indication from the UE via MAC CE, as described above. The IAB-DU can use a BAP control PDU to deliver the report availability indication to the IAB-donor. As one example, a BAP control PDU may carry QoE report availability indications for one or more UEs served by the IAB-node sending the BAP control PDU. The BAP control PDU can be delivered hop-by-hop from the IAB-node serving the UEs to the IAB-donor. An existing or a newly-defined BAP control PDU can be used for this purpose.

In case the IAB-donor is a split gNB, the recipient of the BAP control PDU will be the IAB-donor-DU. In that case, it is necessary to define an F1AP message to carry the indication from the IAB-donor-DU to the IAB-donor-CU. This can be a new or an existing F1AP message. Alternatively, the IAB-donor-DU may send the indications received in a BAP control PDU to the IAB-donor-CU via IP layer PDU (i.e., no need to use an F1AP message).

In other embodiments, if the QoE measurement report is delivered over the UP, the report availability indication can be sent from the UE to the network node in the user plane PDU used to deliver QoE reports. This can be a modified existing UP PDU or a newly-defined UP PDU.

In some embodiments, the indication of availability of a QoE measurement report can be complemented by assistance information, that RAN node may use to perform further actions described below. Examples of assistance information include: a validity period of the QoE measurement report; time elapsed since the delivery of the most recent QoE measurement reports from the same UE or group of UEs; an indication of whether the available QoE measurement report is the first, last, or intermediate one for a session; and indication of whether the report contains critical information that requires prompt action (e.g., a measured value exceeds a threshold or satisfy any other predefined criterion that indicates QoE deterioration).

Other possible assistance information (e.g., an "extended QoE report availability indication") can include a number of pending QoE reports, an amount of pending QoE reporting data, and/or an amount of data per pending QoE report. This information enables the gNB to assess the load on the UL transmission resources as well as the gNB's processing resources that will be incurred by retrieval of the UE's pending QoE report(s). In general, the described assistance information can facilitate the network to choose and order in which it requests pending QoE reports from different UEs, how frequently it makes these requests, etc.

In other embodiments, the UE does not send any availability indication to the network, and it is the network's responsibility to poll the UE for possible logged QoE reports.

Various options for the RAN node sending a QoE measurement report request to the UE (operation 2 in FIG. 21) are described below. In some embodiments, the RAN node can request the UE to send a pending QoE measurement report over a particular SRB, e.g., SRB4, SRB5, etc. In another embodiment, the RAN node can instruct the UE to send the QoE measurement report over a data radio bearer (i.e., over the user plane). In other embodiments, the RAN node can instruct the UE to select one of the radio bearers (e.g., SRBs and/or DRBs) autonomously or based on certain rules and/or guidelines.

In some embodiments, RAN node may consider any assistance information included with the availability indication before sending the QoE measurement report request to the UE. This includes any of the assistance information discussed above in relation to FIG. 21 operation 1. The RAN node can use this information to assess the load on the UL transmission resources as well as the gNB's processing resources that will be incurred by retrieval of the UE's pending QoE report(s). For example, the RAN node can use the assistance information to choose and order in which it requests pending QoE reports from different UEs, how frequently it makes requests, etc.

In some embodiments, applicable to IAB nodes, a donor CU instructs a UE to use alternative bearers (e.g., SRBs or DRBs) for sending pending reports in order to avoid congestion. For example, these alternative bearers may use a different BAP path than the BAP path originally used to send the reports, as instructed by the donor CU. In some of these embodiments, the alternative BAP path may traverse different intermediate IAB nodes and/or a different donor DU.

For example, if the alternative bearer for carrying the reports is a data bearer, it may terminate at the same CU-UP used before the overload, or at a different CU-UP. As another example, the same bearer can be used for delivering the pending reports (i.e., no alternative bearer), but this bearer is mapped to another BAP path between the IAB donor and IAB node serving the UE.

In some embodiments, the UE does not send an availability indication; rather, the RAN node polls the UE for possible pending QoE measurement reports. For example, the RAN node can determine when to poll the UE based on its awareness of services/applications actively communicating to and from the UE. Alternately, the RAN node can periodically poll the UE for possible pending QoE measurement reports. Alternately, the RAN node can opportunistically include a request for pending QoE reports in another message (e.g., RRCReconfiguration or MAC message) that the RAN node sends to the UE for other purposes or in relation to another event.

The options mentioned above may also be combined in various ways. For example, the RAN node can opportunistically poll the UE by piggy-backing the request in another message and also use an explicit, non-opportunistic request if the time since the last opportunistic poll exceeds a maximum allowed value (e.g., predetermined threshold). As another example, the RAN node can periodically poll the UE for logged QoE measurement reports when the RAN node becomes aware that the UE has, or is likely to have, started a certain service/application.

Options for the UE sending the QoE measurement report to the RAN node in response to receiving a QoE measurement report request from the RAN node (operation 3 in FIG. 21) include the following:

- If the RAN node instructs the UE to send the QoE measurement report over SRB, the UE sends the QoE measurement report over SRB.
- If the RAN node instructs the UE to send the QoE measurement report over an indicated DRB, the UE sends the measurement over the indicated DRB.
- If the RAN node instructs the UE to send the QoE measurement report over a UE-selected radio bearer (e.g., SRB or DRB), the UE sends the QoE measurement report over a radio bearer selected by the UE. The UE can select the radio bearer autonomously (e.g., based on UE implementation) or based on rules and/or guidelines provided by the RAN node.
- If instructed by the RAN node, the UE sends the report intended for the RAN node to a second RAN node that the UE is connected to (e.g., a second CU). For example, the RAN node and the second RAN node can be in DC with the UE.
- If instructed by the RAN node (e.g., IAB donor CU), the UE uses alternative bearers (e.g., SRB or DRB) to send the pending QoE measurement reports via a different BAP path than the BAP path previously used by the UE to send the reports.

If instructed by the RAN node, the UE sends the QoE measurement report using shared (unlicensed) spectrum.

As briefly mentioned above, certain embodiments involve techniques for UE access layer handling of multiple QoE measurement reports received from an application layer before delivery to a RAN node. These embodiments are described in more detail below. For example, if the UE receives a second QoE measurement report from its application layer while the first QoE measurement report is still stored in the UE's memory awaiting transmission, the UE can do any of the following:

- Delete the first QoE measurement report from the memory and retain the second QoE measurement report in memory.
- Delete the second QoE measurement report from the memory and retain the first QoE measurement report in memory.
- Retain both first and second QoE measurement reports in memory, so long as the number of stored reports does not exceed a maximum number (T).
- Retain the larger or smaller of the first and second reports, recognizing that the larger report probably includes more and/or richer information for the benefit of the network.
- If the first and second reports are for two different applications, retain the report for the more critical application and discard the report for the less critical application. Alternately, the decision can be based on the criticality of the information comprising each report, e.g., retaining reports that indicate QoE deterioration.
- Retain all QoE reports until the UE runs out of memory available for QoE report storage. From that point onwards, the UE may selectively discard QoE reports using any of the above principles.

In some embodiments, in choosing how to handle a second report, the UE may consider additional information related to the timeliness of the application. For example, it may be better to provide the receiver of the QoE measurement report only the most up to date QoE information. As another example, the UE may consider whether the QoE reports pertain to the same or different application sessions and then may choose to keep the one related to the latest application session.

In some embodiments, in choosing how to handle a second report, the UE may consider additional information related to the criticality of the information. For example, it may be better to prioritize a report that indicates a deterioration of the QoE at the application layer.

In some embodiments, the RAN node can configure the UE (e.g., included in or together with the QoE measurement configuration) with various rules, conditions, thresholds, etc. for handling multiple pending QoE measurement reports. For example, the configuration may instruct the UE to keep the oldest or the newest QoE report or to follow any of the above described principles. As another example, the configuration may include a priority order for different applications, where storage of QoE reports pertaining to higher priority applications have precedence over storage of QoE reports pertaining to lower priority applications. As another example, the configuration may include instructions related to sessions of a particular application, such as only retaining reports associated with one session or only the last report for a session. As another example, the RAN node may configure the UE to store QoE reports before polling by the RAN node, but if the UE's memory available for QoE reports is filled up, the UE should start sending stored QoE report(s) unsolicited to the RAN node rather than discarding the stored QoE reports.

This configuration could also include further details, e.g., about which and/or how many QoE report(s) the UE should send when the QoE memory is full. For instance, the UE may be instructed to send stored QoE reports in chronological order (e.g., oldest or newest first), in order of criticality (e.g., based on nature of the application to which they pertain), in order of size (e.g., smallest or largest first), or a combination thereof. As another example, when its QoE report memory fills up, the UE can be configured to send all the stored QoE reports, possibly limited by a maximum number of reports or a maximum amount of reporting data.

When the UE retains multiple QoE measurement reports, certain embodiments include a soliciting mechanism for fetching X QoE measurement reports, where X is an integer satisfying $1 \leq X \leq T$, and T=a maximum number of retained reports. In some embodiments, the UE may indicate the number of available/pending QoE measurement reports to the RAN node together with the availability indicator, discussed above. For example, the number of available reports can be the indicator, or can be provided separately from the indicator (e.g., as different IEs). In various embodiments, the number of available QoE measurement reports can be provided to the RAN node in any of the ways discussed above in relation to the availability indicator.

In some embodiments, the UE can send the availability indication to the RAN node when the number of stored QoE reports reaches a threshold number, N. The UE can explicitly indicate the number, or the number can be implicit from the availability indication. In other embodiments, the UE sends the availability indication to the RAN node when the elapsed time since the first QoE report became available reaches a threshold time, T. The threshold number, N, and the threshold time, T, can be used together, such that the UE sends the availability indication in response to whichever condition happens first. Accordingly, the number of logged QoE measurement reports may be between 1 and N and no QoE report will be stored for a longer time than T without an availability indication being sent.

In some embodiments, the availability indication further includes indications of which applications/services the QoE reports pertain to. In some embodiments, the availability indication further includes an indication of the size of the stored QoE reports combined or the size of each stored QoE report.

Upon reception of a QoE measurement availability indication signal indicating the number of QoE measurement reports, the RAN node may request the UE to send X stored QoE measurement reports. The number X may be explicitly included in the request or may be implicit from the request. The UE can select X stored reports to send (operation 3 in FIG. 21) based on various criteria, discussed below.

In some embodiments, the RAN node may request the UE to send X QoE measurement reports over a particular SRB, e.g., SRB4, SRB5, etc. In other embodiments, the RAN node may request the UE to send X QoE measurement reports over a DRB. In other embodiments, the RAN node can instruct the UE to select one of the radio bearers (e.g., SRBs and/or DRBs) autonomously or based on certain rules and/or guidelines. In some embodiments, the RAN node may instruct the UE to select a combination of radio bearers to send the X QoE measurement reports, e.g., SRB for some QoE measurement reports, DRB for other QoE measurement reports.

In some embodiments, the RAN node may request the UE to selectively send a subset of the stored QoE reports. The RAN node may indicate which stored QoE report(s) the UE should send. For example, this indication could have the form of a bitmap, where each bit corresponds to a stored QoE report. Alternately, this indication could have the form of indices, where each index is associated with a stored QoE. This kind of selective QoE report fetching is facilitated if the availability indication is extended with assistance information beyond the number of available QoE reports, as described in more detail above.

For instance, the RAN node may base the selection of available QoE reports to be fetched on the service(s)/application(s) to which the available QoE report(s) pertain(s). For example, the UE can provide this information together with the availability indication. In such case, the RAN node can select particular QoE reports and explicitly indicated the selection(s) in the request. If the RAN node does not know to which application(s) the QoE report(s) pertain, the RAN node can instead indicate one or more applications of interest in the request. For example, applications of interest could be listed in a priority order, complemented by a maximum number of QoE reports and/or a maximum data volume to send. In such case, the UE would include QoE reports for the indicated applications in priority order, up to the indicated maximum number of QoE reports or maximum data volume.

In some embodiments, the RAN node may indicate a maximum QoE report size to be sent. In such case, the UE sends each of the stored QoE reports whose size is smaller than or equal to the indicated maximum size. This may optionally be complemented with an upper limit on the number of QoE reports to be sent or a maximum combined data volume of the QoE reports to be sent. In other embodiments, the RAN node may indicate a minimum QoE report size of the QoE reports to be sent. In such case, the UE sends each of the stored QoE reports whose size is greater than or equal to the indicated minimum size. This may optionally be complemented with an upper limit on the number of QoE reports to be sent or a maximum combined data volume of the QoE reports to be sent.

Upon reception of a request from RAN node to send the QoE measurement report (as indicated in Step 2), the UE sends X number of QoE measurement reports to the RAN node. The UE can send the X reports over a specific SRB, a specific DRB, or a UE-selected radio bearer, in the same manner as described above in relation to a single report. If the RAN node instructs the UE to send a portion of the X QoE measurement reports over one or more DRBs and another portion of the X QoE measurement report over one or more SRBs, the UE sends the X QoE measurement reports according to the instruction.

Similarly, if the RAN node instructs the UE to send an indicated subset of the stored QoE reports, the UE sends the indicated subset of QoE reports. In case the RAN node indicates the subset of QoE reports in an open-ended manner (e.g., as a prioritized list of applications) together a maximum limit on the number or the data volume of QoE reports, the number X may be flexible/variable based on the number of QoE reports available for the indicated applications, maximum limit, and/or other provided criteria.

As briefly mentioned above, certain embodiments involve a RAN node providing a segmentation configuration for a QoE measurement report to a UE, and the UE can fragment/segment QoE measurement reports according to the received configuration. The RAN node can then assemble the QoE measurement report upon reception of the segments, based on a predefined labeling of the segments. These embodiments are described in more detail below.

In various embodiments, a RAN node may limit the size of a QoE measurement report provided by a UE based on information included in a QoE measurement report configuration. In some embodiments, the RAN node may configure the UE to send QoE measurement report(s) of a particular size, i.e., an actual or required QoE measurement report size.

In some embodiments, the RAN node may configure the UE to send QoE measurement report(s) with an upper size limit (also referred to as "maximum QoE measurement report size"). In other embodiments, the RAN node may configure the UE to send QoE measurement report(s) with a lower size limit (also referred to as "minimum QoE measurement report size"). In either case, the limit may be per report or an aggregate size in case multiple QoE measurement reports are sent. In some embodiments, the RAN node may configure the UE to send QoE measurement report(s) with a size in between a lower limit and an upper limit. Upon receiving the minimum and/or maximum QoE measurement report sizes, the UE access layer (e.g., RRC) can forward this information to the application layer (e.g., via an AT command).

In some embodiments, the RAN node may instruct the UE to segment a QoE measurement report into multiple QoE measurement report segments, each of which is less than or equal to a configured segment size. In some embodiments, the segmentation may only be required for QoE measurement reports larger than a threshold size, which can be considered the segment size. The RAN node may explicitly configure a segment size for QoE measurement reporting or it may configure/indicate the number of segments for each actual QoE measurement report. The RAN node can instruct the UE to use labeling for the segments of the QoE measurement report so the segments can be assembled again at RAN node or at the MCE or OAM system.

Segmentation of a QoE measurement report can be done at the UE's RRC layer or at the application layer. For example, the UE access layer may forward a received segmentation instruction/configuration to the application layer via an AT command.

In some embodiments, the RAN node can instruct the UE to report only a subset of the measurement values collected since the last report. For example, the RAN node can provide one or more threshold criteria, and the UE can report only the measured values that satisfy the threshold criteria. Different threshold criteria can be associated with different parameters and/or parameter types to be measured and reported. In some embodiments, the UE can provide consecutive measurement values that do not meet the threshold criteria in a simpler way, i.e., by providing an average of these values.

Figure 22:
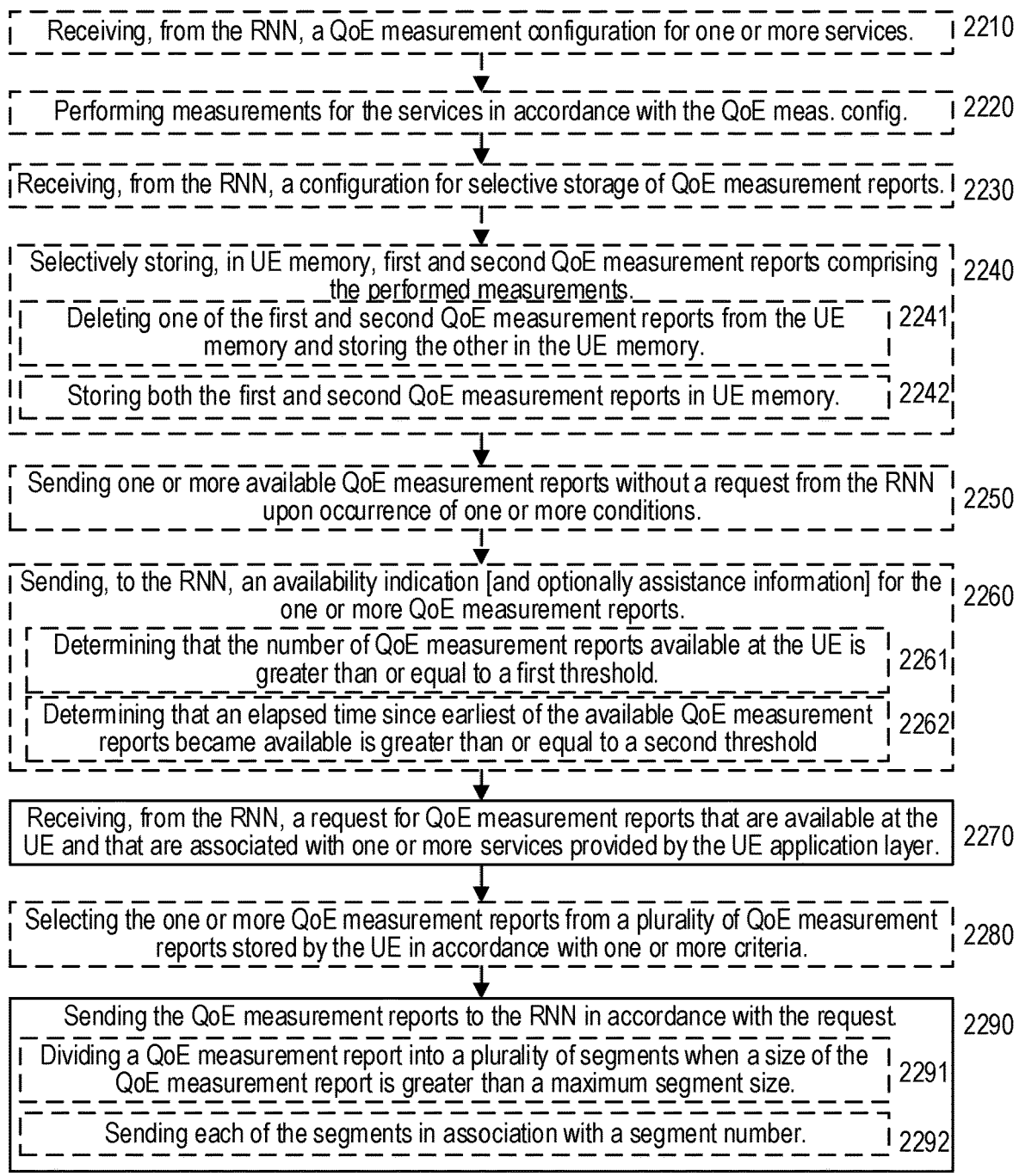
FIG. 22 is a flow diagram of an exemplary method (e.g., procedure) for a UE (e.g., wireless device, IoT device, etc. or component(s) thereof), according to various embodiments of the present disclosure.
Figure 23:
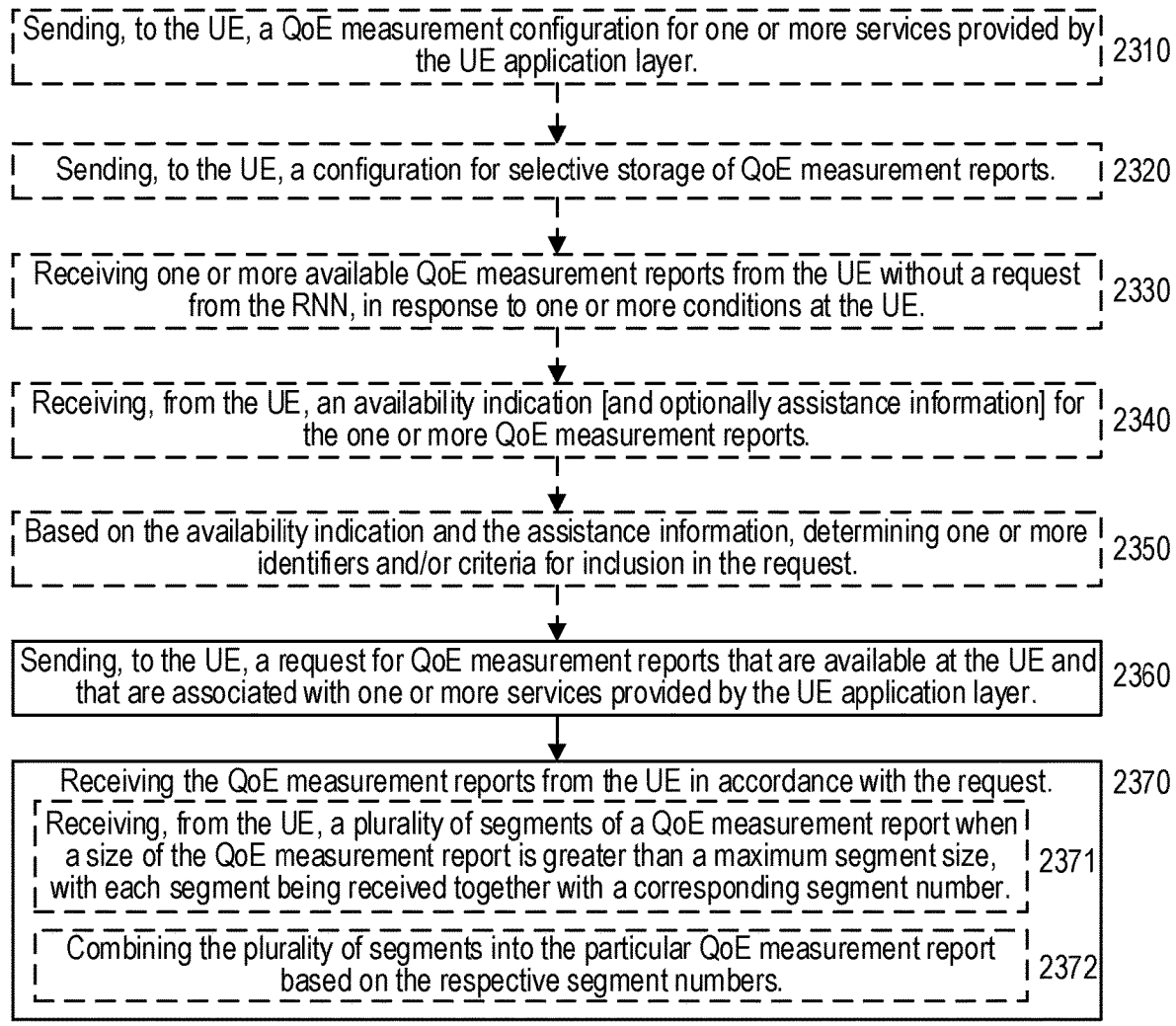
FIG. 23 is a flow diagram of an exemplary method (e.g., procedure) for a RAN node (RNN, e.g., eNB, gNB, ng-eNB, en-gNB, etc. or component(s) thereof), according to various embodiments of the present disclosure.

The embodiments described above can be further illustrated with reference to FIGS. 22-23, which show exemplary methods (e.g., procedures) performed by a UE and a RAN node (RNN), respectively. In other words, various features of operations described below correspond to various embodiments described above. These exemplary methods can be used cooperatively to provide various exemplary benefits and/or advantages. Although FIGS. 22-23 show specific blocks in a particular order, the operations of the respective methods can be performed in different orders than shown and can be combined and/or divided into blocks having different functionality than shown. Optional blocks or operations are indicated by dashed lines.

In particular, FIG. 22 shows a flow diagram of an exemplary method (e.g., procedure) for performing quality of experience (QoE) measurements configured by a wireless network, according to various exemplary embodiments of the present disclosure. The exemplary method can be performed by a UE (e.g., wireless device, IoT device, modem, etc. or component thereof) in communication with a radio access network node (RNN, e.g., base station, eNB, gNB, ng-eNB, en-gNB, etc., or component thereof) in the wireless network (e.g., E-UTRAN, NG-RAN).

The exemplary method can include operations of block 2270, where the UE can receive, from an RNN in the wireless network, a request for QoE measurement reports that are available at the UE and that are associated with one or more services provided by the UE application layer. The exemplary method can also include operations of block 2290, where the UE can send one or more QoE measurement reports to the RNN in accordance with the request.

In some embodiments, the sending operations of block 2290 can include the operations of sub-blocks 2291-2292 for each particular QoE measurement report. In sub-block 2291, the UE can divide the particular QoE measurement report into a plurality of segments when the size of the particular QoE measurement report is greater than a maximum segment size. In sub-block 2292, the UE can send the plurality of segments to the RNN. Each segment is sent together with a corresponding segment number. Note that QoE measurement reports of size less than the maximum segment size will generally be sent without segmentation (e.g., single segment).

In some of these embodiments, the request (e.g., in block 2270) can include a segmentation configuration for QoE measurement reports, and the segmentation configuration can include the maximum segment size.

In some embodiments, the exemplary method can also include operations of block 2260, where the UE can send, to the RNN, an availability indication for the one or more QoE measurement reports. In such embodiments, the request can be received (e.g., in block 2270) in response to the availability indication. In some of these embodiments, the availability indication can be sent together with one or more of the following assistance information:
time elapsed since the most recent QoE measurement report from the UE,
number of QoE measurement reports available at the UE,
amount of data comprising QoE measurement reports available at the UE,
amount of data comprising each available QoE measurement report,
validity period for each available QoE measurement report,
indication of whether each available QoE measurement report is a first, last, or intermediate report for an application session, and
indication of whether each available QoE measurement report contains critical information.

In some embodiments sending the availability indication (e.g., in block 2260) can include the operations of sub-block 2261 and/or sub-block 2262. In sub-block 2261, the UE can determine that the number of QoE measurement reports available at the UE is greater than or equal to a first threshold. In sub-block 2262, the UE can determine that an elapsed time since the earliest of the available QoE measurement reports became available is greater than or equal to a second threshold. In such embodiments, sending the availability indication can be based on one or both of these determinations, as the case may be.

In some embodiments, the exemplary method can also include the operations of blocks 2210, 2220, and 2240. In block 2210, the UE can receive, from the RNN, a QoE measurement configuration for the one or more services provided by the UE application layer. In block 2220, the UE can perform measurements for the one or more services in accordance with the QoE measurement configuration. In block 2240, the UE can selectively store, in UE memory, first and second QoE measurement reports comprising the performed measurements. In some of these embodiments, the exemplary method can also include the operations of block 2230, where the UE can receive, from the RNN, a configuration for selective storage of QoE measurement reports by the UE. In such embodiments, selectively storing is performed (e.g., in block 2240) in accordance with the configuration for selective storage.

In some embodiments, the configuration for selective storage can include storage priorities based on one or more of the following: respective ages of the reports, respective application sessions associated with the QoE measurement reports, respective criticalities of the services associated with the QoE measurement reports, and respective criticalities of the information comprising the QoE measurement reports. In some embodiments, the configuration for selective storage can include a first threshold for UE sending of unsolicited QoE measurement reports, discussed in more detail below.

In some embodiments, the selectively storing operations in block 2240 can include operations of sub-block 2241 or sub-block 2242. In sub-block 2241, the UE can delete one of the first and second QoE measurement reports from the UE memory and store the other of the first and second QoE measurement reports in the UE memory. In some embodiments, deleting the one and storing the other of the first and second QoE measurement reports can be based on one or more of the following: the respective sizes of the QoE measurement reports, the respective ages of the QoE measurement reports, the respective criticalities of the services associated with the QoE measurement reports, and the respective criticalities of the information comprising the QoE measurement reports.

In sub-block 2242, the UE can store both the first and second QoE measurement reports in the UE memory. In some embodiments, storing both the first and second measurement QoE reports can be based on sufficient UE memory to store both and/or the number of QoE measurement reports available at the UE being less than a first threshold (mentioned above). In some embodiments, the exemplary method can also include the operations of block 2250, where the UE can send one or more available QoE measurement reports without a request from the RNN (i.e., unsolicited) upon occurrence of one or more of the following conditions:
a number of QoE measurement reports available at the UE is greater than or equal to a first threshold; and
insufficient UE memory to store the available QoE measurement reports.

In some embodiments, the request can include one or more criteria for selecting available QoE measurement reports. In such embodiments, the exemplary method can also include the operations of block 2280, where the UE can select the one or more QoE measurement reports from a plurality of QoE measurement reports stored by the UE in accordance with the one or more criteria. In various embodiments, the one or more criteria can include any of the following:
a bitmap comprising a plurality of bits, including one or more bits indicating that the respective one or more QoE measurement reports should be sent by the UE;

one or more indices associated with the respective one or more QoE measurement reports;
a priority order in which QoE measurement reports should be sent by the UE;
a specific number of QoE measurement reports to be sent by the UE;
a specific size for each QoE measurement report to be sent by the UE;
a minimum size for each QoE measurement report to be sent by the UE;
a maximum size for each QoE measurement report to be sent by the UE;
a maximum number of QoE measurement reports to be sent by the UE; and
a maximum combined data volume of QoE measurement reports to be sent by the UE.

In some of these embodiments, the priority order can be based on one more of the following: the respective sizes of the QoE measurement reports, the respective ages of the QoE measurement reports, the respective criticalities of the applications associated with the QoE measurement reports, and the respective criticalities of the information comprising the QoE measurement reports.

In some embodiments, the request (e.g., received in block 2270) can also include one or more of the following transmission instructions for the UE:
identification of one or more radio bearers (e.g., SRBs, DRBs) over which the QoE measurement reports should be sent by the UE,
one or more rules for UE selection of radio bearers for sending the QoE measurement reports,
instruction to send the QoE measurement reports via a second RNN, and
instruction to send the QoE measurement reports via unlicensed spectrum.

In such embodiments, the one or more QoE measurement reports can be sent (e.g., in block 2290) in accordance with the transmission instructions in the request.

In addition, FIG. 23 shows a flow diagram of an exemplary method (e.g., procedure) for configuring QoE measurements by UEs, according to various embodiments of the present disclosure. The exemplary method can be performed by a radio access network node (RNN, e.g., base station, eNB, gNB, ng-eNB, etc., or components thereof) in a wireless network (e.g., E-UTRAN, NG-RAN).

The exemplary method can include the operations of block 2360, where the RNN can send, to a UE, a request for QoE measurement reports that are available at the UE and that are associated with one or more services provided by the UE application layer. The exemplary method can also include the operations of block 2370, where the RNN can receive one or more QoE measurement reports from the UE in accordance with the request.

In some embodiments, the receiving operations of block 2370 can include the operations of sub-blocks 2371-2372 for each particular QoE measurement report. In sub-block 2371, the RNN can receive, from the UE, a plurality of segments of the particular QoE measurement report when the size of the particular QoE measurement report is greater than a maximum segment size. Each segment is received together with a corresponding segment number. In sub-block 2372, the RNN can combine the plurality of segments into the particular QoE measurement report based on the respective segment numbers. Note that QoE measurement reports of size less than the maximum segment size will generally be received without segmentation (e.g., single segment).

In some of these embodiments, the request (e.g., in block 2360) can include a segmentation configuration for QoE measurement reports, and the segmentation configuration can include the maximum segment size.

In some embodiments, the exemplary method can also include the operations of block 2340, where the RNN can receive, from the UE, an availability indication for the one or more QoE measurement reports. In such embodiments, the request can be sent (e.g., in block 2360) in response to the availability indication.

In some embodiments, the availability indication is received (e.g., in block 2340) together with one or more of the following assistance information:
time elapsed since the most recent QoE measurement report from the UE,
number of QoE measurement reports available at the UE,
amount of data comprising QoE measurement reports available at the UE,
amount of data comprising each available QoE measurement report,
validity period for each available QoE measurement report,
indication of whether each available QoE measurement report is a first, last, or intermediate report for an application session, and
indication of whether each available QoE measurement report contains critical information.

In some embodiments, the exemplary method can also include the operations of block 2350, where the RNN can, based on the availability indication and the assistance information, determine one or more of the following for inclusion in the request (e.g., in block 2360):
identifiers associated with the one or more QoE measurement reports,
identifiers of applications associated with the one or more QoE measurement reports, and
one or more criteria for UE selection of available QoE measurement reports.

In various embodiments, the one or more criteria can include any of the following:
a bitmap comprising a plurality of bits, including one or more bits indicating that the respective one or more QoE measurement reports should be sent by the UE;
one or more indices associated with the respective one or more QoE measurement reports;
a priority order in which QoE measurement reports should be sent by the UE;
a specific number of QoE measurement reports to be sent by the UE;
a specific size for each QoE measurement report to be sent by the UE;
a minimum size for each QoE measurement report to be sent by the UE;
a maximum size for each QoE measurement report to be sent by the UE;
a maximum number of QoE measurement reports to be sent by the UE; and
a maximum combined data volume of QoE measurement reports to be sent by the UE.

In some of these embodiments, the priority order can be based on one more of the following: the respective sizes of the QoE measurement reports, the respective ages of the QoE measurement reports, the respective criticalities of the services associated with the QoE measurement reports, and the respective criticalities of the information comprising the QoE measurement reports.

In some embodiments, the request (e.g., sent in block 2360) can also include one or more of the following transmission instructions for the UE:

identification of one or more radio bearers (e.g., SRBs, DRBs) over which the QoE measurement reports should be sent by the UE, one or more rules for UE selection of radio bearers for sending the QoE measurement reports, instruction to send the QoE measurement reports via a second RNN, and instruction to send the QoE measurement reports via unlicensed spectrum.

In such embodiments, the one or more QoE measurement reports can be received (e.g., in block 2370) in accordance with the transmission instructions in the request.

In some embodiments, the exemplary method can also include the operations of block 2310, where the RNN can send, to the UE, a QoE measurement configuration for the one or more services. In such embodiments, the QoE measurement reports (e.g., received in block 2330 and/or 2370) include measurements for the one or more services in accordance with the QoE measurement configuration. In some embodiments, the exemplary method can also include the operations of block 2330, where the RNN can receive one or more available QoE measurement reports from the UE without a request from the RNN (i.e., unsolicited), in response to one or more of the following:

the number of QoE measurement reports available at the UE is greater than or equal to a first threshold; and insufficient UE memory to store available QoE measurement reports.

In some embodiments, the exemplary method can also include the operations of block 2320, where the RNN can send, to the UE, a configuration for selective storage of QoE measurement reports by the UE. In some of these embodiments, the configuration for selective storage can include storage priorities based on one or more of the following: respective ages of the QoE measurement reports, respective application sessions associated with the QoE measurement reports, respective criticalities of the services associated with the QoE measurement reports, and respective criticalities of the information comprising the QoE measurement reports. In some of these embodiments, the configuration for selective storage can include a first threshold for UE sending of unsolicited QoE measurement reports (e.g., such as in block 2330, discussed above).

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 24:
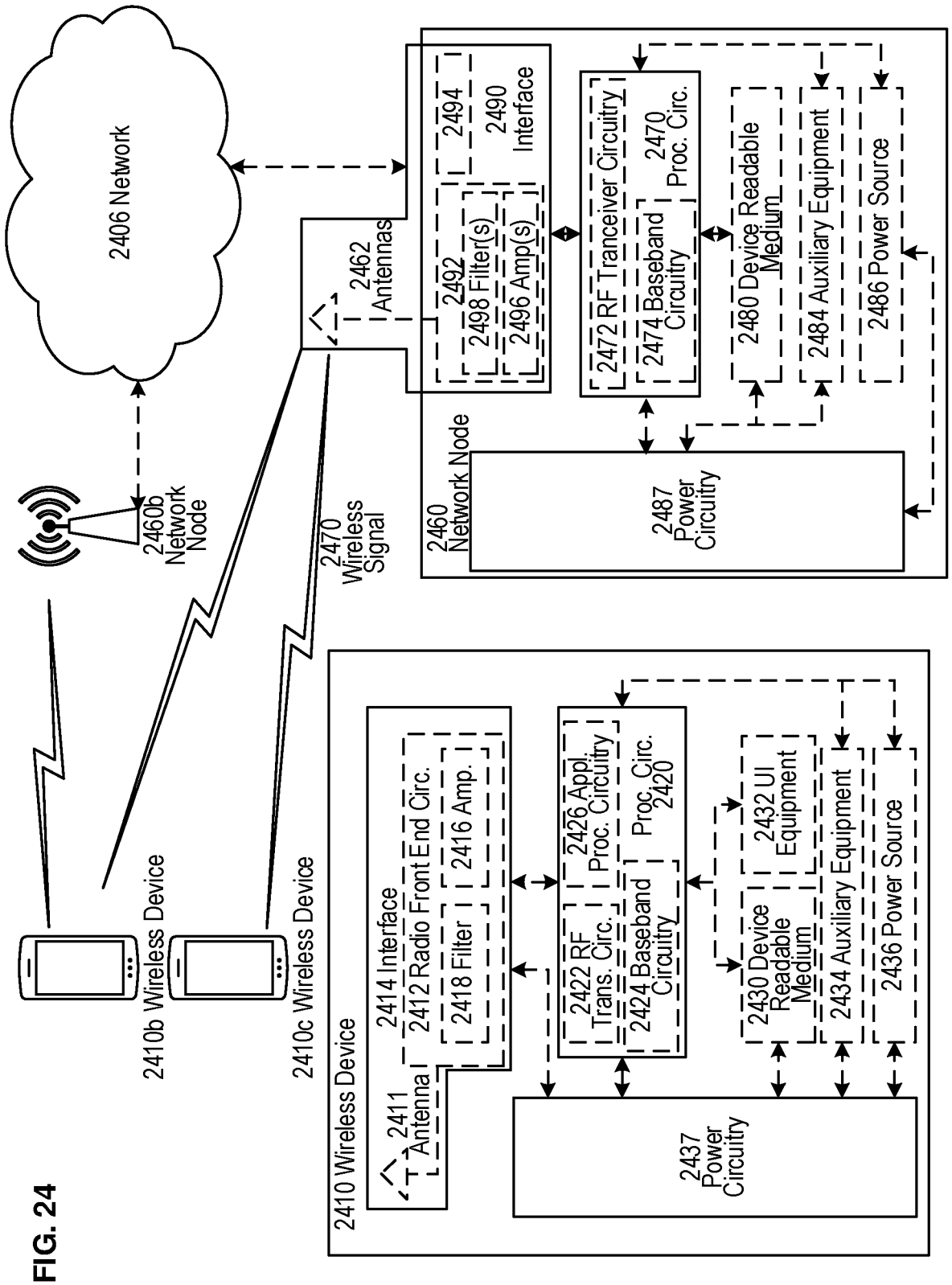
FIG. 24 illustrates a wireless network according to various embodiments of the present disclosure.

For example, FIG. 24 shows an exemplary wireless network in which various embodiments disclosed herein can be implemented. For simplicity, the wireless network of FIG. 24 only depicts network 2406, network nodes 2460 and 2460b, and WDs 2410, 2410b, and 2410c. In practice, a wireless network can further include any additional elements suitable to support communication between wireless devices or between a wireless device and another communication device, such as a landline telephone, a service provider, or any other network node or end device. Of the illustrated components, network node 2460 and wireless device (WD) 2410 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2406 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2460 and WD 2410 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 24, network node 2460 includes processing circuitry 2470, device readable medium 2480, interface 2490, auxiliary equipment 2484, power source 2486, power circuitry 2487, and antenna 2462. Although network node 2460 illustrated in the example wireless network of FIG. 24 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 2460 are depicted as single boxes located within a larger box, or nested within multiple boxes, in practice, a network node can comprise multiple different physical components that make up a single illustrated component (e.g., device readable medium 2480 can comprise multiple separate hard drives as well as multiple RAM modules).

Similarly, network node 2460 can be composed of multiple physically separate components (e.g., a NodeB component and a RNC component, or a BTS component and a BSC component, etc.), which can each have their own respective components. In certain scenarios in which network node 2460 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 2460 can be configured to support multiple radio access technologies (RATs). In such embodiments, some components can be duplicated (e.g., separate device readable medium 2480 for the different RATs) and some components can be reused (e.g., the same antenna 2462 can be shared by the RATs). Network node 2460 can also include multiple sets of the various illustrated components for different wireless technologies integrated into network node 2460, such as, for example, GSM, WCDMA, LTE, NR, WiFi, or Bluetooth wireless technologies. These wireless technologies can be integrated into the same or different chip or set of chips and other components within network node 2460.

Processing circuitry 2470 can be configured to perform any determining, calculating, or similar operations (e.g., certain obtaining operations) described herein as being provided by a network node. These operations performed by processing circuitry 2470 can include processing information obtained by processing circuitry 2470 by, for example, converting the obtained information into other information, comparing the obtained information or converted information to information stored in the network node, and/or performing one or more operations based on the obtained information or converted information, and as a result of said processing making a determination.

Processing circuitry 2470 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 2460, either alone or in conjunction with other network node 2460 components (e.g., device readable medium 2480). Such functionality can include any of the various wireless features, functions, or benefits discussed herein.

For example, processing circuitry 2470 can execute instructions stored in device readable medium 2480 or in memory within processing circuitry 2470. In some embodiments, processing circuitry 2470 can include a system on a chip (SOC). As a more specific example, instructions (also referred to as a computer program product) stored in medium 2480 can include instructions that, when executed by processing circuitry 2470, can configure network node 2460 to perform operations corresponding to various exemplary methods (e.g., procedures) described herein.

In some embodiments, processing circuitry 2470 can include one or more of radio frequency (RF) transceiver circuitry 2472 and baseband processing circuitry 2474. In some embodiments, radio frequency (RF) transceiver circuitry 2472 and baseband processing circuitry 2474 can be on separate chips (or sets of chips), boards, or units, such as radio units and digital units. In alternative embodiments, part or all of RF transceiver circuitry 2472 and baseband processing circuitry 2474 can be on the same chip or set of chips, boards, or units.

In certain embodiments, some or all of the functionality described herein as being provided by a network node, base station, eNB or other such network device can be performed by processing circuitry 2470 executing instructions stored on device readable medium 2480 or memory within processing circuitry 2470. In alternative embodiments, some or all of the functionality can be provided by processing circuitry 2470 without executing instructions stored on a separate or discrete device readable medium, such as in a hard-wired manner. In any of those embodiments, whether executing instructions stored on a device readable storage medium or not, processing circuitry 2470 can be configured to perform the described functionality. The benefits provided by such functionality are not limited to processing circuitry 2470 alone or to other components of network node 2460 but are enjoyed by network node 2460 as a whole, and/or by end users and the wireless network generally.

Device readable medium 2480 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 2470. Device readable medium 2480 can store any suitable instructions, data or information, including a computer program, software, an application including one or more of logic, rules, code, tables, etc. and/or other instructions capable of being executed by processing circuitry 2470 and, utilized by network node 2460. Device readable medium 2480 can be used to store any calculations made by processing circuitry 2470 and/or any data received via interface 2490. In some embodiments, processing circuitry 2470 and device readable medium 2480 can be considered to be integrated.

Interface 2490 is used in the wired or wireless communication of signaling and/or data between network node 2460, network 2406, and/or WDs 2410. As illustrated, interface 2490 comprises port(s)/terminal(s) 2494 to send and receive data, for example to and from network 2406 over a wired connection. Interface 2490 also includes radio front end circuitry 2492 that can be coupled to, or in certain embodiments a part of, antenna 2462. Radio front end circuitry 2492 comprises filters 2498 and amplifiers 2496. Radio front end circuitry 2492 can be connected to antenna 2462 and processing circuitry 2470. Radio front end circuitry can be configured to condition signals communicated between antenna 2462 and processing circuitry 2470. Radio front end circuitry 2492 can receive digital data that is to be sent out to other network nodes or WDs via a wireless connection. Radio front end circuitry 2492 can convert the digital data into a radio signal having the appropriate channel and bandwidth parameters using a combination of filters 2498 and/or amplifiers 2496. The radio signal can then be transmitted via antenna 2462. Similarly, when receiving data, antenna 2462 can collect radio signals which are then converted into digital data by radio front end circuitry 2492. The digital data can be passed to processing circuitry 2470. In other embodiments, the interface can comprise different components and/or different combinations of components.

In certain alternative embodiments, network node 2460 may not include separate radio front end circuitry 2492, instead, processing circuitry 2470 can comprise radio front end circuitry and can be connected to antenna 2462 without separate radio front end circuitry 2492. Similarly, in some embodiments, all or some of RF transceiver circuitry 2472 can be considered a part of interface 2490. In still other embodiments, interface 2490 can include one or more ports or terminals 2494, radio front end circuitry 2492, and RF transceiver circuitry 2472, as part of a radio unit (not shown), and interface 2490 can communicate with baseband processing circuitry 2474, which is part of a digital unit (not shown).

Antenna 2462 can include one or more antennas, or antenna arrays, configured to send and/or receive wireless signals. Antenna 2462 can be coupled to radio front end circuitry 2490 and can be any type of antenna capable of transmitting and receiving data and/or signals wirelessly. In some embodiments, antenna 2462 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 2462 can be separate from network node 2460 and can be connectable to network node 2460 through an interface or port.

Antenna 2462, interface 2490, and/or processing circuitry 2470 can be configured to perform any receiving operations and/or certain obtaining operations described herein as being performed by a network node. Any information, data and/or signals can be received from a wireless device, another network node and/or any other network equipment. Similarly, antenna 2462, interface 2490, and/or processing circuitry 2470 can be configured to perform any transmitting operations described herein as being performed by a network node. Any information, data and/or signals can be transmitted to a wireless device, another network node and/or any other network equipment.

Power circuitry 2487 can comprise, or be coupled to, power management circuitry and can be configured to supply the components of network node 2460 with power for performing the functionality described herein. Power circuitry 2487 can receive power from power source 2486. Power source 2486 and/or power circuitry 2487 can be configured to provide power to the various components of network node 2460 in a form suitable for the respective components (e.g., at a voltage and current level needed for each respective component). Power source 2486 can either be included in, or external to, power circuitry 2487 and/or network node 2460. For example, network node 2460 can be connectable to an external power source (e.g., an electricity outlet) via an input circuitry or interface such as an electrical cable, whereby the external power source supplies power to power circuitry 2487. As a further example, power source 2486 can comprise a source of power in the form of a battery or battery pack which is connected to, or integrated in, power circuitry 2487. The battery can provide backup power should the external power source fail. Other types of power sources, such as photovoltaic devices, can also be used.

Alternative embodiments of network node 2460 can include additional components beyond those shown in FIG. 24 that can be responsible for providing certain aspects of the network node's functionality, including any of the functionality described herein and/or any functionality necessary to support the subject matter described herein. For example, network node 2460 can include user interface equipment to allow and/or facilitate input of information into network node 2460 and to allow and/or facilitate output of information from network node 2460. This can allow and/or facilitate a user to perform diagnostic, maintenance, repair, and other administrative functions for network node 2460.

In some embodiments, a wireless device (WD, e.g., WD 2410) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 2410 includes antenna 2411, interface 2414, processing circuitry 2420, device readable medium 2430, user interface equipment 2432, auxiliary equipment 2434, power source 2436 and power circuitry 2437. WD 2410 can include multiple sets of one or more of the illustrated components for different wireless technologies supported by WD 2410, such as, for example, GSM, WCDMA, LTE, NR, WiFi, WiMAX, or Bluetooth wireless technologies, just to mention a few. These wireless technologies can be integrated into the same or different chips or set of chips as other components within WD 2410.

Antenna 2411 can include one or more antennas or antenna arrays, configured to send and/or receive wireless signals, and is connected to interface 2414. In certain alternative embodiments, antenna 2411 can be separate from WD 2410 and be connectable to WD 2410 through an interface or port. Antenna 2411, interface 2414, and/or processing circuitry 2420 can be configured to perform any receiving or transmitting operations described herein as being performed by a WD. Any information, data and/or signals can be received from a network node and/or another WD. In some embodiments, radio front end circuitry and/or antenna 2411 can be considered an interface.

As illustrated, interface 2414 comprises radio front end circuitry 2412 and antenna 2411. Radio front end circuitry 2412 comprise one or more filters 2418 and amplifiers 2416. Radio front end circuitry 2414 is connected to antenna 2411 and processing circuitry 2420 and can be configured to condition signals communicated between antenna 2411 and processing circuitry 2420. Radio front end circuitry 2412 can be coupled to or a part of antenna 2411. In some embodiments, WD 2410 may not include separate radio front end circuitry 2412; rather, processing circuitry 2420 can comprise radio front end circuitry and can be connected to antenna 2411. Similarly, in some embodiments, some or all of RF transceiver circuitry 2422 can be considered a part of interface 2414. Radio front end circuitry 2412 can receive digital data that is to be sent out to other network nodes or WDs via a wireless connection. Radio front end circuitry 2412 can convert the digital data into a radio signal having the appropriate channel and bandwidth parameters using a combination of filters 2418 and/or amplifiers 2416. The radio signal can then be transmitted via antenna 2411. Similarly, when receiving data, antenna 2411 can collect radio signals which are then converted into digital data by radio front end circuitry 2412. The digital data can be passed to processing circuitry 2420. In other embodiments, the interface can comprise different components and/or different combinations of components.

Processing circuitry 2420 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 2410 functionality either alone or in combination with other WD 2410 components, such as device readable medium 2430. Such functionality can include any of the various wireless features or benefits discussed herein.

For example, processing circuitry 2420 can execute instructions stored in device readable medium 2430 or in memory within processing circuitry 2420 to provide the functionality disclosed herein. More specifically, instructions (also referred to as a computer program product) stored in medium 2430 can include instructions that, when executed by processor 2420, can configure wireless device 2410 to perform operations corresponding to various exemplary methods (e.g., procedures) described herein.

As illustrated, processing circuitry 2420 includes one or more of RF transceiver circuitry 2422, baseband processing circuitry 2424, and application processing circuitry 2426. In other embodiments, the processing circuitry can comprise different components and/or different combinations of components. In certain embodiments processing circuitry 2420 of WD 2410 can comprise a SOC. In some embodiments, RF transceiver circuitry 2422, baseband processing circuitry 2424, and application processing circuitry 2426 can be on separate chips or sets of chips. In alternative embodiments, part or all of baseband processing circuitry 2424 and application processing circuitry 2426 can be combined into one chip or set of chips, and RF transceiver circuitry 2422 can be on a separate chip or set of chips. In still alternative embodiments, part or all of RF transceiver circuitry 2422 and baseband processing circuitry 2424 can be on the same chip or set of chips, and application processing circuitry 2426 can be on a separate chip or set of chips. In yet other alternative embodiments, part or all of RF transceiver circuitry 2422, baseband processing circuitry 2424, and application processing circuitry 2426 can be combined in the same chip or set of chips. In some embodiments, RF transceiver circuitry 2422 can be a part of interface 2414. RF transceiver circuitry 2422 can condition RF signals for processing circuitry 2420.

In certain embodiments, some or all of the functionality described herein as being performed by a WD can be provided by processing circuitry 2420 executing instructions stored on device readable medium 2430, which in certain embodiments can be a computer-readable storage medium. In alternative embodiments, some or all of the functionality can be provided by processing circuitry 2420 without executing instructions stored on a separate or discrete device readable storage medium, such as in a hard-wired manner. In any of those particular embodiments, whether executing instructions stored on a device readable storage medium or not, processing circuitry 2420 can be configured to perform the described functionality. The benefits provided by such functionality are not limited to processing circuitry 2420 alone or to other components of WD 2410, but are enjoyed by WD 2410 as a whole, and/or by end users and the wireless network generally.

Processing circuitry 2420 can be configured to perform any determining, calculating, or similar operations (e.g., certain obtaining operations) described herein as being performed by a WD. These operations, as performed by processing circuitry 2420, can include processing information obtained by processing circuitry 2420 by, for example, converting the obtained information into other information, comparing the obtained information or converted information to information stored by WD 2410, and/or performing one or more operations based on the obtained information or converted information, and as a result of said processing making a determination.

Device readable medium 2430 can be operable to store a computer program, software, an application including one or more of logic, rules, code, tables, etc. and/or other instructions capable of being executed by processing circuitry 2420. Device readable medium 2430 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 2420. In some embodiments, processing circuitry 2420 and device readable medium 2430 can be considered to be integrated.

User interface equipment 2432 can include components that allow and/or facilitate a human user to interact with WD 2410. Such interaction can be of many forms, such as visual, audial, tactile, etc. User interface equipment 2432 can be operable to produce output to the user and to allow and/or facilitate the user to provide input to WD 2410. The type of interaction can vary depending on the type of user interface equipment 2432 installed in WD 2410. For example, if WD 2410 is a smart phone, the interaction can be via a touch screen; if WD 2410 is a smart meter, the interaction can be through a screen that provides usage (e.g., the number of gallons used) or a speaker that provides an audible alert (e.g., if smoke is detected). User interface equipment 2432 can include input interfaces, devices and circuits, and output interfaces, devices and circuits. User interface equipment 2432 can be configured to allow and/or facilitate input of information into WD 2410 and is connected to processing circuitry 2420 to allow and/or facilitate processing circuitry 2420 to process the input information. User interface equipment 2432 can include, for example, a microphone, a proximity or other sensor, keys/buttons, a touch display, one or more cameras, a USB port, or other input circuitry. User interface equipment 2432 is also configured to allow and/or facilitate output of information from WD 2410, and to allow and/or facilitate processing circuitry 2420 to output information from WD 2410. User interface equipment 2432 can include, for example, a speaker, a display, vibrating circuitry, a USB port, a headphone interface, or other output circuitry. Using one or more input and output interfaces, devices, and circuits, of user interface equipment 2432, WD 2410 can communicate with end users and/or the wireless network and allow and/or facilitate them to benefit from the functionality described herein.

Auxiliary equipment 2434 is operable to provide more specific functionality which may not be generally performed by WDs. This can comprise specialized sensors for doing measurements for various purposes, interfaces for additional types of communication such as wired communications etc. The inclusion and type of components of auxiliary equipment 2434 can vary depending on the embodiment and/or scenario.

Power source 2436 can, in some embodiments, be in the form of a battery or battery pack. Other types of power sources, such as an external power source (e.g., an electricity outlet), photovoltaic devices or power cells, can also be used. WD 2410 can further comprise power circuitry 2437 for delivering power from power source 2436 to the various parts of WD 2410 which need power from power source 2436 to carry out any functionality described or indicated herein. Power circuitry 2437 can in certain embodiments comprise power management circuitry. Power circuitry 2437 can additionally or alternatively be operable to receive power from an external power source; in which case WD 2410 can be connectable to the external power source (such as an electricity outlet) via input circuitry or an interface such as an electrical power cable. Power circuitry 2437 can also in certain embodiments be operable to deliver power from an external power source to power source 2436. This can be, for example, for the charging of power source 2436.

Power circuitry 2437 can perform any converting or other modification to the power from power source 2436 to make it suitable for supply to the respective components of WD 2410.

Figure 25:
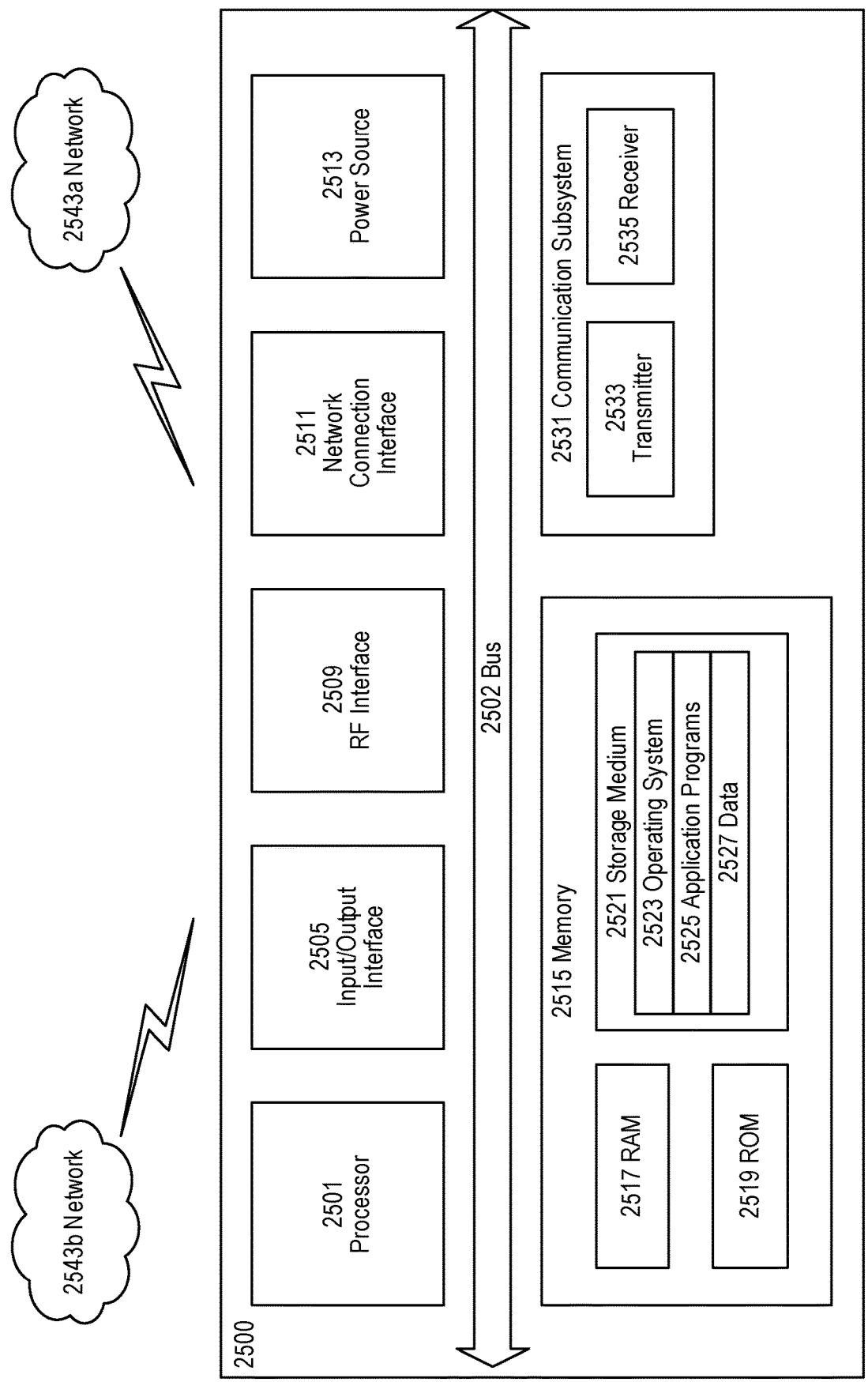
FIG. 25 illustrates a UE according to various embodiments of the present disclosure.

FIG. 25 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 25200 can be any UE identified by the 3' Generation Partnership Project (3GPP), including a NB-IoT UE, a machine type communication (MTC) UE, and/or an enhanced MTC (eMTC) UE. UE 2500, as illustrated in FIG. 25, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 25 is a UE, the components discussed herein are equally applicable to a WD, and vice-versa.

In FIG. 25, UE 2500 includes processing circuitry 2501 that is operatively coupled to input/output interface 2505, radio frequency (RF) interface 2509, network connection interface 2511, memory 2515 including random access memory (RAM) 2517, read-only memory (ROM) 2519, and storage medium 2521 or the like, communication subsystem 2531, power source 2533, and/or any other component, or any combination thereof. Storage medium 2521 includes operating system 2523, application program 2525, and data 2527. In other embodiments, storage medium 2521 can include other similar types of information. Certain UEs can utilize all of the components shown in FIG. 25, or only a subset of the components. The level of integration between the components can vary from one UE to another UE. Further, certain UEs can contain multiple instances of a component, such as multiple processors, memories, transceivers, transmitters, receivers, etc.

In FIG. 25, processing circuitry 2501 can be configured to process computer instructions and data. Processing circuitry 2501 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2501 can include two central processing units (CPUs). Data can be information in a form suitable for use by a computer.

In the depicted embodiment, input/output interface 2505 can be configured to provide a communication interface to an input device, output device, or input and output device. UE 2500 can be configured to use an output device via input/output interface 2505. An output device can use the same type of interface port as an input device. For example, a USB port can be used to provide input to and output from UE 2500. The output device can be a speaker, a sound card, a video card, a display, a monitor, a printer, an actuator, an emitter, a smartcard, another output device, or any combination thereof. UE 2500 can be configured to use an input device via input/output interface 2505 to allow and/or facilitate a user to capture information into UE 2500. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 25, RF interface 2509 can be configured to provide a communication interface to RF components such as a transmitter, a receiver, and an antenna. Network connection interface 2511 can be configured to provide a communication interface to network 2543a. Network 2543a can encompass wired and/or wireless networks such as a local-area network (LAN), a wide-area network (WAN), a computer network, a wireless network, a telecommunications network, another like network or any combination thereof. For example, network 2543a can comprise a Wi-Fi network. Network connection interface 2511 can be configured to include a receiver and a transmitter interface used to communicate with one or more other devices over a communication network according to one or more communication protocols, such as Ethernet, TCP/IP, SONET, ATM, or the like. Network connection interface 2511 can implement receiver and transmitter functionality appropriate to the communication network links (e.g., optical, electrical, and the like). The transmitter and receiver functions can share circuit components, software or firmware, or alternatively can be implemented separately.

RAM 2517 can be configured to interface via bus 2502 to processing circuitry 2501 to provide storage or caching of data or computer instructions during the execution of software programs such as the operating system, application programs, and device drivers. ROM 2519 can be configured to provide computer instructions or data to processing circuitry 2501. For example, ROM 2519 can be configured to store invariant low-level system code or data for basic system functions such as basic input and output (I/O), startup, or reception of keystrokes from a keyboard that are stored in a non-volatile memory. Storage medium 2521 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 2521 can be configured to include operating system 2523; application program 2525 such as a web browser application, a widget or gadget engine or another application; and data file 2527. Storage medium 2521 can store, for use by UE 2500, any of a variety of various operating systems or combinations of operating systems. For example, application program 2525 can include executable program instructions (also referred to as a computer program product) that, when executed by processor 2501, can configure UE 2500 to perform operations corresponding to various exemplary methods (e.g., procedures) described herein.

Storage medium 2521 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2521 can allow and/or facilitate UE 2500 to access computer-executable instructions, application programs or the like, stored on transitory or non-transitory memory media, to off-load data, or to upload data. An article of manufacture, such as one utilizing a communication system can be tangibly embodied in storage medium 2521, which can comprise a device readable medium.

In FIG. 25, processing circuitry 2501 can be configured to communicate with network 2543b using communication subsystem 2531. Network 2543a and network 2543b can be the same network or networks or different network or networks. Communication subsystem 2531 can be configured to include one or more transceivers used to communicate with network 2543b. For example, communication subsystem 2531 can be configured to include one or more transceivers used to communicate with one or more remote transceivers of another device capable of wireless communication such as another WD, UE, or base station of a radio access network (RAN) according to one or more communication protocols, such as IEEE 802.25, CDMA, WCDMA, GSM, LTE, UTRAN, WiMax, or the like. Each transceiver can include transmitter 2533 and/or receiver 2535 to implement transmitter or receiver functionality, respectively, appropriate to the RAN links (e.g., frequency allocations and the like). Further, transmitter 2533 and receiver 2535 of each transceiver can share circuit components, software or firmware, or alternatively can be implemented separately.

In the illustrated embodiment, the communication functions of communication subsystem 2531 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 2531 can include cellular communication, Wi-Fi communication, Bluetooth communication, and GPS communication. Network 2543b can encompass wired and/or wireless networks such as a local-area network (LAN), a wide-area network (WAN), a computer network, a wireless network, a telecommunications network, another like network or any combination thereof. For example, network 2543b can be a cellular network, a Wi-Fi network, and/or a near-field network. Power source 2513 can be configured to provide alternating current (AC) or direct current (DC) power to components of UE 2500.

The features, benefits and/or functions described herein can be implemented in one of the components of UE 2500 or partitioned across multiple components of UE 2500. Further, the features, benefits, and/or functions described herein can be implemented in any combination of hardware, software or firmware. In one example, communication subsystem 2531 can be configured to include any of the components described herein. Further, processing circuitry 2501 can be configured to communicate with any of such components over bus 2502. In another example, any of such components can be represented by program instructions stored in memory that when executed by processing circuitry 2501 perform the corresponding functions described herein. In another example, the functionality of any of such components can be partitioned between processing circuitry 2501 and communication subsystem 2531. In another example, the non-computationally intensive functions of any of such components can be implemented in software or firmware and the computationally intensive functions can be implemented in hardware.

Figure 26:
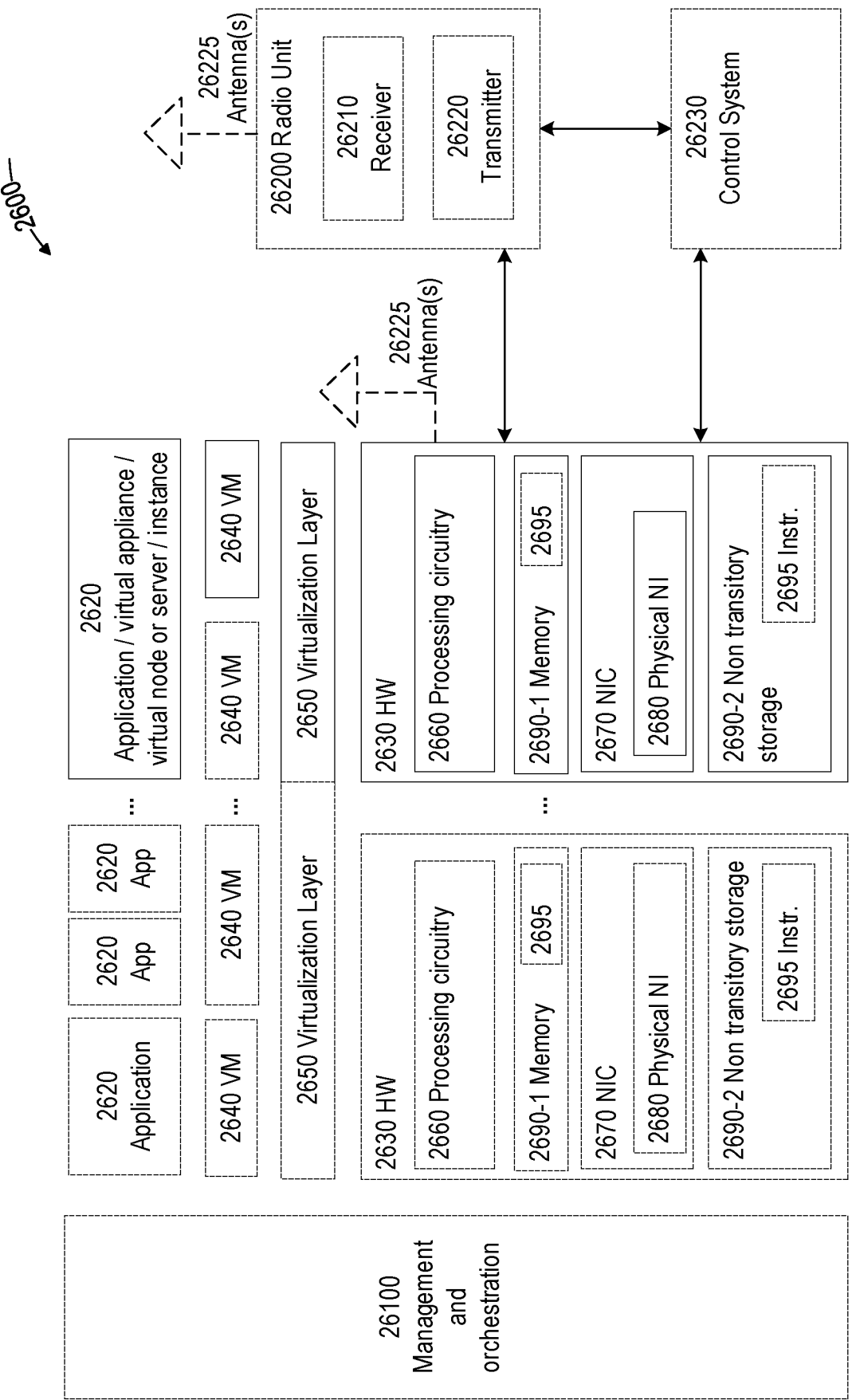
FIG. 26 is a block diagram illustrating an exemplary virtualization environment usable for implementation of various embodiments of network nodes described herein.

FIG. 26 is a schematic block diagram illustrating a virtualization environment 2600 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 2600 hosted by one or more of hardware nodes 2630. Further, in embodiments in which the virtual node is not a radio access node or does not require radio connectivity (e.g., a core network node), then the network node can be entirely virtualized.

The functions can be implemented by one or more applications 2620 (which can alternatively be called software instances, virtual appliances, network functions, virtual nodes, virtual network functions, etc.) operative to implement some of the features, functions, and/or benefits of some of the embodiments disclosed herein. Applications 2620 are run in virtualization environment 2600 which provides hardware 2630 comprising processing circuitry 2660 and memory 2690. Memory 2690 contains instructions 2695 executable by processing circuitry 2660 whereby application 2620 is operative to provide one or more of the features, benefits, and/or functions disclosed herein.

Virtualization environment 2600 can include general-purpose or special-purpose network hardware devices (or nodes) 2630 comprising a set of one or more processors or processing circuitry 2660, which can be commercial off-the-shelf (COTS) processors, dedicated Application Specific Integrated Circuits (ASICs), or any other type of processing circuitry including digital or analog hardware components or special purpose processors. Each hardware device can comprise memory 2690-1 which can be non-persistent memory for temporarily storing instructions 2695 or software executed by processing circuitry 2660. For example, instructions 2695 can include program instructions (also referred to as a computer program product) that, when executed by processing circuitry 2660, can configure hardware node 2620 to perform operations corresponding to various exemplary methods (e.g., procedures) described herein. Such operations can also be attributed to virtual node(s) 2620 that is/are hosted by hardware node 2630.

Each hardware device can comprise one or more network interface controllers (NICs) 2670, also known as network interface cards, which include physical network interface 2680. Each hardware device can also include non-transitory, persistent, machine-readable storage media 2690-2 having stored therein software 2695 and/or instructions executable by processing circuitry 2660. Software 2695 can include any type of software including software for instantiating one or more virtualization layers 2650 (also referred to as hypervisors), software to execute virtual machines 2640 as well as software allowing it to execute functions, features and/or benefits described in relation with some embodiments described herein.

Virtual machines 2640, comprise virtual processing, virtual memory, virtual networking or interface and virtual storage, and can be run by a corresponding virtualization layer 2650 or hypervisor. Different embodiments of the instance of virtual appliance 2620 can be implemented on one or more of virtual machines 2640, and the implementations can be made in different ways.

During operation, processing circuitry 2660 executes software 2695 to instantiate the hypervisor or virtualization layer 2650, which can sometimes be referred to as a virtual machine monitor (VMM). Virtualization layer 2650 can present a virtual operating platform that appears like networking hardware to virtual machine 2640.

As shown in FIG. 26, hardware 2630 can be a standalone network node with generic or specific components. Hardware 2630 can comprise antenna 26225 and can implement some functions via virtualization. Alternatively, hardware 2630 can be part of a larger cluster of hardware (e.g., such as in a data center or customer premise equipment (CPE)) where many hardware nodes work together and are managed via management and orchestration (MANO) 26100, which, among others, oversees lifecycle management of applications 2620.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 2640 can be a software implementation of a physical machine that runs programs as if they were executing on a physical, non-virtualized machine. Each of virtual machines 2640, and that part of hardware 2630 that executes that virtual machine, be it hardware dedicated to that virtual machine and/or hardware shared by that virtual machine with others of the virtual machines 2640, forms a separate virtual network elements (VNE).

Still in the context of NFV, Virtual Network Function (VNF) is responsible for handling specific network functions that run in one or more virtual machines 2640 on top of hardware networking infrastructure 2630 and corresponds to application 2620 in FIG. 26.

In some embodiments, one or more radio units 26200 that each include one or more transmitters 26220 and one or more receivers 26210 can be coupled to one or more antennas 26225. Radio units 26200 can communicate directly with hardware nodes 2630 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 26230, which can alternatively be used for communication between the hardware nodes 2630 and radio units 26200.

Figure 27:
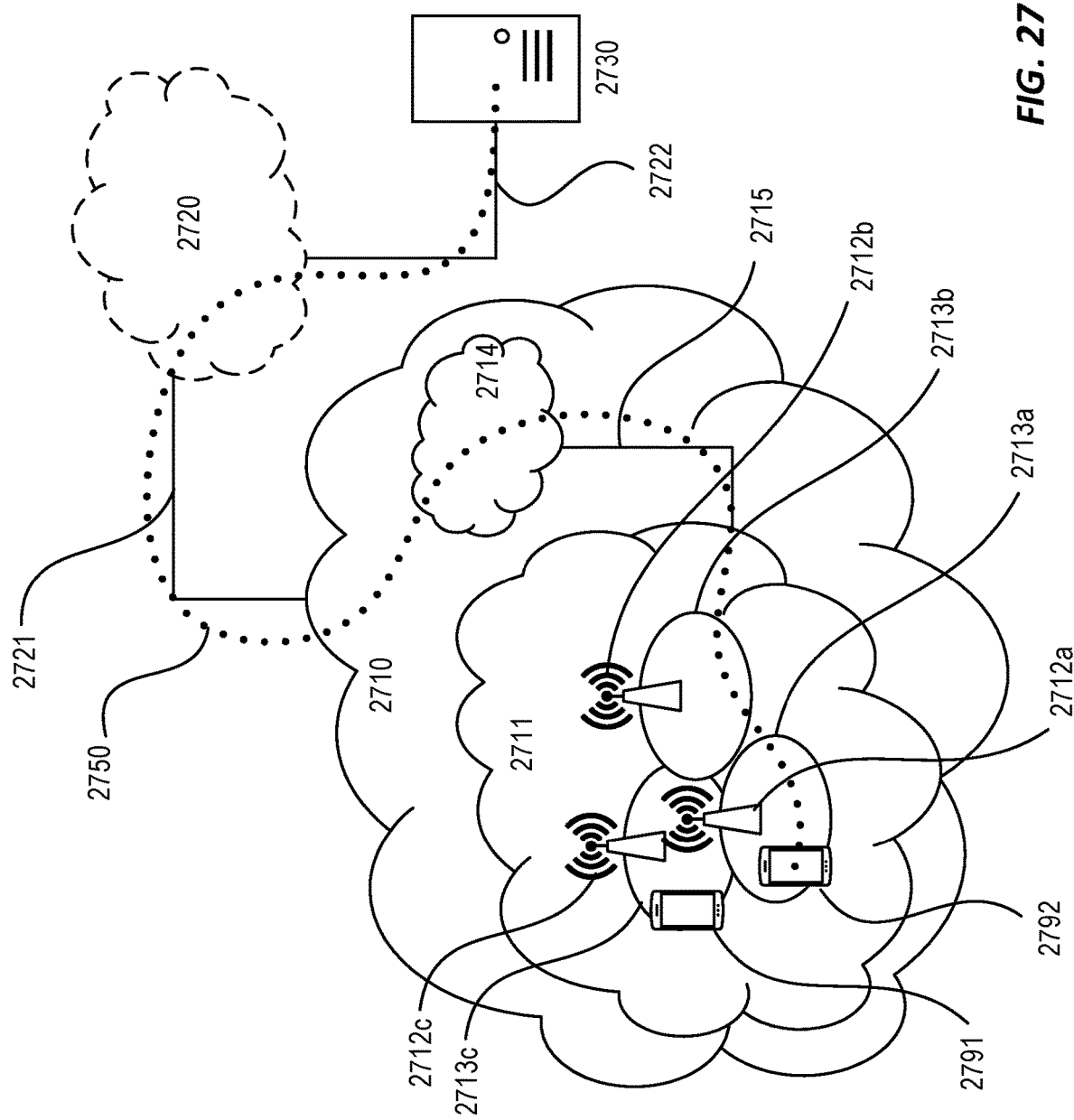
FIGS. 27-28 are block diagrams of various communication systems and/or networks, according to various embodiments of the present disclosure.

With reference to FIG. 27, in accordance with an embodiment, a communication system includes telecommunication network 2710, such as a 3GPP-type cellular network, which comprises access network 2711, such as a radio access network, and core network 2714. Access network 2711 comprises a plurality of base stations 2712a, 2712b, 2712c, such as NBs, eNBs, gNBs or other types of wireless access points, each defining a corresponding coverage area 2713a, 2713b, 2713c. Each base station 2712a, 2712b, 2712c is connectable to core network 2714 over a wired or wireless connection 2715. A first UE 2791 located in coverage area 2713c can be configured to wirelessly connect to, or be paged by, the corresponding base station 2712c. A second UE 2792 in coverage area 2713a is wirelessly connectable to the corresponding base station 2712a. While a plurality of UEs 2791, 2792 are illustrated in this example, the disclosed embodiments are equally applicable to a situation where a sole UE is in the coverage area or where a sole UE is connecting to the Telecommunication network 2710 is itself connected to host computer 2730, which can be embodied in the hardware and/or software of a standalone server, a cloud-implemented server, a distributed server or as processing resources in a server farm. Host computer 2730 can be under the ownership or control of a service provider or can be operated by the service provider or on behalf of the service provider. Connections 2721 and 2722 between telecommunication network 2710 and host computer 2730 can extend directly from core network 2714 to host computer 2730 or can go via an optional intermediate network 2720. Intermediate network 2720 can be one of, or a combination of more than one of, a public, private or hosted network; intermediate network 2720, if any, can be a backbone network or the Internet; in particular, intermediate network 2720 can comprise two or more sub-networks (not shown).

The communication system of FIG. 27 as a whole enables connectivity between the connected UEs 2791, 2792 and host computer 2730. The connectivity can be described as an over-the-top (OTT) connection 2750. Host computer 2730 and the connected UEs 2791, 2792 are configured to communicate data and/or signaling via OTT connection 2750, using access network 2711, core network 2714, any intermediate network 2720 and possible further infrastructure (not shown) as intermediaries. OTT connection 2750 can be transparent in the sense that the participating communication devices through which OTT connection 2750 passes are unaware of routing of uplink and downlink communications. For example, base station 2712 may not or need not be informed about the past routing of an incoming downlink communication with data originating from host computer 2730 to be forwarded (e.g., handed over) to a connected UE 2791. Similarly, base station 2712 need not be aware of the future routing of an outgoing uplink communication originating from the UE 2791 towards the host computer 2730.

Example implementations, in accordance with an embodiment, of the UE, base station and host computer discussed in the preceding paragraphs will now be described with reference to FIG. 28. In communication system 2800, host computer 2810 comprises hardware 2815 including communication interface 2816 configured to set up and maintain a wired or wireless connection with an interface of a different communication device of communication system 2800. Host computer 2810 further comprises processing circuitry 2818, which can have storage and/or processing capabilities. In particular, processing circuitry 2818 can comprise one or more programmable processors, application-specific integrated circuits, field programmable gate arrays or combinations of these (not shown) adapted to execute instructions. Host computer 2810 further comprises software 2811, which is stored in or accessible by host computer 2810 and executable by processing circuitry 2818. Software 2811 includes host application 2812. Host application 2812 can be operable to provide a service to a remote user, such as UE 2830 connecting via OTT connection 2850 terminating at UE 2830 and host computer 2810. In providing the service to the remote user, host application 2812 can provide user data which is transmitted using OTT connection 2850.

Communication system 2800 can also include base station 2820 provided in a telecommunication system and comprising hardware 2825 enabling it to communicate with host computer 2810 and with UE 2830. Hardware 2825 can include communication interface 2826 for setting up and maintaining a wired or wireless connection with an interface of a different communication device of communication system 2800, as well as radio interface 2827 for setting up and maintaining at least wireless connection 2870 with UE 2830 located in a coverage area (not shown in FIG. 28) served by base station 2820. Communication interface 2826 can be configured to facilitate connection 2860 to host computer 2810. Connection 2860 can be direct, or it can pass through a core network (not shown in FIG. 28) of the telecommunication system and/or through one or more intermediate networks outside the telecommunication system. In the embodiment shown, hardware 2825 of base station 2820 can also include processing circuitry 2828, which can comprise one or more programmable processors, application-specific integrated circuits, field programmable gate arrays or combinations of these (not shown) adapted to execute instructions.

Base station 2820 also includes software 2821 stored internally or accessible via an external connection. For example, software 2821 can include program instructions (also referred to as a computer program product) that, when executed by processing circuitry 2828, can configure base station 2820 to perform operations corresponding to various exemplary methods (e.g., procedures) described herein.

Communication system 2800 can also include UE 2830 already referred to, whose hardware 2835 can include radio interface 2837 configured to set up and maintain wireless connection 2870 with a base station serving a coverage area in which UE 2830 is currently located. Hardware 2835 of UE 2830 can also include processing circuitry 2838, which can comprise one or more programmable processors, application-specific integrated circuits, field programmable gate arrays or combinations of these (not shown) adapted to execute instructions.

UE 2830 also includes software 2831, which is stored in or accessible by UE 2830 and executable by processing circuitry 2838. Software 2831 includes client application 2832. Client application 2832 can be operable to provide a service to a human or non-human user via UE 2830, with the support of host computer 2810. In host computer 2810, an executing host application 2812 can communicate with the executing client application 2832 via OTT connection 2850 terminating at UE 2830 and host computer 2810. In providing the service to the user, client application 2832 can receive request data from host application 2812 and provide user data in response to the request data. OTT connection 2850 can transfer both the request data and the user data.

Client application 2832 can interact with the user to generate the user data that it provides. Software 2831 can also include program instructions (also referred to as a computer program product) that, when executed by processing circuitry 2838, can configure UE 2830 to perform operations corresponding to various exemplary methods (e.g., procedures) described herein.

Figure 28:
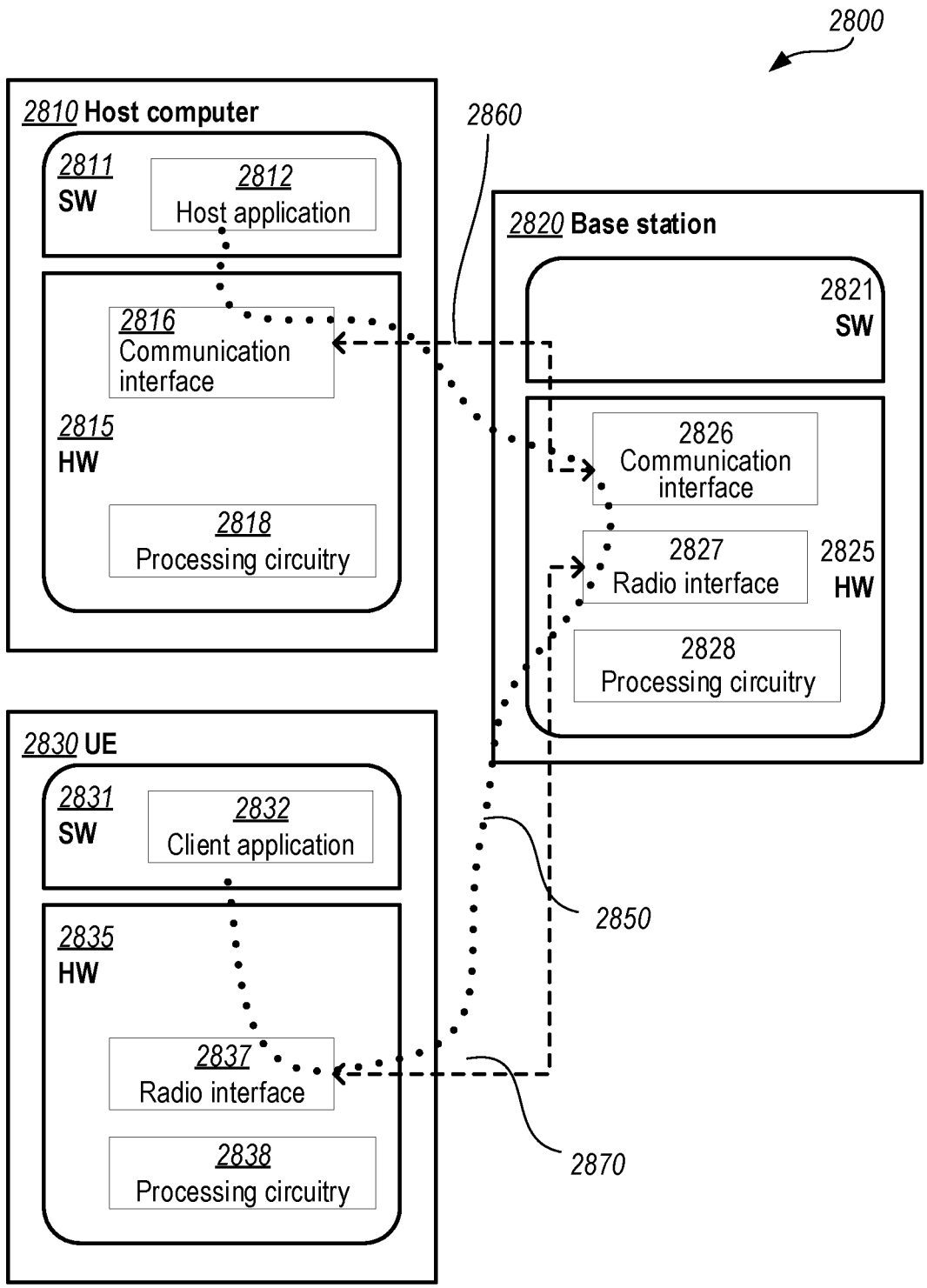

As an example, host computer 2810, base station 2820 and UE 2830 illustrated in FIG. 28 can be similar or identical to host computer 2730, one of base stations 2712a, 2712b, 2712c and one of UEs 2791, 2792 of FIG. 27, respectively. This is to say, the inner workings of these entities can be as shown in FIG. 28 and independently, the surrounding network topology can be that of FIG. 27.

In FIG. 28, OTT connection 2850 has been drawn abstractly to illustrate the communication between host computer 2810 and UE 2830 via base station 2820, without explicit reference to any intermediary devices and the precise routing of messages via these devices. Network infrastructure can determine the routing, which it can be configured to hide from UE 2830 or from the service provider operating host computer 2810, or both. While OTT connection 2850 is active, the network infrastructure can further take decisions by which it dynamically changes the routing (e.g., on the basis of load balancing consideration or reconfiguration of the network).

Wireless connection 2870 between UE 2830 and base station 2820 is in accordance with the teachings of the embodiments described throughout this disclosure. One or more of the various embodiments improve the performance of OTT services provided to UE 2830 using OTT connection 2850, in which wireless connection 2870 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2850 between host computer 2810 and UE 2830, in response to variations in the measurement results. The measurement procedure and/or the network functionality for reconfiguring OTT connection 2850 can be implemented in software 2811 and hardware 2815 of host computer 2810 or in software 2831 and hardware 2835 of UE 2830, or both. In embodiments, sensors (not shown) can be deployed in or in association with communication devices through which OTT connection 2850 passes; the sensors can participate in the measurement procedure by supplying values of the monitored quantities exemplified above or by supplying values of other physical quantities from which software 2811, 2831 can compute or estimate the monitored quantities. The reconfiguring of OTT connection 2850 can include message format, retransmission settings, preferred routing etc.; the reconfiguring need not affect base station 2820, and it can be unknown or imperceptible to base station 2820. Such procedures and functionalities can be known and practiced in the art. In certain embodiments, measurements can involve proprietary UE signaling facilitating host computer 2810's measurements of throughput, propagation times, latency and the like. The measurements can be implemented in that software 2811 and 2831 causes messages to be transmitted, in particular empty or 'dummy' messages, using OTT connection 2850 while it monitors propagation times, errors, etc.

FIG. 29 is a flowchart illustrating an exemplary method (e.g., procedure) implemented in a communication system, in accordance with various embodiments. The communication system includes a host computer, a base station and a UE which, in some exemplary embodiments, can be those described with reference to other figures herein. For simplicity of the present disclosure, only drawing references to FIG. 29 will be included in this section. In step 2910, the host computer provides user data. In substep 2911 (which can be optional) of step 2910, the host computer provides the user data by executing a host application. In step 2920, the host computer initiates a transmission carrying the user data to the UE. In step 2930 (which can be optional), the base station transmits to the UE the user data which was carried in the transmission that the host computer initiated, in accordance with the teachings of the embodiments described throughout this disclosure. In step 2940 (which can also be optional), the UE executes a client application associated with the host application executed by the host computer.

FIG. 30 is a flowchart illustrating an exemplary method (e.g., procedure) implemented in a communication system, in accordance with various embodiments. The communication system includes a host computer, a base station and a UE which can be those described with reference to other figures herein. For simplicity of the present disclosure, only drawing references to FIG. 30 will be included in this section. In step 3010 of the method, the host computer provides user data. In an optional substep (not shown) the host computer provides the user data by executing a host application. In step 3020, the host computer initiates a transmission carrying the user data to the UE. The transmission can pass via the base station, in accordance with the teachings of the embodiments described throughout this disclosure. In step 3030 (which can be optional), the UE receives the user data carried in the transmission.

FIG. 31 is a flowchart illustrating an exemplary method (e.g., procedure) implemented in a communication system, in accordance with various embodiments. The communication system includes a host computer, a base station and a UE which can be those described with reference to other figures herein. For simplicity of the present disclosure, only drawing references to FIG. 31 will be included in this section. In step 3110 (which can be optional), the UE receives input data provided by the host computer. Additionally or alternatively, in step 3120, the UE provides user data. In substep 3121 (which can be optional) of step 3120, the UE provides the user data by executing a client application. In substep 3111 (which can be optional) of step 3110, the UE executes a client application which provides the user data in reaction to the received input data provided by the host computer. In providing the user data, the executed client application can further consider user input received from the user. Regardless of the specific manner in which the user data was provided, the UE initiates, in substep 3130 (which can be optional), transmission of the user data to the host computer. In step 3140 of the method, the host computer receives the user data transmitted from the UE, in accordance with the teachings of the embodiments described throughout this disclosure.

FIG. 32 is a flowchart illustrating an exemplary method (e.g., procedure) implemented in a communication system, in accordance with various embodiments. The communication system includes a host computer, a base station and a UE which can be those described with reference to other figures herein. For simplicity of the present disclosure, only drawing references to FIG. 32 will be included in this section. In step 3210 (which can be optional), in accordance with the teachings of the embodiments described throughout this disclosure, the base station receives user data from the UE. In step 3220 (which can be optional), the base station initiates transmission of the received user data to the host computer. In step 3230 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The techniques and apparatus described herein include, but are not limited to, the following enumerated examples:

A1. A method, for a user equipment (UE), for performing quality of experience (QoE) measurements configured by a wireless network, the method comprising:
    receiving, from a radio access network node (RNN) in the wireless network, a request for QoE measurement reports that are available at the UE and that are associated with one or more applications; and
    sending one or more QoE measurement reports to the RNN in accordance with the request.

A2. The method of embodiment A1, further comprising sending, to the RNN, an availability indication for the one or more QoE measurement reports, wherein the request is received in response to the availability indication.

A3. The method of embodiment A2, wherein the availability indication is sent together with one or more of the following assistance information:
    time elapsed since the most recent QoE measurement report from the UE,
    number of QoE measurement reports available at the UE,
    amount of data comprising QoE measurement reports available at the UE,
    amount of data comprising each available QoE measurement report,
    validity period for each available QoE measurement report,
    indication of whether each available QoE measurement report is a first, last, or intermediate report for an application session, and
    indication of whether each available QoE measurement report contains critical information.

A4. The method of any of embodiments A2-A3, wherein sending the availability indication includes one or more of the following:
  determining that the number of QoE measurement reports available at the UE is greater than or equal to a first threshold; and
  determining that an elapsed time since the earliest of the available QoE measurement reports became available is greater than or equal to a second threshold.

A5. The method of any of embodiments A1-A4, further comprising:
  receiving, from the RNN, a QoE measurement configuration (QMC) for the one or more applications;
  performing measurements for the one or more applications in accordance with the QMC; and
  selectively storing, in UE memory, first and second QoE measurement reports comprising the performed measurements.

A6. The method of embodiment A5, further comprising receiving, from the RNN, a configuration for selective storage of QoE measurement reports by the UE, wherein selectively storing is performed in accordance with the configuration for selective storage.

A7. The method of embodiment A6, wherein the configuration for selective storage includes storage priorities based on one or more of the following:
  respective ages of the reports,
  respective application sessions associated with the reports,
  respective criticalities of the applications associated with the reports, and
  respective criticalities of the information comprising the reports.

A8. The method of any of embodiments A6-A7, wherein the configuration for selective storage includes a first threshold for UE sending of unsolicited QoE measurement reports.

A9. The method of any of embodiments A5-A8, wherein selectively storing the first and second QoE measurement reports in UE memory comprises one of the following operations:
  deleting one of the first and second QoE measurement reports from the UE memory and storing the other of the first and second QoE measurement reports in the UE memory; or
  storing both the first and second QoE measurement reports in the UE memory.

A10. The method of embodiment A9, wherein storing both the first and second measurement QoE reports is based on one or more of the following conditions:
  the number of QoE measurement reports available at the UE is less than a first threshold; and
  sufficient UE memory to store both.

A11. The method of any of embodiments A9-A10, further comprising sending one or more available QoE measurement reports without a request from the RNN upon occurrence of one or more of the following:
  a number of QoE measurement reports available at the UE is greater than or equal to a first threshold; and
  insufficient UE memory to store the available QoE measurement reports.

A12. The method of any of embodiments A9-A11, wherein deleting the one and storing the other of the first and second QoE measurement reports is based on one or more of the following:
  the respective sizes of the reports,
  the respective ages of the reports,
  the respective criticalities of the applications associated with the reports, and
  the respective criticalities of the information comprising the reports.

A13. The method of any of embodiments A1-A12, wherein:
  the request includes one or more criteria for selecting available QoE measurement reports; and
  the method further comprises selecting the one or more QoE measurement reports from a plurality of QoE measurement reports stored by the UE in accordance with the one or more criteria.

A14. The method of embodiment A13, wherein the one or more criteria include any of the following:
  a bitmap comprising a plurality of bits, including one or more bits indicating that the respective one or more QoE measurement reports should be sent by the UE;
  one or more indices associated with the respective one or more QoE measurement reports;
  a priority order in which QoE measurement reports should be sent by the UE;
  a specific number of QoE measurement reports to be sent by the UE;
  a maximum number of QoE measurement reports to be sent by the UE;
  a minimum size for each QoE measurement report sent by the UE;
  a maximum size for each QoE measurement report sent by the UE;
  a maximum data volume for QoE measurement reports to be sent by the UE; and
  a minimum QoE measurement report size.

A15. The method of embodiment A14, wherein the priority order is based on one more of the following:
  the respective sizes of the reports,
  the respective ages of the reports,
  the respective criticalities of the applications associated with the reports, and
  the respective criticalities of the information comprising the reports.

A16. The method of any of embodiments A1-A15, wherein:
  the request also includes one or more of the following transmission instructions:
    identification of one or more signaling radio bearers (SRBs) and/or data radio bearers (DRBs) over which the QoE measurement reports should be sent by the UE,
    one or more rules for UE selection of SRBs and/or DRBs for sending the QoE measurement reports,
    instruction to send the QoE measurement reports via a second RNN, and
    instruction to send the QoE measurement reports via unlicensed spectrum; and
  the one or more QoE measurement reports are sent in accordance with the transmission instructions in the request.

A17. The method of any of embodiments A1-A16, wherein:
  the request also includes a segmentation configuration for QoE measurement reports;
  the segmentation configuration includes a maximum segment size; and
  sending the one or more QoE measurement reports comprises:
    when a QoE measurement report is greater than the maximum segment size, dividing the QoE measurement report into a plurality of segments; and sending each of the plurality of segments in association with a segment number.

B1. A method, for a radio access network node (RNN) in a wireless network, for configuring quality of experience (QoE) measurements by user equipment (UEs), the method comprising:
  sending, to a UE, a request for QoE measurement reports that are available at the UE and that are associated with one or more applications; and
  receiving one or more QoE measurement reports from the UE in accordance with the request.

B2. The method of embodiment A1, further comprising receiving, from the UE, an availability indication for the one or more QoE measurement reports, wherein the request is sent in response to the availability indication.

B3. The method of embodiment B2, wherein the availability indication is sent together with one or more of the following assistance information:
  time elapsed since the most recent QoE measurement report from the UE,
  number of QoE measurement reports available at the UE,
  amount of data comprising QoE measurement reports available at the UE,
  amount of data comprising each available QoE measurement report,
  validity period for each available QoE measurement report,
  identifier associated with each available QoE measurement report,
  identifier of an application associated with each available QoE measurement report,
  indication of whether each available QoE measurement report is a first, last, or intermediate report for an application session, and
  indication of whether each available QoE measurement report contains critical information.

B4. The method of embodiment B3, further comprising, based on the availability indication and the assistance information, determining one or more of the following for inclusion in the request:
  identifiers associated with the one or more QoE measurement reports,
  identifiers of applications associated with the one or more QoE measurement reports, and
  one or more criteria for UE selection of available QoE measurement reports.

B5. The method of embodiment B4, wherein the one or more criteria include any of the following:
  a bitmap comprising a plurality of bits, including one or more bits indicating that the respective one or more QoE measurement reports should be sent by the UE;
  one or more indices associated with the respective one or more QoE measurement reports;
  a priority order in which QoE measurement reports should be sent by the UE;
  a specific number of QoE measurement reports to be sent by the UE;
  a maximum number of QoE measurement reports to be sent by the UE;
  a minimum size for each QoE measurement report sent by the UE;
  a maximum size for each QoE measurement report sent by the UE;
  a maximum data volume for QoE measurement reports to be sent by the UE;
  a minimum QoE measurement report size.

B6. The method of embodiment B5, wherein the priority order is based on one more of the following:
  the respective sizes of the reports,
  the respective ages of the reports,
  the respective criticalities of the applications associated with the reports, and
  the respective criticalities of the information comprising the reports.

B7. The method of any of embodiments B1-B6, wherein:
  the request also includes one or more of the following transmission instructions:
    identification of one or more signaling radio bearers (SRBs) and/or data radio bearers (DRBs) over which the QoE measurement reports should be sent by the UE,
    one or more rules for UE selection of SRBs and/or DRBs for sending the QoE measurement reports,
    instruction to send the QoE measurement reports via a second RNN, and
    instruction to send the QoE measurement reports via unlicensed spectrum; and
  the one or more QoE measurement reports are received from the UE in accordance with the transmission instructions in the request.

B8. The method of any of embodiments B1-B7, wherein:
  the method further comprises sending, to the UE, a QoE measurement configuration (QMC) for the one or more applications; and
  the QoE measurement reports include measurements for the one or more applications in accordance with the QMC.

B9. The method of any of embodiments B1-B8, further comprising receiving one or more available QoE measurement reports from the UE without a request from the RNN, in response to one or more of the following:
  the number of QoE measurement reports available at the UE is greater than or equal to a first threshold; and
  insufficient UE memory to store available QoE measurement reports.

B10. The method of any of embodiments B1-B9, wherein:
  the request also includes a segmentation configuration for QoE measurement reports;
  the segmentation configuration includes a maximum segment size; and
  receiving the one or more QoE measurement reports comprises:
    when a QoE measurement report is greater than the maximum segment size, receiving a plurality of segments of the QoE measurement report, each in association with a segment number; and
    based on the respective segment numbers, combining the plurality of segments into the QoE measurement report.

B11. The method of any of embodiments B1-B10, further comprising sending, to the UE, a configuration for selective storage of QoE measurement reports by the UE.

B12. The method of embodiment B11, wherein the configuration for selective storage includes storage priorities based on one or more of the following:
  respective ages of the reports,
  respective application sessions associated with the reports,
  respective criticalities of the applications associated with the reports, and
  respective criticalities of the information comprising the reports.

B13. The method of any of embodiments B11-B12, wherein the configuration for selective storage includes a first threshold for UE sending of unsolicited QoE measurement reports.

C1. A user equipment (UE) arranged to perform quality of experience (QoE) measurements configured by a wireless network, the UE comprising:
- radio transceiver circuitry configured to communicate with a radio access network node (RNN) in the wireless network; and
- processing circuitry operatively coupled to the radio transceiver circuitry, whereby the processing circuitry and the radio transceiver circuitry are configured to perform operations corresponding to the methods of any of embodiments A1-A16.

C2. A user equipment (UE) arranged to perform quality of experience (QoE) measurements configured by a wireless network, the UE being further arranged to perform operations corresponding to the methods of any of embodiments A1-A16.

C3. A non-transitory, computer-readable medium storing computer-executable instructions that, when executed by processing circuitry of a user equipment (UE) arranged to perform quality of experience (QoE) measurements configured by a wireless network, configure the UE to perform operations corresponding to the methods of any of embodiments A1-A16.

C4. A computer program product comprising computer-executable instructions that, when executed by processing circuitry of a user equipment (UE) arranged to perform quality of experience (QoE) measurements configured by a wireless network, configure the UE to perform operations corresponding to the methods of any of embodiments A1-A16.

D1. A radio access network node (RNN) arranged to configure quality of experience (QoE) measurements by user equipment (UEs) in a wireless network, the RNN comprising:
- communication interface circuitry configured to communicate with one or more UEs and with a measurement collection entity (MCE) in the wireless network; and
- processing circuitry operatively coupled to the communication interface circuitry, whereby the processing circuitry and the communication interface circuitry are configured to perform operations corresponding to the methods of any of embodiments B1-B14.

D2. A radio network node (RNN) arranged to configure quality of experience (QoE) measurements by user equipment (UEs) in a wireless network, the RNN being further arranged to perform operations corresponding to the methods of any of embodiments B1-B14.

D3. A non-transitory, computer-readable medium storing computer-executable instructions that, when executed by processing circuitry of a radio network node (RNN) arranged to configure quality of experience (QoE) measurements by user equipment (UEs) in a wireless network, configure the RNN to perform operations corresponding to the methods of any of embodiments B1-B14.

D4. A computer program product comprising computer-executable instructions that, when executed by processing circuitry of a radio network node (RNN) arranged to configure quality of experience (QoE) measurements by user equipment (UEs) in a wireless network, configure the RNN to perform operations corresponding to the methods of any of embodiments B1-B14.

The invention claimed is:

1. A method for a user equipment (UE) to perform quality of experience (QoE) measurements configured by a wireless network, the method comprising:
- receiving the following from a radio access network node (RNN) in the wireless network:
  - a QoE measurement configuration for one or more services provided by the UE application layer, and
  - a configuration for selective storage of QoE measurement reports by the UE;
- performing measurements for the one or more services in accordance with the QoE measurement configuration;
- selectively storing, in accordance with the configuration for selective storage, one or both of first and second QoE measurement reports comprising the performed measurements;
- receiving, from the RNN, a request for QoE measurement reports that are available at the UE and that are associated with the one or more services provided by the UE application layer; and
- sending one or more of the stored QoE measurement reports to the RNN in accordance with the request.

2. The method of claim 1, wherein sending one or more of the stored QoE measurement reports comprises, for each particular QoE measurement report:
- dividing the particular QoE measurement report into a plurality of segments when a size of the particular QoE measurement report is greater than a maximum segment size; and
- sending the plurality of segments to the RNN, with each segment being sent together with a corresponding segment number.

3. The method of claim 1, further comprising sending, to the RNN, an availability indication for the stored QoE measurement reports, wherein the request is received after sending the availability indication.

4. The method of claim 1, wherein the configuration for selective storage includes storage priorities based on one or more of the following:
- respective ages of the QoE measurement reports,
- respective application sessions associated with the QoE measurement reports,
- respective criticalities of the services associated with the QoE measurement reports, and
- respective criticalities of the information comprising the QoE measurement reports.

5. The method of claim 1, wherein the configuration for selective storage includes a first threshold for UE sending of unsolicited QoE measurement reports.

6. A method for a radio access network node (RNN) in a wireless network to configure quality of experience (QoE) measurements by user equipment (UEs), the method comprising:
- sending the following to a UE;
  - a QoE measurement configuration for one or more services provided by the UE application layer, and
  - a configuration for selective storage of QoE measurement reports by the UE;
- subsequently sending, to the UE, a request for QoE measurement reports that are available at the UE and that are associated with the one or more services provided by the UE application layer; and
- receiving, from the UE in accordance with the request, one or both of first and second QoE measurement reports that were stored by the UE in accordance with the configuration for selective storage, wherein each received QoE measurement report includes measurements performed by the UE in accordance with the QoE measurement configuration.

7. The method of claim 6, wherein receiving the one or more QoE measurement reports comprises, for each particular QoE measurement report:
receiving, from the UE, a plurality of segments of the particular QoE measurement report when a size of the particular QoE measurement report is greater than a maximum segment size, with each segment being received together with a corresponding segment number; and
combining the plurality of segments into the particular QoE measurement report based on the respective segment numbers.

8. The method of claim 6, further comprising receiving, from the UE, an availability indication for the one or more QoE measurement reports, wherein the request is sent in response to the availability indication.

9. The method of claim 6, wherein the configuration for selective storage includes storage priorities based on one or more of the following:
respective ages of the QoE measurement reports,
respective application sessions associated with the QoE measurement reports,
respective criticalities of the services associated with the QoE measurement reports, and
respective criticalities of the information comprising the QoE measurement reports.

10. The method of claim 6, wherein the configuration for selective storage includes a first threshold for UE sending of unsolicited QoE measurement reports.

11. A user equipment (UE) arranged to perform quality of experience (QoE) measurements configured by a wireless network, the UE comprising:
communication interface circuitry configured to communicate with radio access network nodes (RNNs) in the wireless network; and
processing circuitry operatively coupled to the communication interface circuitry, whereby the processing circuitry and the communication interface circuitry are configured to:
receive the following from a RNN in the wireless network:
a QoE measurement configuration for one or more services provided by the UE application layer, and
a configuration for selective storage of QoE measurement reports by the UE;
perform measurements for the one or more services in accordance with the QoE measurement configuration;
selectively store, in accordance with the configuration for selective storage, one or both of first and second QoE measurement reports comprising the performed measurements;
receive, from the RNN, a request for QoE measurement reports that are available at the UE and that are associated with the one or more services provided by the UE application layer; and
send one or more of the stored QoE measurement reports to the RNN in accordance with the request.

12. The UE of claim 11, wherein the processing circuitry and the communication interface circuitry are configured to send one or more of the stored QoE measurement reports based on, for each particular QoE measurement report:
dividing the particular QoE measurement report into a plurality of segments when a size of the particular QoE measurement report is greater than a maximum segment size; and
sending the plurality of segments to the RNN, with each segment being sent together with a corresponding segment number.

13. The UE of claim 11, wherein the processing circuitry and the communication interface circuitry are further configured to send, to the RNN, an availability indication for the stored QoE measurement reports, wherein the request is received after sending the availability indication.

14. A radio access network node (RNN) arranged to configure quality of experience (QoE) measurements by user equipment (UEs) in a wireless network, the RNN comprising:
communication interface circuitry configured to communicate with the UEs and with a measurement collection entity (MCE) in the wireless network; and
processing circuitry operatively coupled to the communication interface circuitry, whereby the processing circuitry and the communication interface circuitry are configured to:
send the following to a UE:
a QoE measurement configuration for one or more services provided by the UE application layer, and
a configuration for selective storage of QoE measurement reports by the UE;
subsequently send, to the UE, a request for QoE measurement reports that are available at the UE and that are associated with the one or more services provided by the UE application layer; and
receive, from the UE in accordance with the request, one or both of first and second QoE measurement reports that were stored by the UE in accordance with the configuration for selective storage, wherein each received QoE measurement report includes measurements performed by the UE in accordance with the QoE measurement configuration.

15. The RNN of claim 14, wherein the processing circuitry and the communication interface circuitry are configured to receive the one or more QoE measurement reports based on, for each particular QoE measurement report:
receiving, from the UE, a plurality of segments of the particular QoE measurement report when a size of the particular QoE measurement report is greater than a maximum segment size, with each segment being received together with a corresponding segment number; and
combining the plurality of segments into the particular QoE measurement report based on the respective segment numbers.

* * * * *